(12) United States Patent
Song

(10) Patent No.: US 12,730,632 B2
(45) Date of Patent: Sep. 8, 2026

(54) PROCESSING-IN-MEMORY DEVICE HAVING A PLURALITY OF GLOBAL BUFFERS AND PROCESSING-IN-MEMORY SYSTEM INCLUDING THE SAME

(71) Applicant: SK hynix Inc., Icheon-si (KR)

(72) Inventor: Choung Ki Song, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 1144 days.

(21) Appl. No.: 17/750,922

(22) Filed: May 23, 2022

(65) Prior Publication Data

US 2022/0283806 A1 Sep. 8, 2022

Related U.S. Application Data

(63) Continuation-in-part of application No. 17/027,276, filed on Sep. 21, 2020, now Pat. No. 11,513,733.

(60) Provisional application No. 62/958,226, filed on Jan. 7, 2020.

(30) Foreign Application Priority Data

Jan. 17, 2020 (KR) ........................ 10-2020-0006903

(51) Int. Cl.

| | |
|---|---|
| ***G06N 3/08*** | (2023.01) |
| ***G06F 9/30*** | (2018.01) |
| ***G06F 9/54*** | (2006.01) |

(52) U.S. Cl.

CPC ........ *G06F 9/3001* (2013.01); *G06F 9/30036* (2013.01); *G06F 9/30196* (2013.01); *G06F 9/544* (2013.01); *G06N 3/08* (2013.01)

(58) Field of Classification Search

CPC ...... G06F 9/30; G06F 7/5443; G06F 12/0877; G06N 3/065; G06N 3/063; G06N 3/08

See application file for complete search history.

(56) References Cited

U.S. PATENT DOCUMENTS

| | | | | |
|---|---|---|---|---|
| 5,165,009 | A | 11/1992 | Watanabe et al. | |
| 10,042,639 | B2 | 8/2018 | Gopal et al. | |
| 11,704,535 | B1 * | 7/2023 | Vemuri | G06N 3/0464 706/31 |
| 2003/0222879 | A1 | 12/2003 | Lin et al. | |
| 2015/0088954 | A1 | 3/2015 | Bakos | |
| 2017/0068717 | A1 | 3/2017 | Crawford, Jr. | |
| 2018/0307974 | A1 * | 10/2018 | Fang | G06N 3/08 |
| 2019/0102170 | A1 | 4/2019 | Chen et al. | |
| 2019/0114265 | A1 | 4/2019 | Chang et al. | |
| 2019/0258487 | A1 * | 8/2019 | Shin | G06F 9/355 |

(Continued)

FOREIGN PATENT DOCUMENTS

| | | | |
|---|---|---|---|
| CN | 110311676 | A | 10/2019 |
| KR | 1020170136055 | A | 12/2017 |

*Primary Examiner* — Kamran Afshar

(74) *Attorney, Agent, or Firm* — WILLIAM PARK AND ASSOCIATES LTD.

(57) ABSTRACT

A processing-in-memory (PIM) device includes a plurality of multiplication and accumulation (MAC) operators configured to perform MAC arithmetic operations using weight data and vector data to generate and output MAC result data. The PIM device also includes a first global buffer and a second global buffer configured to alternately perform a vector data provision operation of providing the vector data to the plurality of MAC operators and a MAC result data storage operation of storing the MAC result data.

20 Claims, 69 Drawing Sheets

(56) References Cited

U.S. PATENT DOCUMENTS

2020/0005127 A1* 1/2020 Baum .................... G06F 7/785
2020/0089472 A1 3/2020 Pareek et al.
2020/0174749 A1 6/2020 Kang et al.
2020/0293867 A1 9/2020 Shao et al.
2021/0072986 A1 3/2021 Yudanov et al.

* cited by examiner

Figure 1:
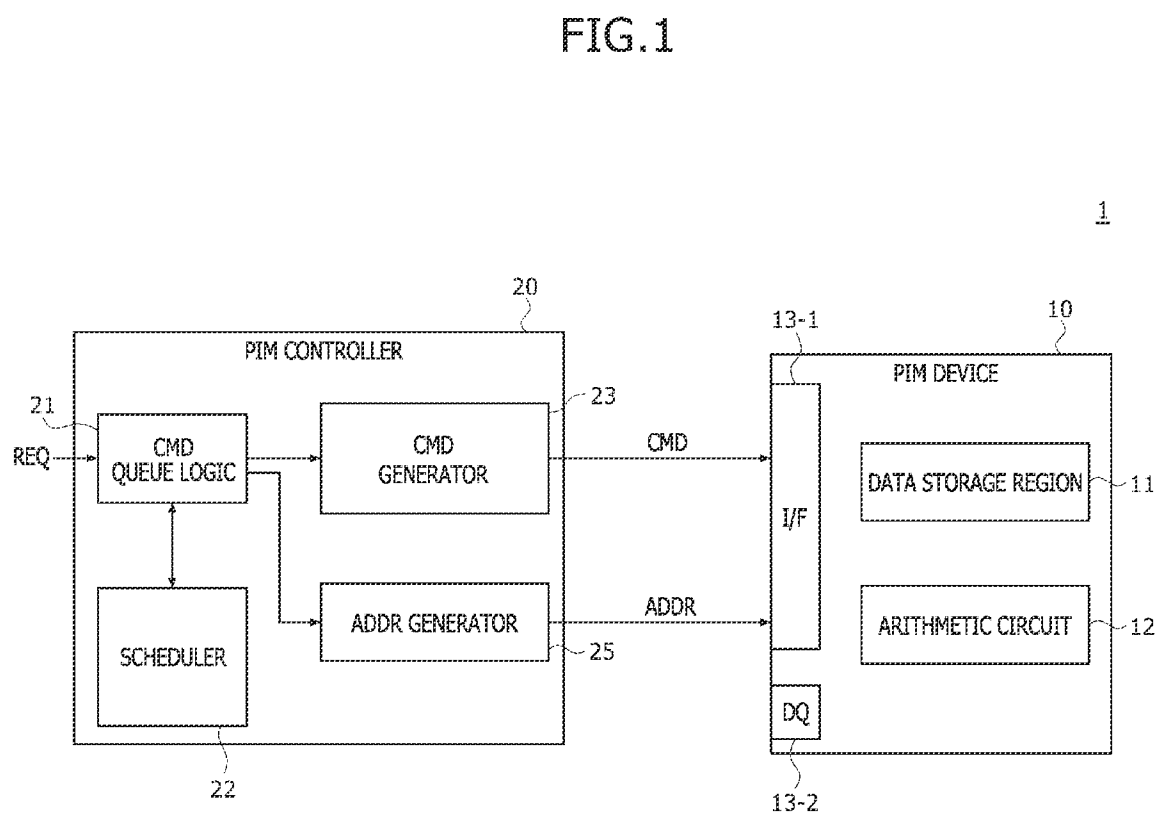

10 PIM DEVICE
11 DATA STORAGE REGION
12 ARITHMETIC CIRCUIT
13-1 I/F
13-2 DQ

CMD
ADDR

20 PIM CONTROLLER
21 CMD QUEUE LOGIC
22 SCHEDULER
23 CMD GENERATOR
25 ADDR GENERATOR

REQ

Figure 2:
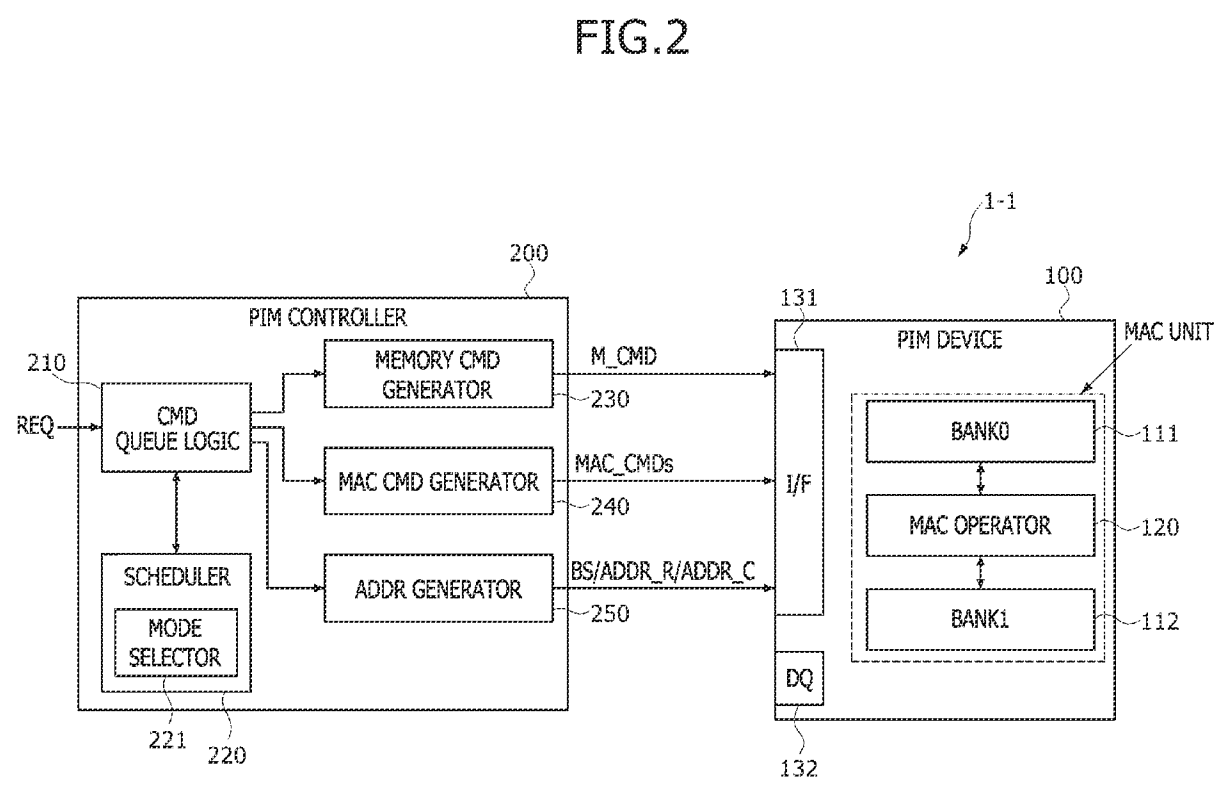

PIM DEVICE 100

MAC UNIT

BANK0 111

MAC OPERATOR 120

BANK1 112

I/F 131

DQ 132

M_CMD

MAC_CMDs

BS/ADDR_R/ADDR_C

PIM CONTROLLER 200

MEMORY CMD GENERATOR 230

MAC CMD GENERATOR 240

ADDR GENERATOR 250

CMD QUEUE LOGIC 210

SCHEDULER 220

MODE SELECTOR 221

REQ

FIG.4

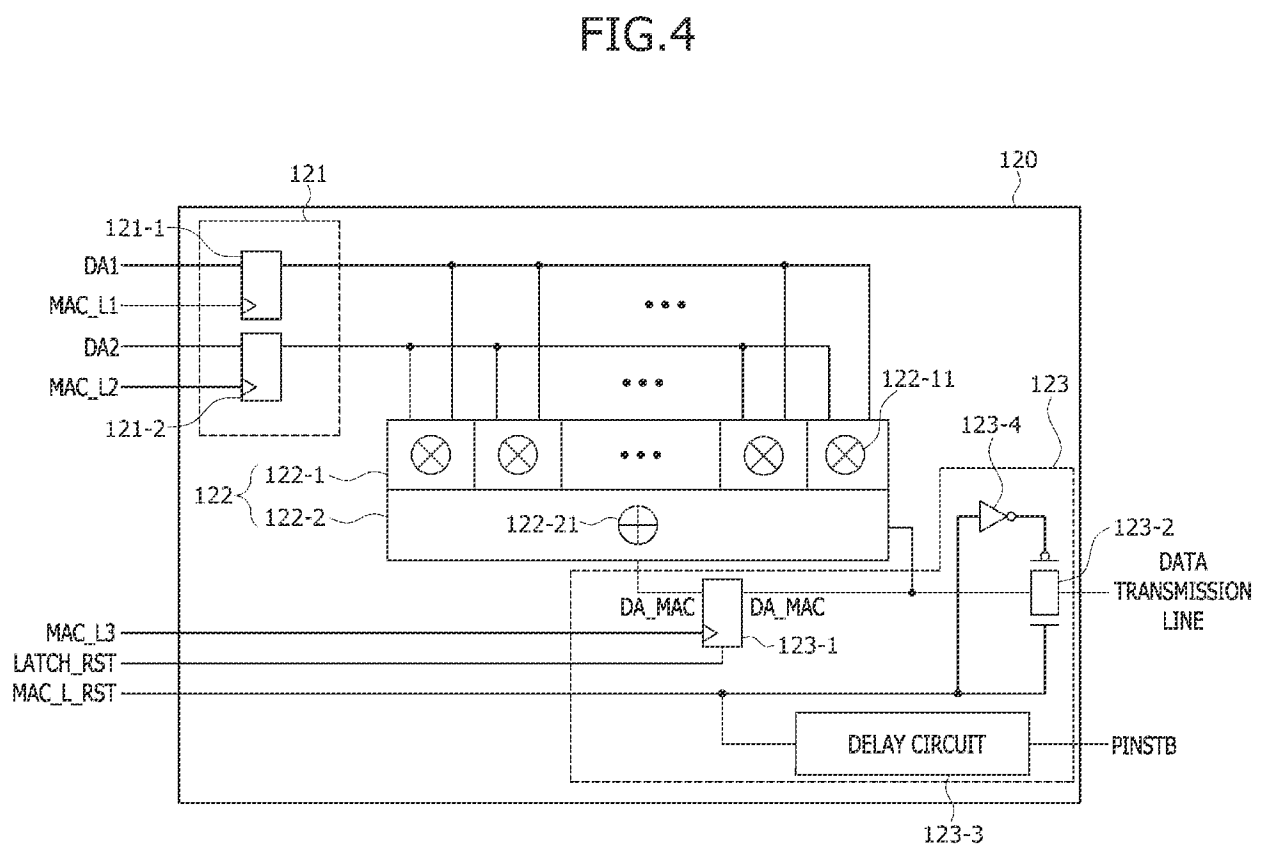

120
121
121-1
121-2
122
122-1
122-2
122-11
122-21
123
123-1
123-2
123-3
123-4
DA1
MAC_L1
DA2
MAC_L2
MAC_L3
LATCH_RST
MAC_L_RST
DA_MAC
DA_MAC
DELAY CIRCUIT
PINSTB
DATA TRANSMISSION LINE

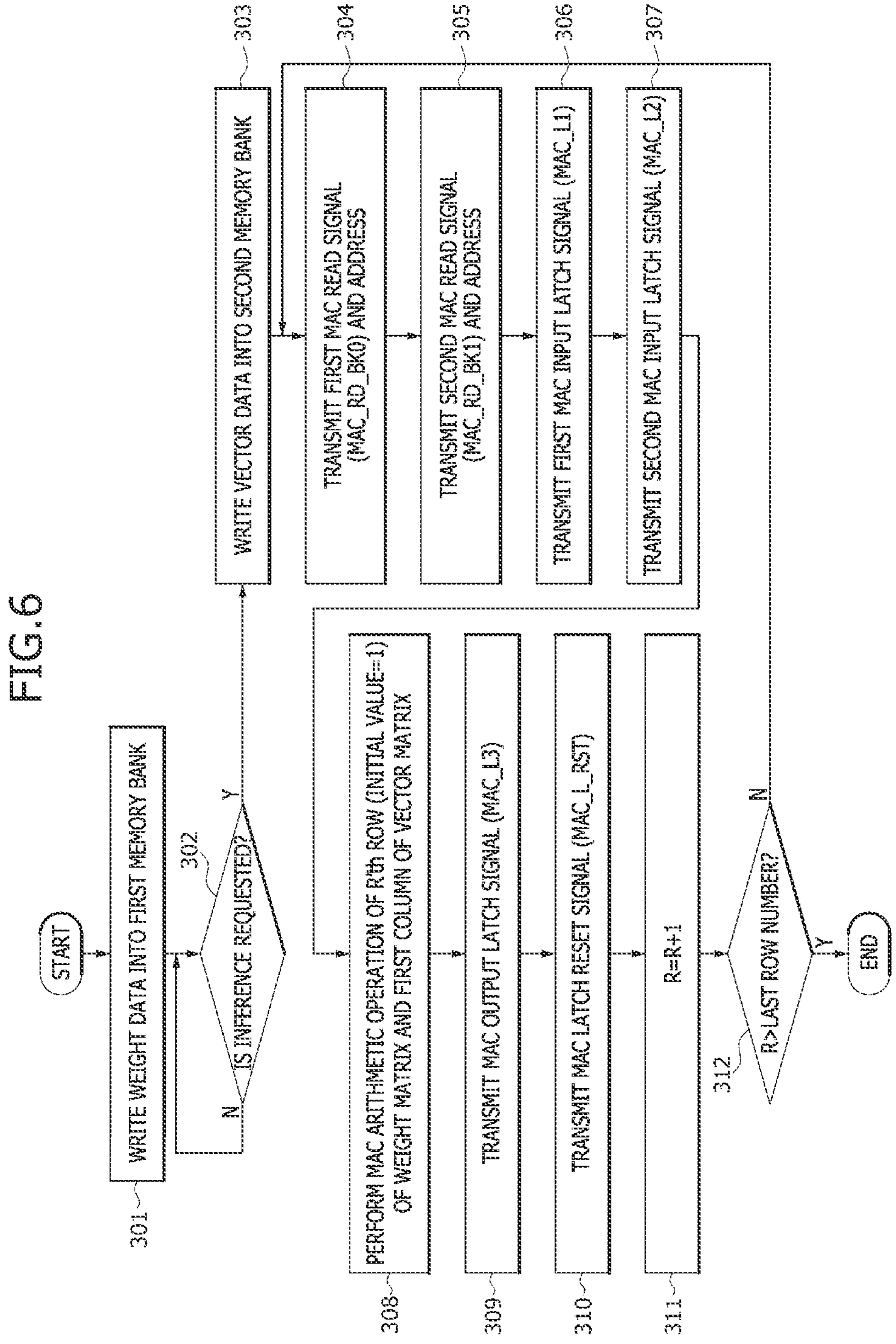
FIG.6
START
WRITE WEIGHT DATA INTO FIRST MEMORY BANK
301
IS INFERENCE REQUESTED?
302
N
Y
WRITE VECTOR DATA INTO SECOND MEMORY BANK
303
TRANSMIT FIRST MAC READ SIGNAL (MAC_RD_BK0) AND ADDRESS
304
TRANSMIT SECOND MAC READ SIGNAL (MAC_RD_BK1) AND ADDRESS
305
TRANSMIT FIRST MAC INPUT LATCH SIGNAL (MAC_L1)
306
TRANSMIT SECOND MAC INPUT LATCH SIGNAL (MAC_L2)
307
PERFORM MAC ARITHMETIC OPERATION OF R'th ROW (INITIAL VALUE=1) OF WEIGHT MATRIX AND FIRST COLUMN OF VECTOR MATRIX
308
TRANSMIT MAC OUTPUT LATCH SIGNAL (MAC_L3)
309
TRANSMIT MAC LATCH RESET SIGNAL (MAC_L_RST)
310
R=R+1
311
R>LAST ROW NUMBER?
312
N
Y
END 120
W0.0 X1.0
W0.1 X1.0
W0.2 X2.0
W0.3 X3.0
W0.4 X4.0
W0.5 X5.0
W0.6 X6.0
W0.7 X7.0
122-11
122-1
122-2
122
122-21A
122-21B
122-21C
MAC0.0

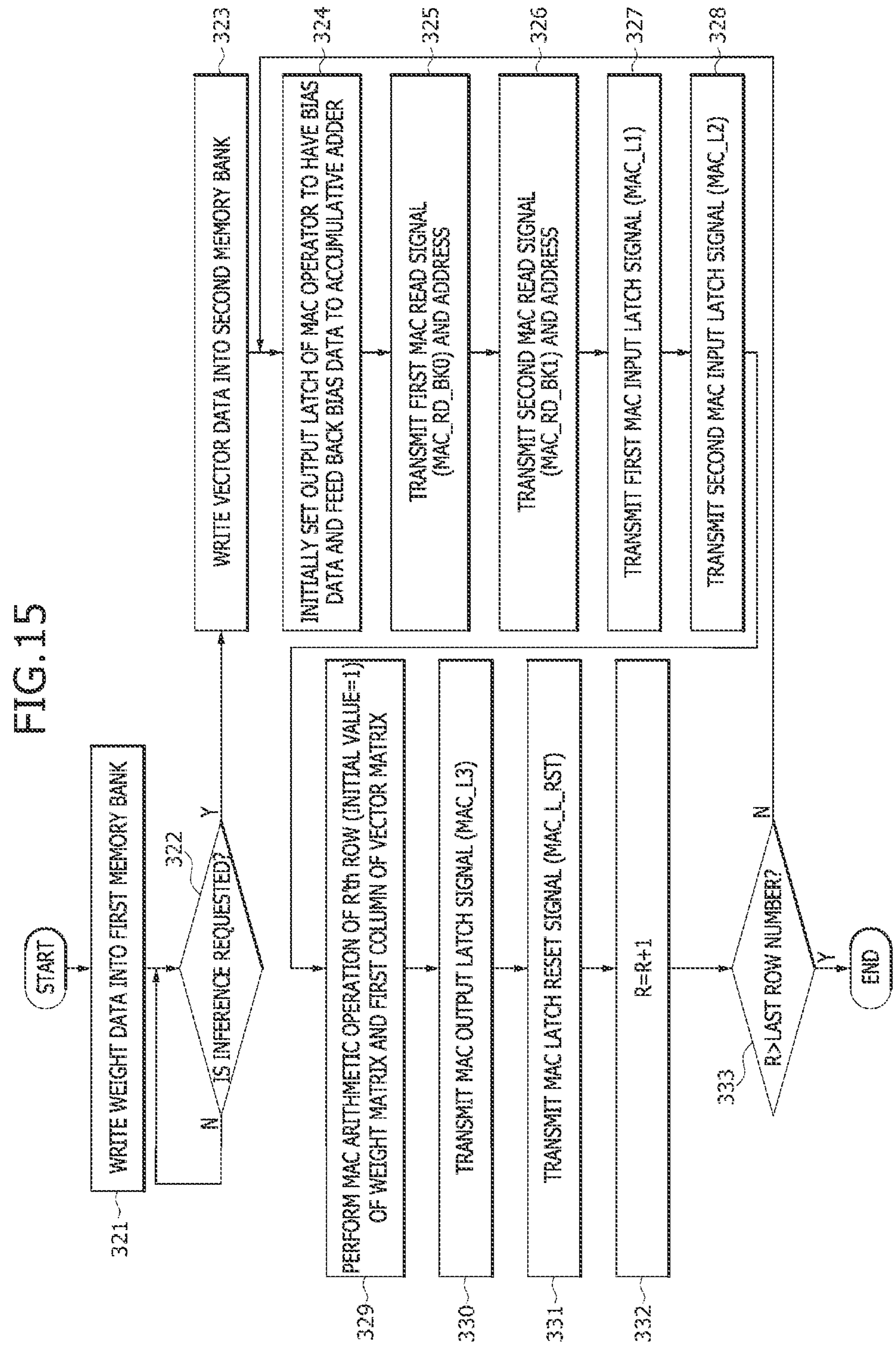
FIG.15
START
WRITE WEIGHT DATA INTO FIRST MEMORY BANK
321
IS INFERENCE REQUESTED?
322
N
Y
WRITE VECTOR DATA INTO SECOND MEMORY BANK
323
INITIALLY SET OUTPUT LATCH OF MAC OPERATOR TO HAVE BIAS DATA AND FEED BACK BIAS DATA TO ACCUMULATIVE ADDER
324
TRANSMIT FIRST MAC READ SIGNAL (MAC_RD_BK0) AND ADDRESS
325
TRANSMIT SECOND MAC READ SIGNAL (MAC_RD_BK1) AND ADDRESS
326
TRANSMIT FIRST MAC INPUT LATCH SIGNAL (MAC_L1)
327
TRANSMIT SECOND MAC INPUT LATCH SIGNAL (MAC_L2)
328
PERFORM MAC ARITHMETIC OPERATION OF R'th ROW (INITIAL VALUE=1) OF WEIGHT MATRIX AND FIRST COLUMN OF VECTOR MATRIX
329
TRANSMIT MAC OUTPUT LATCH SIGNAL (MAC_L3)
330
TRANSMIT MAC LATCH RESET SIGNAL (MAC_L_RST)
331
R=R+1
332
R>LAST ROW NUMBER?
333
N
Y
END

FIG. 16

FIG.17
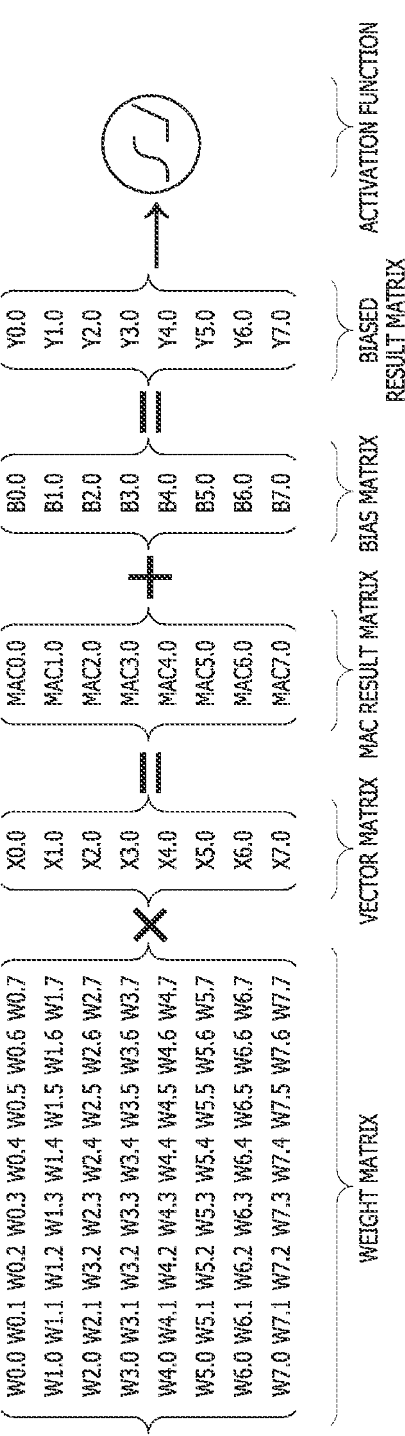

Figure 19:
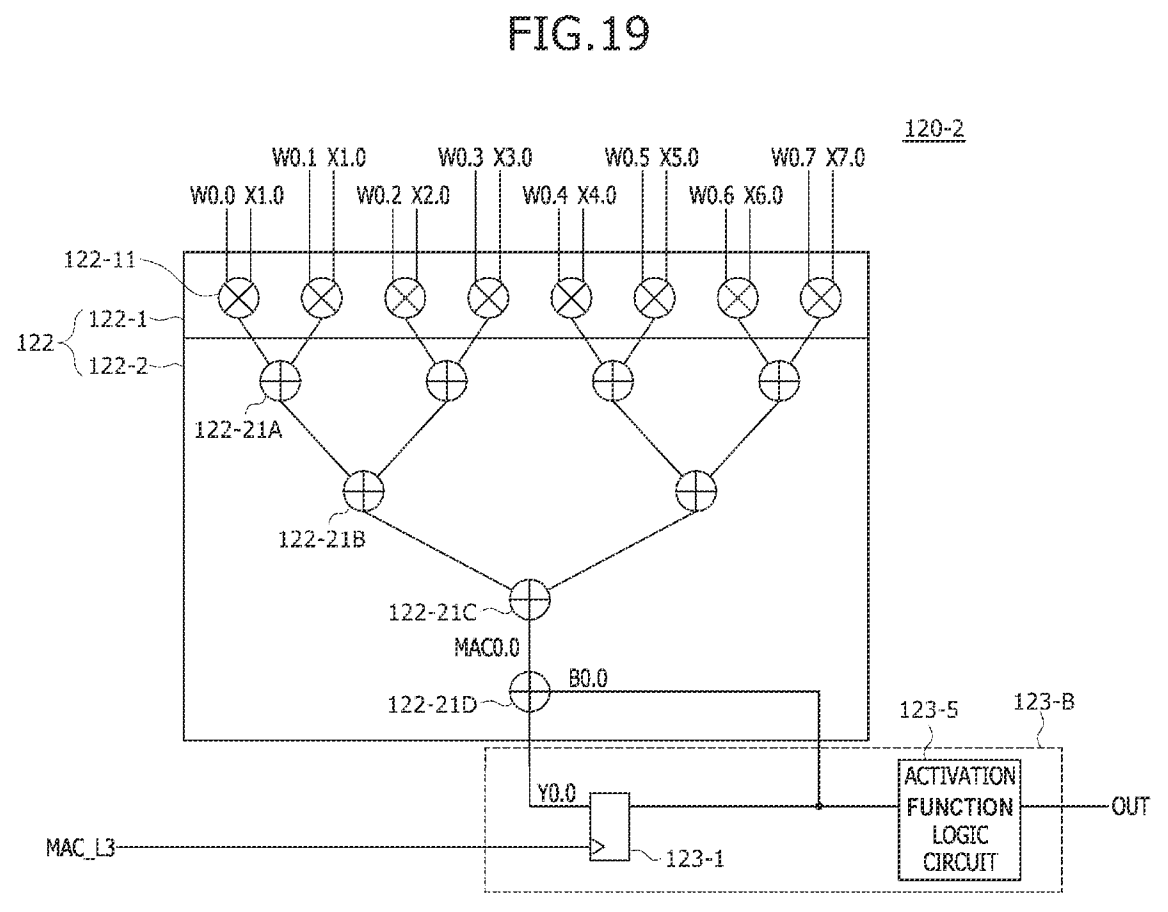

W0.0 X1.0
W0.1 X1.0
W0.2 X2.0
W0.3 X3.0
W0.4 X4.0
W0.5 X5.0
W0.6 X6.0
W0.7 X7.0
122-11
122-1
122-2
122
122-21A
122-21B
122-21C
MAC0.0
122-21D
B0.0
Y0.0
123-1
123-5
123-B
ACTIVATION FUNCTION LOGIC CIRCUIT
OUT
MAC_L3

FIG.25

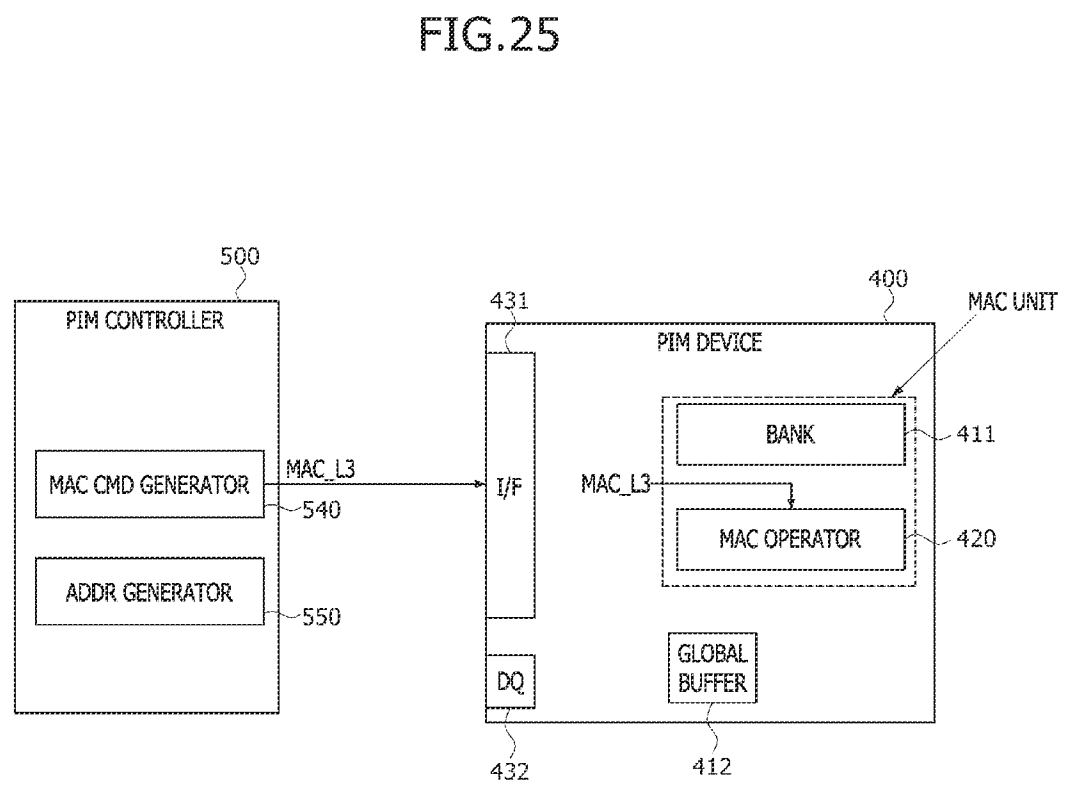

PIM CONTROLLER
500
MAC CMD GENERATOR
540
ADDR GENERATOR
550
MAC_L3
PIM DEVICE
400
MAC UNIT
BANK
411
MAC OPERATOR
420
MAC_L3
GLOBAL BUFFER
412
I/F
431
DQ
432

Figure 29:
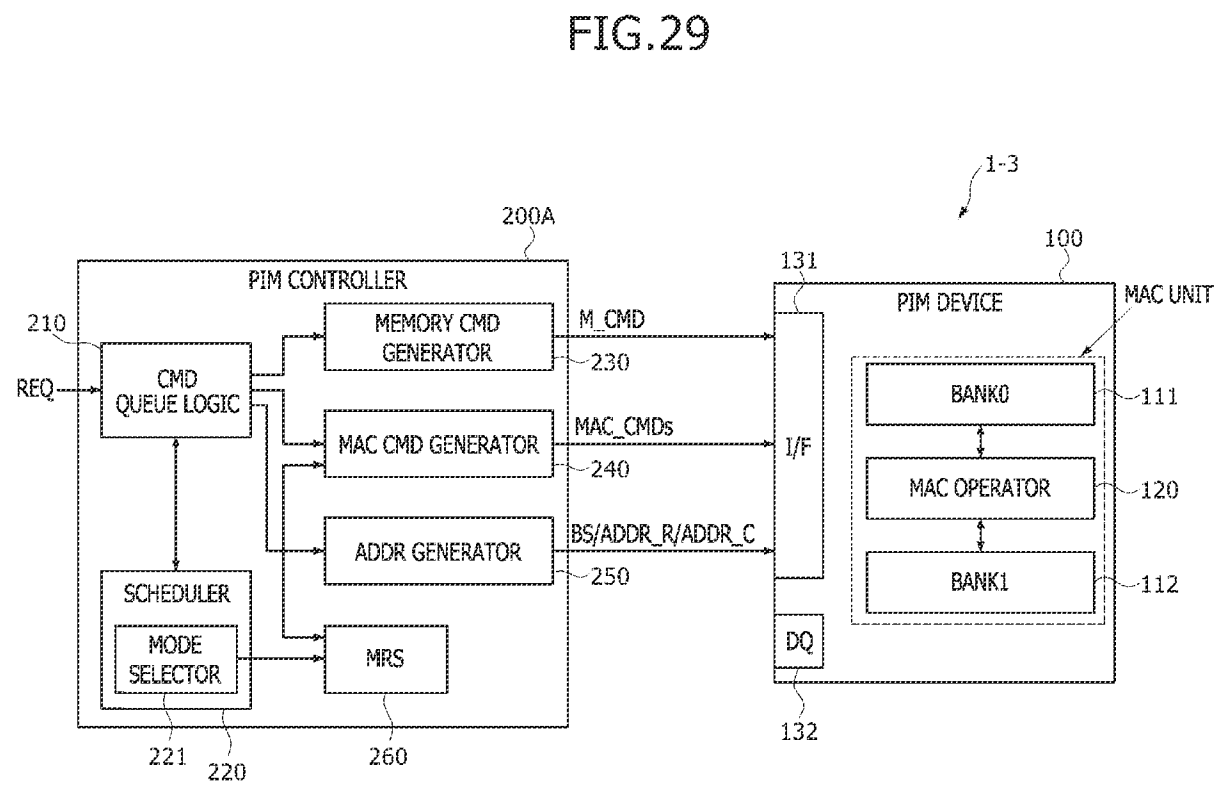

100
PIM DEVICE
MAC UNIT
111
120
112
BANK0
MAC OPERATOR
BANK1
131
I/F
DQ
132

M_CMD
MAC_CMDs
BS/ADDR_R/ADDR_C

200A
PIM CONTROLLER
230
240
250
MEMORY CMD GENERATOR
MAC CMD GENERATOR
ADDR GENERATOR
MRS
260
CMD QUEUE LOGIC
SCHEDULER
MODE SELECTOR
220
221
210
REQ

Figure 30:
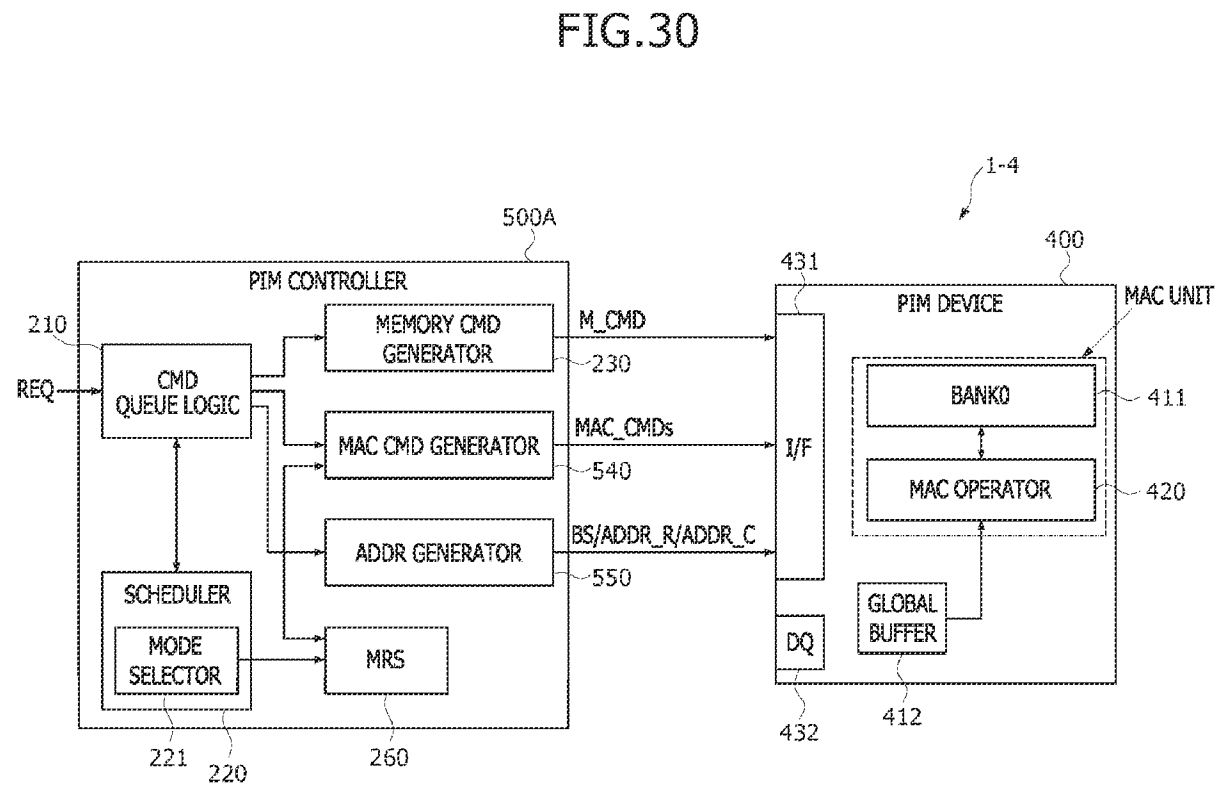

PIM DEVICE
400
MAC UNIT
411
420
BANK0
MAC OPERATOR
GLOBAL BUFFER
412
431
I/F
DQ
432

M_CMD
MAC_CMDs
BS/ADDR_R/ADDR_C

PIM CONTROLLER
500A
MEMORY CMD GENERATOR
230
MAC CMD GENERATOR
540
ADDR GENERATOR
550
MRS
260
CMD QUEUE LOGIC
210
REQ
SCHEDULER
MODE SELECTOR
220
221

FIG.31

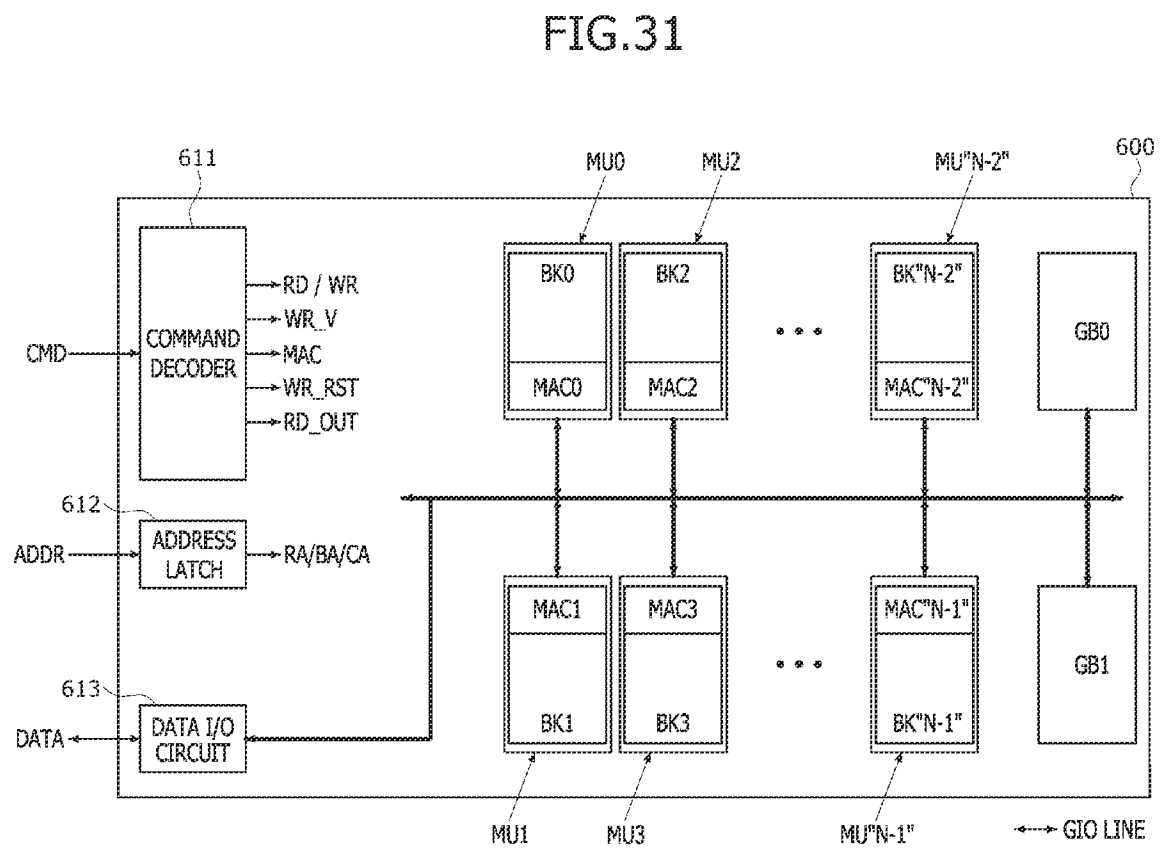

600
611
COMMAND DECODER
RD / WR
WR_V
MAC
WR_RST
RD_OUT
CMD
612
ADDRESS LATCH
RA/BA/CA
ADDR
613
DATA I/O CIRCUIT
DATA
MU0
BK0
MAC0
MU1
MAC1
BK1
MU2
BK2
MAC2
MU3
MAC3
BK3
MU"N-2"
BK"N-2"
MAC"N-2"
MU"N-1"
MAC"N-1"
BK"N-1"
GB0
GB1
GIO LINE

FIG.34

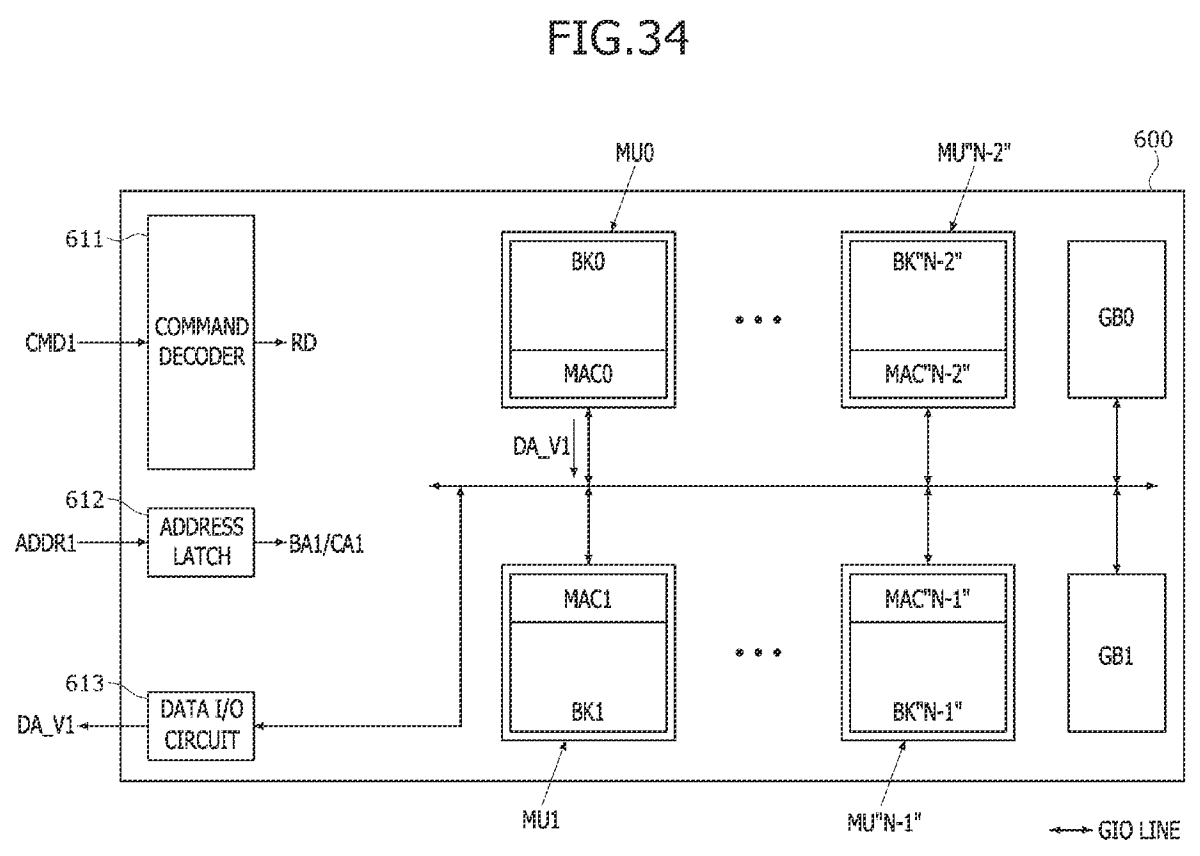

600
GB0
GB1
GIO LINE
MU"N-2"
BK"N-2"
MAC"N-2"
MAC"N-1"
BK"N-1"
MU"N-1"
MU0
BK0
MAC0
DA_V1
MAC1
BK1
MU1
COMMAND DECODER
RD
ADDRESS LATCH
BA1/CA1
DATA I/O CIRCUIT
611
CMD1
612
ADDR1
613
DA_V1

600
GB0
GB1
DA_V1
MU"N-2"
BK"N-2"
MAC"N-2"
MAC"N-1"
BK"N-1"
MU"N-1"
MU0
BK0
MAC0
MAC1
BK1
MU1
COMMAND DECODER
WR_V
ADDRESS LATCH
CA2
DATA I/O CIRCUIT
611
612
613
CMD2
ADDR2
DA_V1
GIO LINE

FIG.36

600
GB0
GB1
GIO LINE
DA_V2
(RST1(1)-RST1(N))
MU"N-2"
BK"N-2"
MAC"N-2"
RST1(N-1)
RST1(N)
MAC"N-1"
BK"N-1"
MU"N-1"
MU0
BK0
MAC0
RST1(1)
RST1(2)
MAC1
BK1
MU1
COMMAND DECODER
WR_RST
ADDRESS LATCH
CA3
DATA I/O CIRCUIT
611
612
613
CMD4
ADDR3

FIG. 42

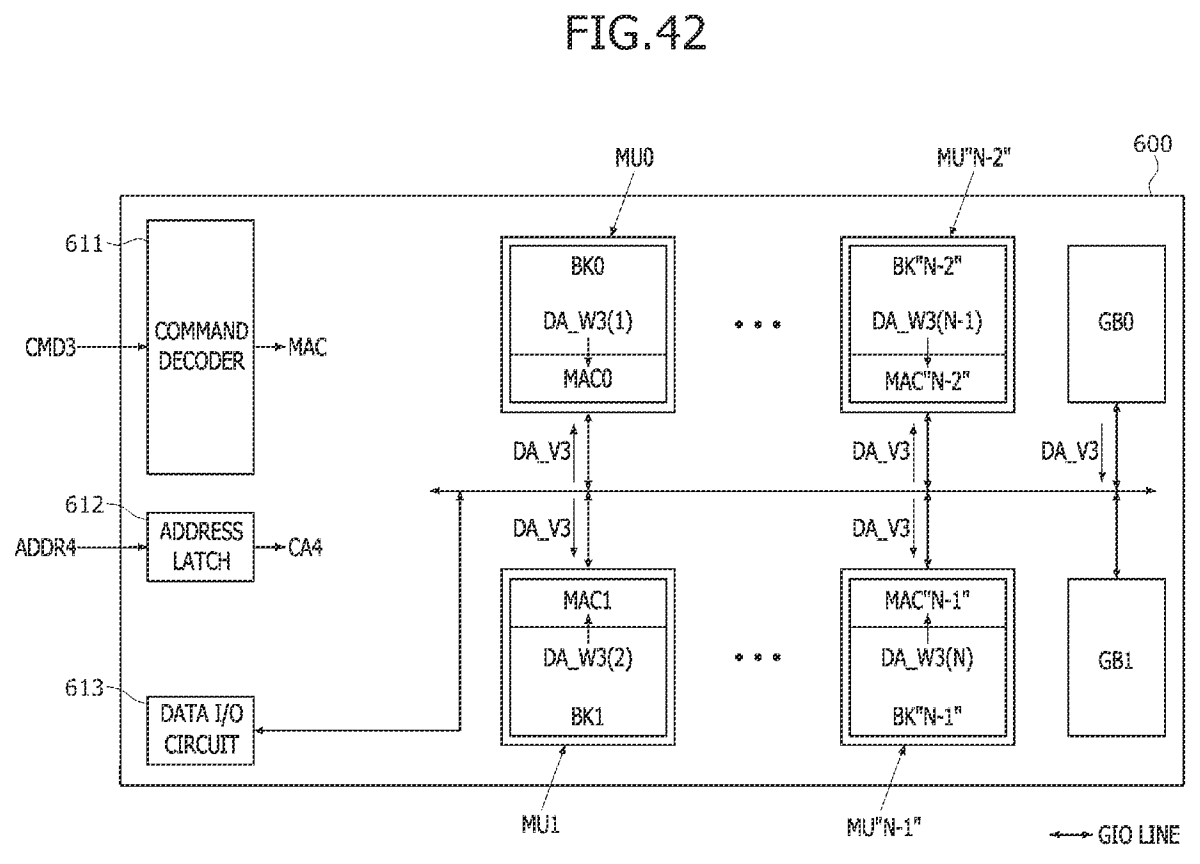

600
GB0
GB1
DA_V3
GIO LINE
MU"N-2"
BK"N-2"
DA_W3(N-1)
MAC"N-2"
MAC"N-1"
DA_W3(N)
BK"N-1"
MU"N-1"
MU0
BK0
DA_W3(1)
MAC0
MAC1
DA_W3(2)
BK1
MU1
COMMAND DECODER
MAC
ADDRESS LATCH
CA4
DATA I/O CIRCUIT
611
CMD3
612
ADDR4
613

FIG. 43

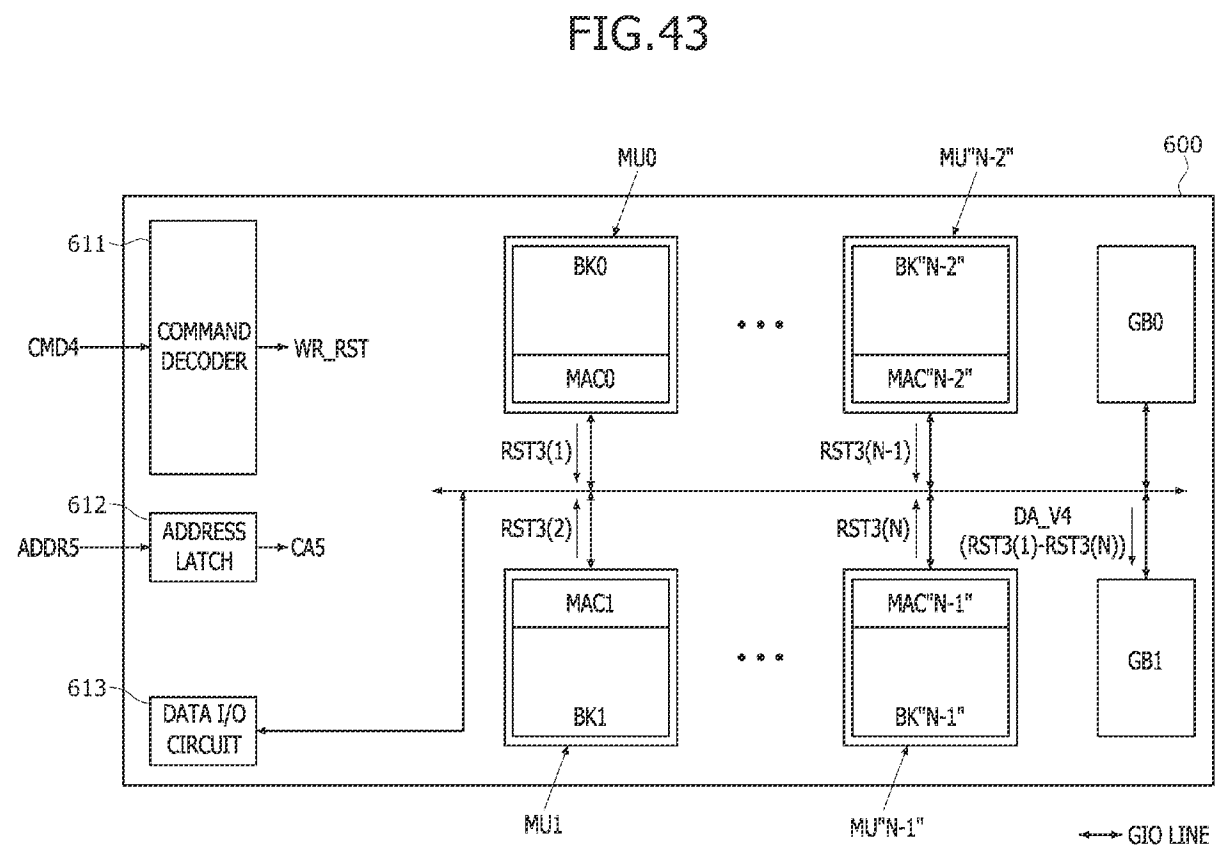

600
GB0
GB1
MU"N-2"
BK"N-2"
MAC"N-2"
MU0
BK0
MAC0
MAC1
BK1
MU1
MAC"N-1"
BK"N-1"
MU"N-1"
RST3(1)
RST3(2)
RST3(N-1)
RST3(N)
DA_V4
(RST3(1)-RST3(N))
GIO LINE
COMMAND DECODER
WR_RST
ADDRESS LATCH
CA5
DATA I/O CIRCUIT
611
CMD4
612
ADDR5
613

600
GB0
GB1
DA_V4
MU"N-2"
BK"N-2"
DA_W4(N-1)
MAC"N-2"
MAC"N-1"
DA_W4(N)
BK"N-1"
MU"N-1"
MU0
BK0
DA_W4(1)
MAC0
MAC1
DA_W4(2)
BK1
MU1
GIO LINE
COMMAND DECODER
MAC
ADDRESS LATCH
CA5
DATA I/O CIRCUIT
611
612
613
CMD3
ADDR5

FIG. 48

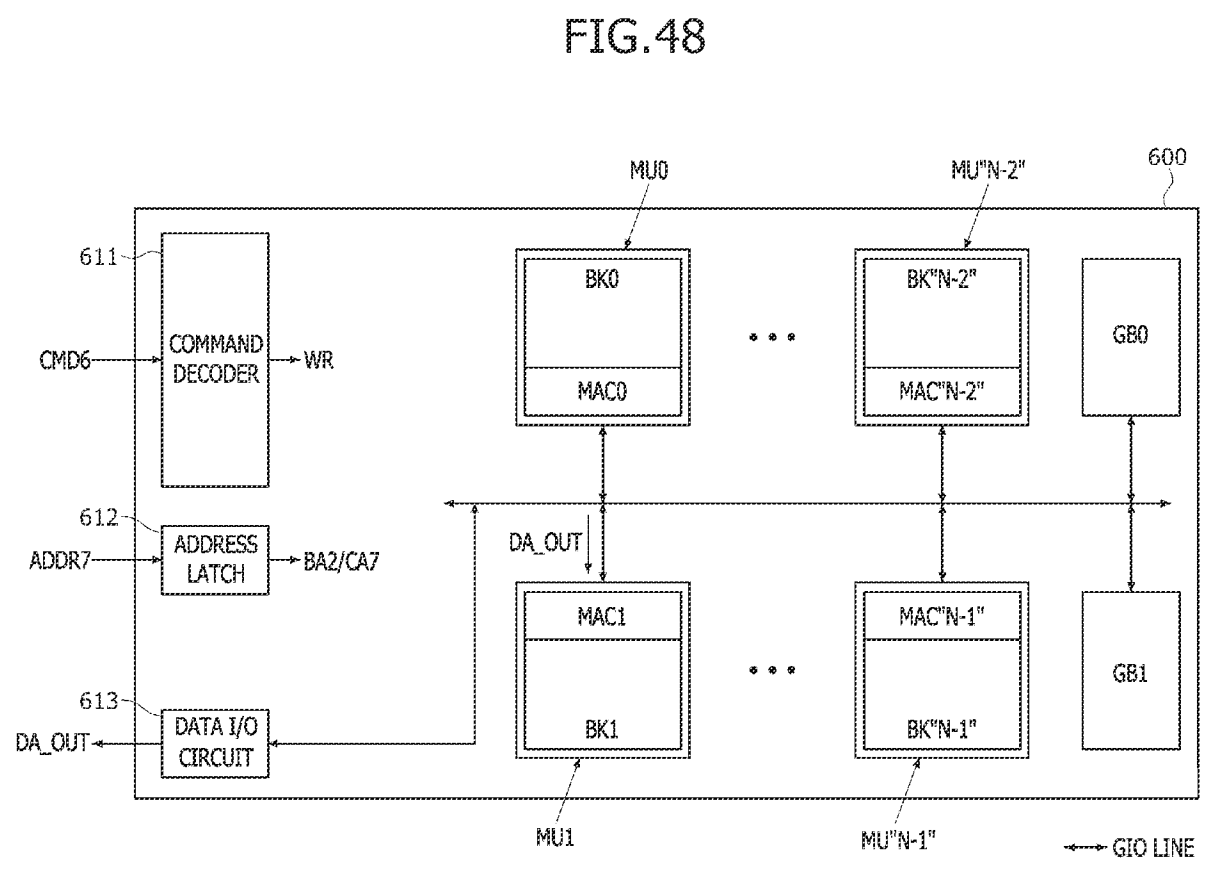

600
MU0
MU"N-2"
BK0
MAC0
BK"N-2"
MAC"N-2"
GB0
MAC1
BK1
MAC"N-1"
BK"N-1"
GB1
MU1
MU"N-1"
GIO LINE
DA_OUT
COMMAND DECODER
WR
ADDRESS LATCH
BA2/CA7
DATA I/O CIRCUIT
611
CMD6
612
ADDR7
613
DA_OUT 800
811
COMMAND DECODER
RD / WR
WR_V
MAC
RD_RST
CMD
812
ADDRESS LATCH
RA/BA/CA
ADDR
813
DATA I/O CIRCUIT
DATA
MU0
BK0
DW1
MAC0
MU1
MAC1
DW2
BK1
MU2
BK2
DW3
MAC2
MU3
MAC3
DW3
BK3
MU14
BK14
DW15
MAC14
MU15
MAC15
DW16
BK15
GB0
DV1
GB1
DV2
DV3
GB1
DV4
GB3
GIO LINE
VIO LINE

PROCESSING-IN-MEMORY DEVICE HAVING A PLURALITY OF GLOBAL BUFFERS AND PROCESSING-IN-MEMORY SYSTEM INCLUDING THE SAME

CROSS-REFERENCE TO RELATED APPLICATIONS

This is a continuation-in-part of U.S. application Ser. No. 17/027,276, filed Sep. 21, 2020, which claims the benefit of U.S. Provisional Application No. 62/958,226, filed on Jan. 7, 2020, and claims priority to Korean Application No. 10-2020-0006903, filed on Jan. 17, 2020, which are incorporated herein by reference in their entirety.

BACKGROUND

1. Technical Field

Various embodiments of the present disclosure relate to processing-in-memory (PIM) devices and, more particularly, to PIM devices having a plurality of global buffers and PIM systems including the same.

2. Related Art

Recently, interest in artificial intelligence (AI) has been increasing not only in the information technology industry but also in the financial and medical industries. Accordingly, in various fields, artificial intelligence, more precisely, the introduction of deep learning, is considered and prototyped. In general, techniques for effectively learning deep neural networks (DNNs) or deep networks having increased layers as compared with general neural networks to utilize the deep neural networks (DNNs) or the deep networks in pattern recognition or inference are commonly referred to as deep learning.

One cause of this widespread interest may be the improved performance of processors performing arithmetic operations. To improve the performance of artificial intelligence, it may be necessary to increase the number of layers constituting a neural network in the artificial intelligence to educate the artificial intelligence. This trend has continued in recent years, which has led to an exponential increase in the amount of computation required for the hardware that actually does the computation. Moreover, if the artificial intelligence employs a general hardware system including memory and a processor which are separated from each other, the performance of the artificial intelligence may be degraded due to limitation of the amount of data communication between the memory and the processor. In order to solve this problem, a PIM device in which a processor and memory are integrated in one semiconductor chip has been used as a neural network computing device. Because the PIM device directly performs arithmetic operations internally, data processing speed in the neural network may be improved.

SUMMARY

A PIM device according to an embodiment of the present disclosure may include a plurality of multiplication and accumulation (MAC) operators configured to perform MAC arithmetic operations using weight data and vector data to generate and output MAC result data. The PIM device may also include a first global buffer and a second global buffer configured to alternately perform a vector data provision operation of providing the vector data to the plurality of MAC operators and a MAC result data storage operation of storing the MAC result data.

A PIM system according to an embodiment of the present disclosure may include a plurality of PIM devices and include a host configured to transmit a command and an address to the plurality of PIM devices and exchange data with the plurality of PIM devices. Each of the PIM devices may include a plurality of multiplication and accumulation (MAC) operators configured to perform MAC arithmetic operations using weight data and vector data and generate MAC result data, a plurality of memory banks configured to provide the weight data to the plurality of MAC operators, a first global buffer configured to provide the vector data to the plurality of MAC operators, and a second global buffer configured to store the MAC result data.

A PIM device according to another embodiment of the present disclosure may include a plurality of multiplication and accumulation (MAC) operators configured to perform MAC arithmetic operations using weight data and vector data and generate MAC result data. The PIM device may also include a plurality of memory banks configured to provide the weight data to the plurality of MAC operators. The PIM device may further include a plurality of global buffers configured to provide different vector data to the plurality of MAC operators, the vector data from one of the global buffers being provided in common to the plurality of MAC operators.

BRIEF DESCRIPTION OF THE DRAWINGS

Certain features of the disclosed technology are illustrated in various embodiments with reference to the attached drawings.

FIG. 1 is a block diagram illustrating a PIM system according to an embodiment of the present disclosure.

FIG. 2 is a block diagram illustrating a PIM system according to a first embodiment of the present disclosure.

FIG. 4 is a block diagram illustrating an example of a configuration of a MAC operator of a PIM device included in a PIM system according to a first embodiment of the present disclosure.

FIG. 6 is a flowchart illustrating processes of the MAC arithmetic operation illustrated in FIG. 5 in a PIM system according to a first embodiment of the present disclosure.

FIG. 15 is a flowchart illustrating processes of the MAC arithmetic operation illustrated in FIG. 14 in a PIM system according to a first embodiment of the present disclosure.

FIG. 16 illustrates an example of a configuration of a MAC operator for performing the MAC arithmetic operation of FIG. 14 in a PIM system according to a first embodiment of the present disclosure.

FIG. 17 illustrates yet another example of a MAC arithmetic operation performed in a PIM system according to a first embodiment of the present disclosure.

FIG. 19 illustrates an example of a configuration of a MAC operator for performing the MAC arithmetic operation of FIG. 17 in a PIM system according to a first embodiment of the present disclosure.

FIGS. 23 to 26 are block diagrams illustrating processes of the MAC arithmetic operation illustrated in FIG. 5 in a PIM system according to a second embodiment of the present disclosure.

FIG. 29 is a block diagram illustrating a PIM system according to yet another embodiment of the present disclosure.

FIG. 30 is a block diagram illustrating a PIM system according to still another embodiment of the present disclosure.

FIG. 31 is a block diagram illustrating a PIM device according to an embodiment of the present disclosure.

FIG. 34 is a diagram illustrating operations of the PIM device according to steps 711 and 712 in the flowchart of FIG. 33.

FIG. 36 is a diagram illustrating operations of the PIM device according to steps 715 and 716 in the flowchart of FIG. 33.

FIG. 42 is a diagram illustrating operations of the PIM device according to steps 731 and 732 in the flowchart of FIG. 41.

FIG. 43 is a diagram illustrating operations of the PIM device according to steps 733 and 734 in the flowchart of FIG. 41.

FIG. 48 is a diagram illustrating operations of the PIM device according to steps 747 and 748 in the flowchart of FIG. 44.

DETAILED DESCRIPTION OF THE EMBODIMENTS

Figure 3:
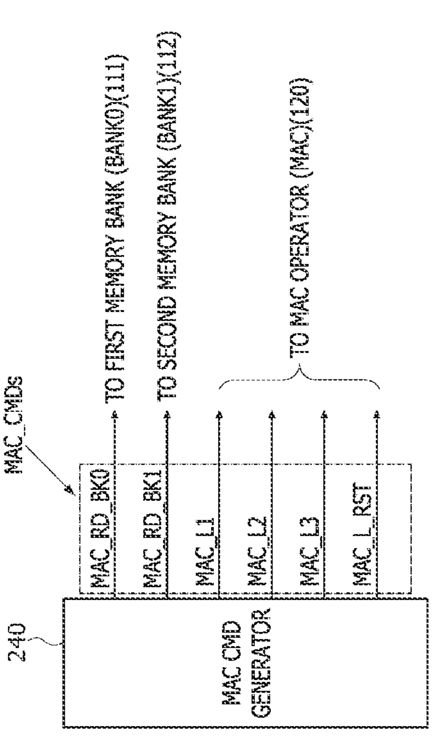
FIG. 3 illustrates MAC commands outputted from a MAC command generator of a PIM controller included in a PIM system according to a first embodiment of the present disclosure.

In the following description of embodiments, it will be understood that the terms "first" and "second" are intended to identify elements, but not used to define a particular number or sequence of elements. In addition, when an element is referred to as being located "on," "over," "above," "under," or "beneath" another element, it is intended to mean a relative positional relationship, but not used to limit certain cases in which the element directly contacts the other element, or at least one intervening element is present therebetween. Accordingly, the terms such as "on," "over," "above," "under," "beneath," "below," and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may be electrically or mechanically connected or coupled to the other element indirectly with one or more additional elements therebetween.

Various embodiments are directed to PIM systems and methods of operating the PIM systems.

FIG. 1 is a block diagram illustrating a PIM system according to an embodiment of the present disclosure. As illustrated in FIG. 1, the PIM system 1 may include a PIM device 10 and a PIM controller 20. The PIM device 10 may include a data storage region 11, an arithmetic circuit 12, an interface (I/F) 13-1, and a data (DQ) input/output (I/O) pad 13-2. The data storage region 11 may include a first storage region and a second storage region. In an embodiment, the first storage region and the second storage region may be a first memory bank and a second memory bank, respectively. In another embodiment, the first data storage region and the second storage region may be a memory bank and buffer memory, respectively. The data storage region 11 may include a volatile memory element or a non-volatile memory element. For an embodiment, the data storage region 11 may include both a volatile memory element and a non-volatile memory element.

The arithmetic circuit 12 may perform an arithmetic operation on the data transferred from the data storage region 11. In an embodiment, the arithmetic circuit 12 may include a multiplying-and-accumulating (MAC) operator. The MAC operator may perform a multiplying calculation on the data transferred from the data storage region 11 and perform an accumulating calculation on the multiplication result data. After MAC operations, the MAC operator may output MAC result data. The MAC result data may be stored in the data storage region 11 or output from the PIM device 10 through the data I/O pad 13-2.

The interface 13-1 of the PIM device 10 may receive a command CMD and address ADDR from the PIM controller 20. The interface 13-1 may output the command CMD to the data storage region 11 or the arithmetic circuit 12 in the PIM device 10. The interface 13-1 may output the address ADDR to the data storage region 11 in the PIM device 10. The data I/O pad 13-2 of the PIM device 10 may function as a data communication terminal between a device external to the PIM device 10, for example the PIM controller 20, and the data storage region 11 included in the PIM device 10. The external device to the PIM device 10 may correspond to the PIM controller 20 of the PIM system 1 or a host located outside the PIM system 1. Accordingly, data outputted from the host or the PIM controller 20 may be inputted into the PIM device 10 through the data I/O pad 13-2.

The PIM controller 20 may control operations of the PIM device 10. In an embodiment, the PIM controller 20 may control the PIM device 10 such that the PIM device 10 operates in a memory mode or an arithmetic mode. In the event that the PIM controller 20 controls the PIM device 10 such that the PIM device 10 operates in the memory mode, the PIM device 10 may perform a data read operation or a data write operation for the data storage region 11. In the event that the PIM controller 20 controls the PIM device 10 such that the PIM device 10 operates in the arithmetic mode, the arithmetic circuit 12 of the PIM device 10 may receive first data and second data from the data storage region 11 to perform an arithmetic operation. In the event that the PIM controller 20 controls the PIM device 10 such that the PIM device 10 operates in the arithmetic mode, the PIM device 10 may also perform the data read operation and the data write operation for the data storage region 11 to execute the arithmetic operation. The arithmetic operation may be a deterministic arithmetic operation performed during a predetermined fixed time. The word "predetermined" as used herein with respect to a parameter, such as a predetermined fixed time or time period, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

The PIM controller 20 may be configured to include command queue logic 21, a scheduler 22, a command (CMD) generator 23, and an address (ADDR) generator 25. The command queue logic 21 may receive a request REQ from an external device (e.g., a host of the PIM system 1) and store the command queue corresponding to the request REQ in the command queue logic 21. The command queue logic 21 may transmit information on a storage status of the command queue to the scheduler 22 whenever the command queue logic 21 stores the command queue. The command queue stored in the command queue logic 21 may be transmitted to the command generator 23 according to a sequence determined by the scheduler 22. The command queue logic 21, and also the command queue logic 210 of FIGS. 2 and 20, may be implemented as hardware, software, or a combination of hardware and software. For example, the command queue logic 21 and/or 210 may be a command queue logic circuit operating in accordance with an algorithm and/or a processor executing command queue logic code.

The scheduler 22 may adjust a sequence of the command queue when the command queue stored in the command queue logic 21 is outputted from the command queue logic 21. In order to adjust the output sequence of the command queue stored in the command queue logic 21, the scheduler 22 may analyze the information on the storage status of the command queue provided by the command queue logic 21 and may readjust a process sequence of the command queue so that the command queue is processed according to a proper sequence.

The command generator 23 may receive the command queue related to the memory mode of the PIM device 10 and the MAC mode of the PIM device 10 from the command queue logic 21. The command generator 23 may decode the command queue to generate and output the command CMD. The command CMD may include a memory command for the memory mode or an arithmetic command for the arithmetic mode. The command CMD outputted from the command generator 23 may be transmitted to the PIM device 10.

The command generator 23 may be configured to generate and transmit the memory command to the PIM device 10 in the memory mode. The command generator 23 may be configured to generate and transmit a plurality of arithmetic commands to the PIM device 10 in the arithmetic mode. In one example, the command generator 23 may be configured to generate and output first to fifth arithmetic commands with predetermined time intervals in the arithmetic mode. The first arithmetic command may be a control signal for reading the first data out of the data storage region 11. The second arithmetic command may be a control signal for reading the second data out of the data storage region 11. The third arithmetic command may be a control signal for latching the first data in the arithmetic circuit 12. The fourth arithmetic command may be a control signal for latching the second data in the arithmetic circuit 12. And the fifth MAC command may be a control signal for latching arithmetic result data of the arithmetic circuit 12.

The address generator 25 may receive address information from the command queue logic 21 and generate the address ADDR for accessing a region in the data storage region 11. In an embodiment, the address ADDR may include a bank address, a row address, and a column address. The address ADDR outputted from the address generator 25 may be inputted to the data storage region 11 through the interface (I/F) 13-1.

FIG. 2 is a block diagram illustrating a PIM system 1-1 according to a first embodiment of the present disclosure. As illustrated in FIG. 2, the PIM system 1-1 may include a PIM device 100 and a PIM controller 200. The PIM device 100 may include a first memory bank (BANK0) 111, a second memory bank (BANK1) 112, a MAC operator 120, an interface (I/F) 131, and a data input/output (I/O) pad 132. For an embodiment, the MAC operator 120 represents a MAC operator circuit. The first memory bank (BANK0) 111, the second memory bank (BANK1) 112, and the MAC operator 120 included in the PIM device 100 may constitute one MAC unit. In another embodiment, the PIM device 100 may include a plurality of MAC units. The first memory bank (BANK0) 111 and the second memory bank (BANK1) 112 may represent a memory region for storing data, for example, a DRAM device. Each of the first memory bank (BANK0) 111 and the second memory bank (BANK1) 112 may be a component unit which is independently activated and may be configured to have the same data bus width as data I/O lines in the PIM device 100. In an embodiment, the first and second memory banks 111 and 112 may operate through interleaving such that an active operation of the first and second memory banks 111 and 112 is performed in parallel while another memory bank is selected. Each of the first and second memory banks 111 and 112 may include at least one cell array which includes memory unit cells located at cross points of a plurality of rows and a plurality of columns.

Although not shown in the drawings, a core circuit may be disposed adjacent to the first and second memory banks 111 and 112. The core circuit may include X-decoders XDECs and Y-decoders/IO circuits YDEC/IOs. An X-decoder XDEC may also be referred to as a word line decoder or a row decoder. The X-decoder XDEC may receive a row address ADDR_R from the PIM controller 200 and may decode the row address ADDR_R to select and enable one of the rows (i.e., word lines) coupled to the selected memory bank. Each of the Y-decoders/IO circuits YDEC/IOs may include a Y-decoder YDEC and an I/O circuit IO. The Y-decoder YDEC may also be referred to as a bit line decoder or a column decoder. The Y-decoder YDEC may receive a column address ADDR_C from the PIM controller 200 and may decode the column address ADDR_C to select and enable at least one of the columns (i.e., bit lines) coupled to the selected memory bank. Each of the I/O circuits may include an I/O sense amplifier for sensing and amplifying a level of a read datum outputted from the corresponding memory bank during a read operation for the first and second memory banks 111 and 112. In addition, the I/O circuit may include a write driver for driving a write datum during a write operation for the first and second memory banks 111 and 112.

The interface 131 of the PIM device 100 may receive a memory command M_CMD, MAC commands MAC_CMDs, a bank selection signal BS, and the row/column addresses ADDR_R/ADDR_C from the PIM controller 200. The interface 131 may output the memory command M_CMD, together with the bank selection signal BS and the row/column addresses ADDR_R/ADDR_C, to the first memory bank 111 or the second memory bank 112. The interface 131 may output the MAC commands MAC_CMDs to the first memory bank 111, the second memory bank 112, and the MAC operator 120. In such a case, the interface 131 may output the bank selection signal BS and the row/column addresses ADDR_R/ADDR_C to both of the first memory bank 111 and the second memory bank 112. The data I/O pad 132 of the PIM device 100 may function as a data communication terminal between a device external to the PIM device 100 and the MAC unit (which includes the first and second memory banks 111 and 112 and the MAC operator 120) included in the PIM device 100. The external device to the PIM device 100 may correspond to the PIM controller 200 of the PIM system 1-1 or a host located outside the PIM system 1-1. Accordingly, data outputted from the host or the PIM controller 200 may be inputted into the PIM device 100 through the data I/O pad 132.

The PIM controller 200 may control operations of the PIM device 100. In an embodiment, the PIM controller 200 may control the PIM device 100 such that the PIM device 100 operates in a memory mode or a MAC mode. In the event that the PIM controller 200 controls the PIM device 100 such that the PIM device 100 operates in the memory mode, the PIM device 100 may perform a data read operation or a data write operation for the first memory bank 111 and the second memory bank 112. In the event that the PIM controller 200 controls the PIM device 100 such that the PIM device 100 operates in the MAC mode, the PIM device 100 may perform a MAC arithmetic operation for the MAC operator 120. In the event that the PIM controller 200 controls the PIM device 100 such that the PIM device 100 operates in the MAC mode, the PIM device 100 may also perform the data read operation and the data write operation for the first and second memory banks 111 and 112 to execute the MAC arithmetic operation.

The PIM controller 200 may be configured to include command queue logic 210, a scheduler 220, a memory command generator 230, a MAC command generator 240, and an address generator 250. The command queue logic 210 may receive a request REQ from an external device (e.g., a host of the PIM system 1-1) and store a command queue corresponding to the request REQ in the command queue logic 210. The command queue logic 210 may transmit information on a storage status of the command queue to the scheduler 220 whenever the command queue logic 210 stores the command queue. The command queue stored in the command queue logic 210 may be transmitted to the memory command generator 230 or the MAC command generator 240 according to a sequence determined by the scheduler 220. When the command queue outputted from the command queue logic 210 includes command information requesting an operation in the memory mode of the PIM device 100, the command queue logic 210 may transmit the command queue to the memory command generator 230. On the other hand, when the command queue outputted from the command queue logic 210 is command information requesting an operation in the MAC mode of the PIM device 100, the command queue logic 210 may transmit the command queue to the MAC command generator 240.

Information on whether the command queue relates to the memory mode or the MAC mode may be provided by the scheduler 220.

The scheduler 220 may adjust a timing of the command queue when the command queue stored in the command queue logic 210 is outputted from the command queue logic 210. In order to adjust the output timing of the command queue stored in the command queue logic 210, the scheduler 220 may analyze the information on the storage status of the command queue provided by the command queue logic 210 and may readjust a process sequence of the command queue such that the command queue is processed according to a proper sequence. The scheduler 220 may output and transmit to the command queue logic 210 information on whether the command queue outputted from the command queue logic 210 relates to the memory mode of the PIM device 100 or relates to the MAC mode of the PIM device 100. In order to obtain the information on whether the command queue outputted from the command queue logic 210 relates to the memory mode or the MAC mode, the scheduler 220 may include a mode selector 221. The mode selector 221 may generate a mode selection signal including information on whether the command queue stored in the command queue logic 210 relates to the memory mode or the MAC mode, and the scheduler 220 may transmit the mode selection signal to the command queue logic 210.

The memory command generator 230 may receive the command queue related to the memory mode of the PIM device 100 from the command queue logic 210. The memory command generator 230 may decode the command queue to generate and output the memory command M_CMD. The memory command M_CMD outputted from the memory command generator 230 may be transmitted to the PIM device 100. In an embodiment, the memory command M_CMD may include a memory read command and a memory write command. When the memory read command is outputted from the memory command generator 230, the PIM device 100 may perform the data read operation for the first memory bank 111 or the second memory bank 112. Data which are read out of the PIM device 100 may be transmitted to an external device through the data I/O pad 132. The read data outputted from the PIM device 100 may be transmitted to a host through the PIM controller 200. When the memory write command is outputted from the memory command generator 230, the PIM device 100 may perform the data write operation for the first memory bank 111 or the second memory bank 112. In such a case, data to be written into the PIM device 100 may be transmitted from the host to the PIM device 100 through the PIM controller 200. The write data inputted to the PIM device 100 may be transmitted to the first memory bank 111 or the second memory bank 112 through the data I/O pad 132.

The MAC command generator 240 may receive the command queue related to the MAC mode of the PIM device 100 from the command queue logic 210. The MAC command generator 240 may decode the command queue to generate and output the MAC commands MAC_CMDs. The MAC commands MAC_CMDs outputted from the MAC command generator 240 may be transmitted to the PIM device 100. The data read operation for the first memory bank 111 and the second memory bank 112 of the PIM device 100 may be performed by the MAC commands MAC_CMDs outputted from the MAC command generator 240, and the MAC arithmetic operation of the MAC operator 120 may also be performed by the MAC commands MAC_CMDs outputted from the MAC command generator 240. The MAC commands MAC_CMDs and the MAC arithmetic operation of the PIM device 100 according to the MAC commands MAC_CMDs will be described in detail with reference to FIG. 3.

The address generator 250 may receive address information from the command queue logic 210. The address generator 250 may generate the bank selection signal BS for selecting one of the first and second memory banks 111 and 112 and may transmit the bank selection signal BS to the PIM device 100. In addition, the address generator 250 may generate the row address ADDR_R and the column address ADDR_C for accessing a region (e.g., memory cells) in the first or second memory bank 111 or 112 and may transmit the row address ADDR_R and the column address ADDR_C to the PIM device 100.

FIG. 3 illustrates the MAC commands MAC_CMDs outputted from the MAC command generator 240 included in the PIM system 1-1 according to the first embodiment of the present disclosure. As illustrated in FIG. 3, the MAC commands MAC_CMDs may include first to sixth MAC command signals. In an embodiment, the first MAC command signal may be a first MAC read signal MAC_RD_BK0, the second MAC command signal may be a second MAC read signal MAC_RD_BK1, the third MAC command signal may be a first MAC input latch signal MAC_L1, the fourth MAC command signal may be a second MAC input latch signal MAC_L2, the fifth MAC command signal may be a MAC output latch signal MAC_L3, and the sixth MAC command signal may be a MAC latch reset signal MAC_L_RST.

The first MAC read signal MAC_RD_BK0 may control an operation for reading first data (e.g., weight data) out of the first memory bank 111 to transmit the first data to the MAC operator 120. The second MAC read signal MAC_RD_BK1 may control an operation for reading second data (e.g., vector data) out of the second memory bank 112 to transmit the second data to the MAC operator 120. The first MAC input latch signal MAC_L1 may control an input latch operation of the weight data transmitted from the first memory bank 111 to the MAC operator 120. The second MAC input latch signal MAC_L2 may control an input latch operation of the vector data transmitted from the second memory bank 112 to the MAC operator 120. If the input latch operations of the weight data and the vector data are performed, the MAC operator 120 may perform the MAC arithmetic operation to generate MAC result data corresponding to the result of the MAC arithmetic operation. The MAC output latch signal MAC_L3 may control an output latch operation of the MAC result data generated by the MAC operator 120. And, the MAC latch reset signal MAC_L_RST may control an output operation of the MAC result data generated by the MAC operator 120 and a reset operation of an output latch included in the MAC operator 120.

The PIM system 1-1 according to the present embodiment may be configured to perform a deterministic MAC arithmetic operation. The term "deterministic MAC arithmetic operation" used in the present disclosure may be defined as the MAC arithmetic operation performed in the PIM system 1-1 during a predetermined fixed time. Thus, the MAC commands MAC_CMDs transmitted from the PIM controller 200 to the PIM device 100 may be sequentially generated with fixed time intervals. Accordingly, the PIM controller 200 does not require any extra end signals of various operations executed for the MAC arithmetic operation to generate the MAC commands MAC_CMDs for controlling the MAC arithmetic operation. In an embodiment, latencies of the various operations executed by MAC commands MAC_CMDs for controlling the MAC arithmetic operation may be set to have fixed values in order to perform the deterministic MAC arithmetic operation. In such a case, the MAC commands MAC_CMDs may be sequentially outputted from the PIM controller 200 with fixed time intervals corresponding to the fixed latencies.

For example, the MAC command generator 240 is configured to output the first MAC command at a first point in time. The MAC command generator 240 is configured to output the second MAC command at a second point in time when a first latency elapses from the first point in time. The first latency is set as the time it takes to read the first data out of the first storage region based on the first MAC command and to output the first data to the MAC operator. The MAC command generator 240 is configured to output the third MAC command at a third point in time when a second latency elapses from the second point in time. The second latency is set as the time it takes to read the second data out of the second storage region based on the second MAC command and to output the second data to the MAC operator. The MAC command generator 240 is configured to output the fourth MAC command at a fourth point in time when a third latency elapses from the third point in time. The third latency is set as the time it takes to latch the first data in the MAC operator based on the third MAC command. The MAC command generator 240 is configured to output the fifth MAC command at a fifth point in time when a fourth latency elapses from the fourth point in time. The fourth latency is set as the time it takes to latch the second data in the MAC operator based on the fourth MAC command and to perform the MAC arithmetic operation of the first and second data which are latched in the MAC operator. The MAC command generator 240 is configured to output the sixth MAC command at a sixth point in time when a fifth latency elapses from the fifth point in time. The fifth latency is set as the time it takes to perform an output latch operation of MAC result data generated by the MAC arithmetic operation.

FIG. 4 illustrates an example of the MAC operator 120 of the PIM device 100 included in the PIM system 1-1 according to the first embodiment of the present disclosure. Referring to FIG. 4, MAC operator 120 may be configured to include a data input circuit 121, a MAC circuit 122, and a data output circuit 123. The data input circuit 121 may include a first input latch 121-1 and a second input latch 121-2. The MAC circuit 122 may include a multiplication logic circuit 122-1 and an addition logic circuit 122-2. The data output circuit 123 may include an output latch 123-1, a transfer gate 123-2, a delay circuit 123-3, and an inverter 123-4. In an embodiment, the first input latch 121-1, the second input latch 121-2, and the output latch 123-1 may be realized using flip-flops.

The data input circuit 121 of the MAC operator 120 may be synchronized with the first MAC input latch signal MAC_L1 to latch first data DA1 transferred from the first memory bank 111 to the MAC circuit 122 through an internal data transmission line. In addition, the data input circuit 121 of the MAC operator 120 may be synchronized with the second MAC input latch signal MAC_L2 to latch second data DA2 transferred from the second memory bank 112 to the MAC circuit 122 through another internal data transmission line. Because the first MAC input latch signal MAC_L1 and the second MAC input latch signal MAC_L2 are sequentially transmitted from the MAC command generator 240 of the PIM controller 200 to the MAC operator 120 of the PIM device 100 with a predetermined time interval, the second data DA2 may be inputted to the MAC circuit 122 of the MAC operator 120 after the first data DA1 is inputted to the MAC circuit 122 of the MAC operator 120.

The MAC circuit 122 may perform the MAC arithmetic operation of the first data DA1 and the second data DA2 inputted through the data input circuit 121. The multiplication logic circuit 122-1 of the MAC circuit 122 may include a plurality of multipliers 122-11. Each of the multipliers 122-11 may perform a multiplying calculation of the first data DA1 outputted from the first input latch 121-1 and the second data DA2 outputted from the second input latch 121-2 and may output the result of the multiplying calculation. Bit values constituting the first data DA1 may be separately inputted to the multipliers 122-11. Similarly, bit values constituting the second data DA2 may also be separately inputted to the multipliers 122-11. For example, if the first data DA1 is represented by an 'N'-bit binary stream, the second data DA2 is represented by an 'N'-bit binary stream, and the number of the multipliers 122-11 is 'M', then 'N/M'-bit portions of the first data DA1 and 'N/M'-bit portions of the second data DA2 may be inputted to each of the multipliers 122-11.

The addition logic circuit 122-2 of the MAC circuit 122 may include a plurality of adders 122-21. Although not shown in the drawings, the plurality of adders 122-21 may be disposed to provide a tree structure including a plurality of stages. Each of the adders 122-21 disposed at a first stage may receive two sets of multiplication result data from two of the multipliers 122-11 included in the multiplication logic circuit 122-1 and may perform an adding calculation of the two sets of multiplication result data to output the addition result data. Each of the adders 122-21 disposed at a second stage may receive two sets of addition result data from two of the adders 122-21 disposed at the first stage and may perform an adding calculation of the two sets of addition result data to output the addition result data. The adder 122-21 disposed at a last stage may receive two sets of addition result data from two adders 122-21 disposed at the previous stage and may perform an adding calculation of the two sets of addition result data to output the addition result data. Although not shown in the drawings, the addition logic circuit 122-2 may further include an additional adder for performing an accumulative adding calculation of MAC result data DA_MAC outputted from the adder 122-21 disposed at the last stage and previous MAC result data DA_MAC stored in the output latch 123-1 of the data output circuit 123.

The data output circuit 123 may output the MAC result data DA_MAC outputted from the MAC circuit 122 to a data transmission line. Specifically, the output latch 123-1 of the data output circuit 123 may be synchronized with the MAC output latch signal MAC_L3 to latch the MAC result data DA_MAC outputted from the MAC circuit 122 and to output the latched data of the MAC result data DA_MAC. The MAC result data DA_MAC outputted from the output latch 123-1 may be fed back to the MAC circuit 122 for the accumulative adding calculation. In addition, the MAC result data DA_MAC may be inputted to the transfer gate 123-2. The output latch 123-1 may be initialized if a latch reset signal LATCH_RST is inputted to the output latch 123-1. In such a case, all of data latched by the output latch 123-1 may be removed. In an embodiment, the latch reset signal LATCH_RST may be activated by generation of the MAC latch reset signal MAC_L_RST and may be inputted to the output latch 123-1.

The MAC latch reset signal MAC_L_RST outputted from the MAC command generator 240 may be inputted to the transfer gate 123-2, the delay circuit 123-3, and the inverter 123-4. The inverter 123-4 may inversely buffer the MAC latch reset signal MAC_L_RST to output the inversely buffered signal of the MAC latch reset signal MAC_L_RST to the transfer gate 123-2. The transfer gate 123-2 may transfer the MAC result data DA_MAC from the output latch 123-1 to the data transmission line in response to the MAC latch reset signal MAC_L_RST. The delay circuit 123-3 may delay the MAC latch reset signal MAC_L_RST by a certain time to generate and output a latch control signal PINSTB.

Figure 5:
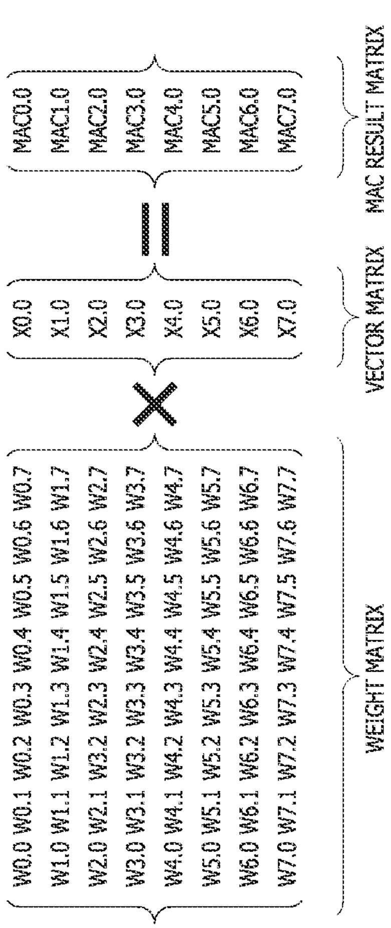
FIG. 5 illustrates an example of a MAC arithmetic operation performed in a PIM system according to a first embodiment of the present disclosure.

FIG. 5 illustrates an example of the MAC arithmetic operation performed in the PIM system 1-1 according to the first embodiment of the present disclosure. As illustrated in FIG. 5, the MAC arithmetic operation performed by the PIM system 1-1 may be executed though a matrix calculation. Specifically, the PIM device 100 may execute a matrix multiplying calculation of an 'M×N' weight matrix (e.g., '8×8' weight matrix) and a 'N×1' vector matrix (e.g., '8×1' vector matrix) according to control of the PIM controller 200 (where, 'M' and 'N' are natural numbers). Elements W0.0, . . . , and W7.7 constituting the weight matrix may correspond to the first data DA1 inputted to the MAC operator 120 from the first memory bank 111. Elements X0.0, . . . , and X7.0 constituting the vector matrix may correspond to the second data DA2 inputted to the MAC operator 120 from the second memory bank 112. Each of the elements W0.0, . . . , and W7.7 constituting the weight matrix may be represented by a binary stream having a plurality of bit values. In addition, each of the elements X0.0, . . . , and X7.0 constituting the vector matrix may also be represented by a binary stream having a plurality of bit values. The number of bits included in each of the elements W0.0, . . . , and W7.7 constituting the weight matrix may be equal to the number of bits included in each of the elements X0.0, . . . , and X7.0 constituting the vector matrix.

The matrix multiplying calculation of the weight matrix and the vector matrix may be appropriate for a multilayer perceptron-type neural network structure (hereinafter, referred to as an 'MLP-type neural network'). In general, the MLP-type neural network for executing deep learning may include an input layer, a plurality of hidden layers (e.g., at least three hidden layers), and an output layer. The matrix multiplying calculation (i.e., the MAC arithmetic operation) of the weight matrix and the vector matrix illustrated in FIG. 5 may be performed in one of the hidden layers. In a first hidden layer of the plurality of hidden layers, the MAC arithmetic operation may be performed using vector data inputted to the first hidden layer. However, in each of second to last hidden layers among the plurality of hidden layers, the MAC arithmetic operation may be performed using a calculation result of the previous hidden layer as the vector data.

FIG. 6 is a flowchart illustrating processes of the MAC arithmetic operation described with reference to FIG. 5, which are performed in the PIM system 1-1 according to the first embodiment of the present disclosure. In addition, FIGS. 7 to 13 are block diagrams illustrating the processes of the MAC arithmetic operation illustrated in FIG. 5, which are performed in the PIM system 1-1 according to the first embodiment of the present disclosure. Referring to FIGS. 6 to 13, before the MAC arithmetic operation is performed, the first data (i.e., the weight data) may be written into the first memory bank 111 at a step 301. Thus, the weight data may be stored in the first memory bank 111 of the PIM device 100. In the present embodiment, it may be assumed that the weight data are the elements W0.0, . . . , and W7.7 constituting the weight matrix of FIG. 5. The integer before the decimal point is one less than a row number, and the integer after the decimal point is one less than a column number. Thus, for example, the weight W0.0 represents the element of the first row and the first column of the weight matrix.

At a step 302, whether an inference is requested may be determined. An inference request signal may be transmitted from an external device located outside of the PIM system 1-1 to the PIM controller 200 of the PIM system 1-1. An inference request, in some instances, may be based on user input. An inference request may initiate a calculation performed by the PIM system 1-1 to reach a determination based on input data. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 5. If the inference request signal is transmitted to the PIM controller 200 at the step 302, then the PIM controller 200 may write the vector data transmitted with the inference request signal into the second memory bank 112 at a step 303. Accordingly, the vector data may be stored in the second memory bank 112 of the PIM device 100.

Figure 7:
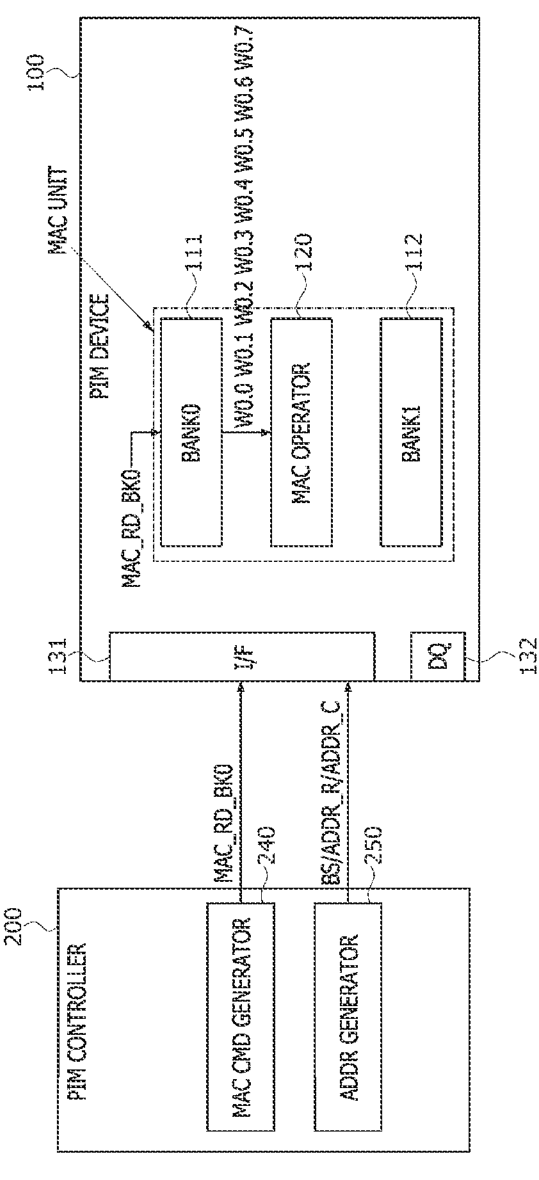
FIGS. 7 to 13 are block diagrams illustrating processes of the MAC arithmetic operation illustrated in FIG. 5 in a PIM system according to a first embodiment of the present disclosure.

At a step 304, the MAC command generator 240 of the PIM controller 200 may generate and transmit the first MAC read signal MAC_RD_BK0 to the PIM device 100, as illustrated in FIG. 7. In such a case, the address generator 250 of the PIM controller 200 may generate and transmit the bank selection signal BS and the row/column address ADDR_R/ADDR_C to the PIM device 100. The bank selection signal BS may be generated to select the first memory bank 111 of the first and second memory banks 111 and 112. Thus, the first MAC read signal MAC_RD_BK0 may control the data read operation for the first memory bank 111 of the PIM device 100. The first memory bank 111 may output and transmit the elements W0.0, . . . , and W0.7 in the first row of the weight matrix of the weight data stored in a region of the first memory bank 111, which is selected by the row/column address ADDR_R/ADDR_C, to the MAC operator 120 in response to the first MAC read signal MAC_RD_BK0. In an embodiment, the data transmission from the first memory bank 111 to the MAC operator 120 may be executed through a global input/output (hereinafter, referred to as 'GIO') line which is provided as a data transmission path in the PIM device 100. Alternatively, the data transmission from the first memory bank 111 to the MAC operator 120 may be executed through a first bank input/output (hereinafter, referred to as 'BIO') line which is provided specifically for data transmission between the first memory bank 111 and the MAC operator 120.

Figure 8:
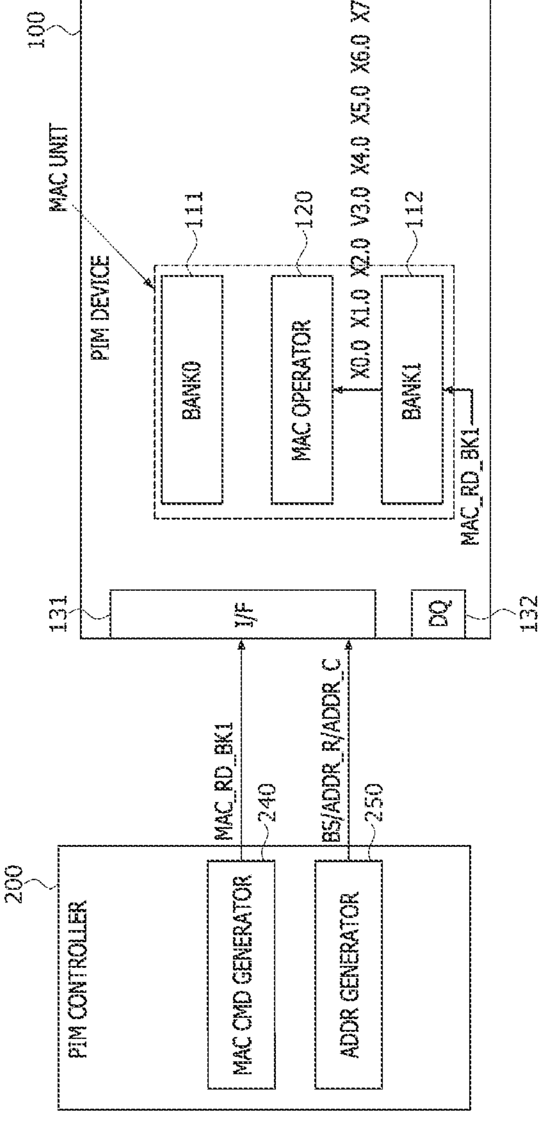

At a step 305, the MAC command generator 240 of the PIM controller 200 may generate and transmit the second MAC read signal MAC_RD_BK1 to the PIM device 100, as illustrated in FIG. 8. In such a case, the address generator 250 of the PIM controller 200 may generate and transmit the bank selection signal BS for selecting the second memory bank 112 and the row/column address ADDR_R/ADDR_C to the PIM device 100. The second MAC read signal MAC_RD_BK1 may control the data read operation for the second memory bank 112 of the PIM device 100. The second memory bank 112 may output and transmit the elements X0.0, . . . , and X7.0 in the first column of the vector matrix corresponding to the vector data stored in a region of the second memory bank 112, which is selected by the row/column address ADDR_R/ADDR_C, to the MAC operator 120 in response to the second MAC read signal MAC_RD_BK1. In an embodiment, the data transmission from the second memory bank 112 to the MAC operator 120 may be executed through the GIO line in the PIM device 100. Alternatively, the data transmission from the second memory bank 112 to the MAC operator 120 may be executed through a second BIO line which is provided specifically for data transmission between the second memory bank 112 and the MAC operator 120.

Figure 9:
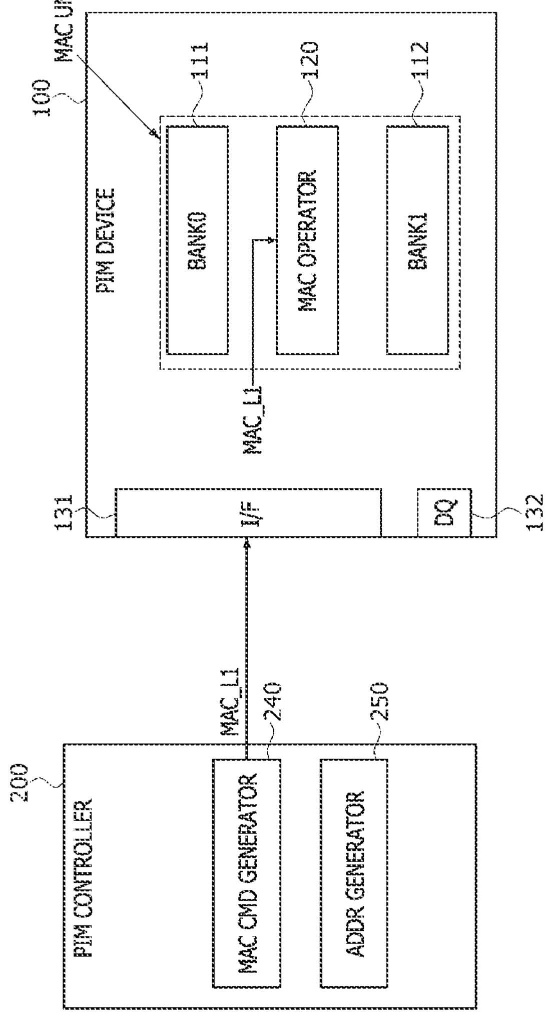
Figure 11:
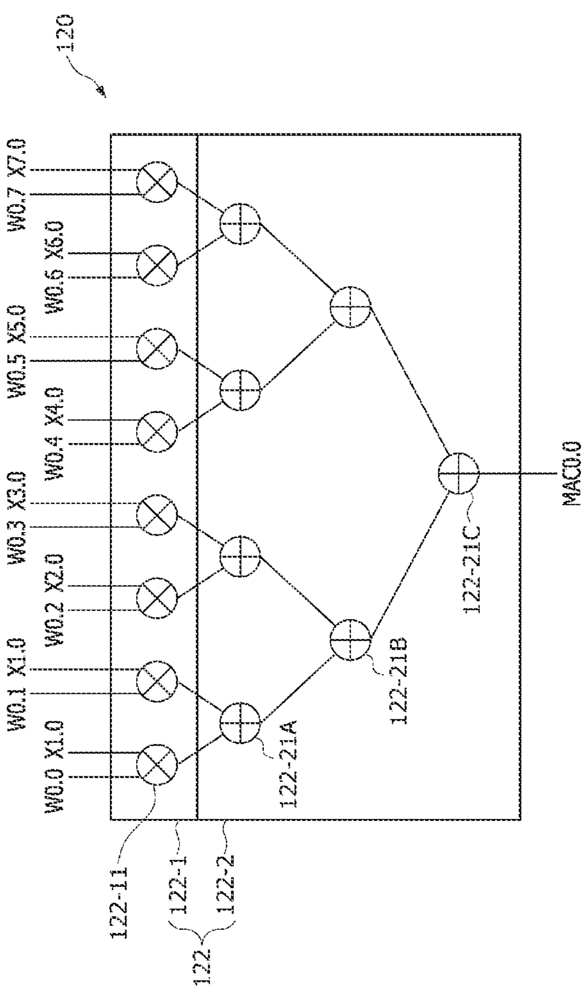

At a step 306, the MAC command generator 240 of the PIM controller 200 may generate and transmit the first MAC input latch signal MAC_L1 to the PIM device 100, as illustrated in FIG. 9. The first MAC input latch signal MAC_L1 may control the input latch operation of the first data for the MAC operator 120 of the PIM device 100. The elements W0.0, . . . , and W0.7 in the first row of the weight matrix may be inputted to the MAC circuit 122 of the MAC operator 120 by the input latch operation, as illustrated in FIG. 11. The MAC circuit 122 may include the plurality of multipliers 122-11 (e.g., eight multipliers 122-11), the number of which is equal to the number of columns of the weight matrix. In such a case, the elements W0.0, . . . , and W0.7 in the first row of the weight matrix may be inputted to the eight multipliers 122-11, respectively.

Figure 10:
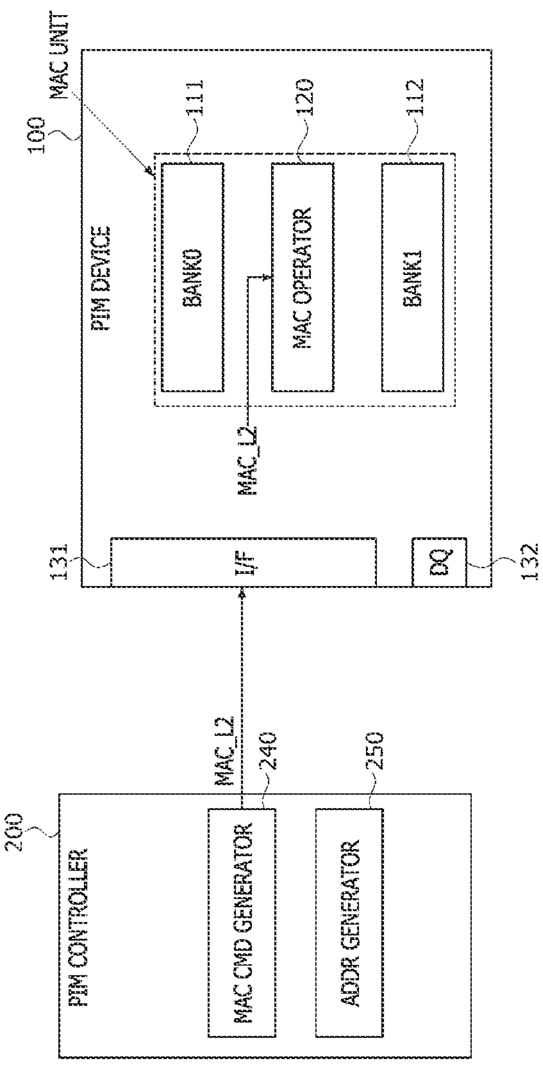

At a step 307, the MAC command generator 240 of the PIM controller 200 may generate and transmit the second MAC input latch signal MAC_L2 to the PIM device 100, as illustrated in FIG. 10. The second MAC input latch signal MAC_L2 may control the input latch operation of the second data for the MAC operator 120 of the PIM device 100. The elements X0.0, . . . , and X7.0 in the first column of the vector matrix may be inputted to the MAC circuit 122 of the MAC operator 120 by the input latch operation, as illustrated in FIG. 11. In such a case, the elements X0.0, . . . , and X7.0 in the first column of the vector matrix may be inputted to the eight multipliers 122-11, respectively.

At a step 308, the MAC circuit 122 of the MAC operator 120 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. For example, the scalar product is calculated of the Rth '1×N' row vector of the 'M×N' weight matrix and the 'N×1' vector matrix as an 'R×1' element of the 'M×1' MAC result matrix. For R=1, the scalar product of the first row of the weight matrix and the first column of the vector matrix shown in FIG. 5 is W0.0*X0.0+W0.1*X1.0+W0.2*X2.0+W0.3*X3.0+W0.4*X4.0+W0.5*X5.0+W0.6*X6.0+W0.7*X7.0. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2, as illustrated in FIG. 11, may include four adders 122-21A disposed at a first stage, two adders 122-21B disposed at a second stage, and an adder 122-21C disposed at a third stage.

Each of the adders 122-21A disposed at the first stage may receive output data of two of the multipliers 122-11 and may perform an adding calculation of the output data of the two multipliers 122-11 to output the result of the adding calculation. Each of the adders 122-21B disposed at the second stage may receive output data of two of the adders 122-21A disposed at the first stage and may perform an adding calculation of the output data of the two adders 122-21A to output the result of the adding calculation. The adder 122-21C disposed at the third stage may receive output data of two of the adders 122-21B disposed at the second stage and may perform an adding calculation of the output data of the two adders 122-21B to output the result of the adding calculation. The output data of the addition logic circuit 122-2 may correspond to result data (i.e., MAC result data) of the MAC arithmetic operation of the first row included in the weight matrix and the column included in the vector matrix. Thus, the output data of the addition logic circuit 122-2 may correspond to an element MAC0.0 located at a first row of an '8×1' MAC result matrix having eight elements of MAC0.0, . . . , and MAC7.0, as illustrated in FIG. 5. The output data MAC0.0 of the addition logic circuit 122-2 may be inputted to the output latch 123-1 disposed in the data output circuit 123 of the MAC operator 120, as described with reference to FIG. 4.

Figure 12:
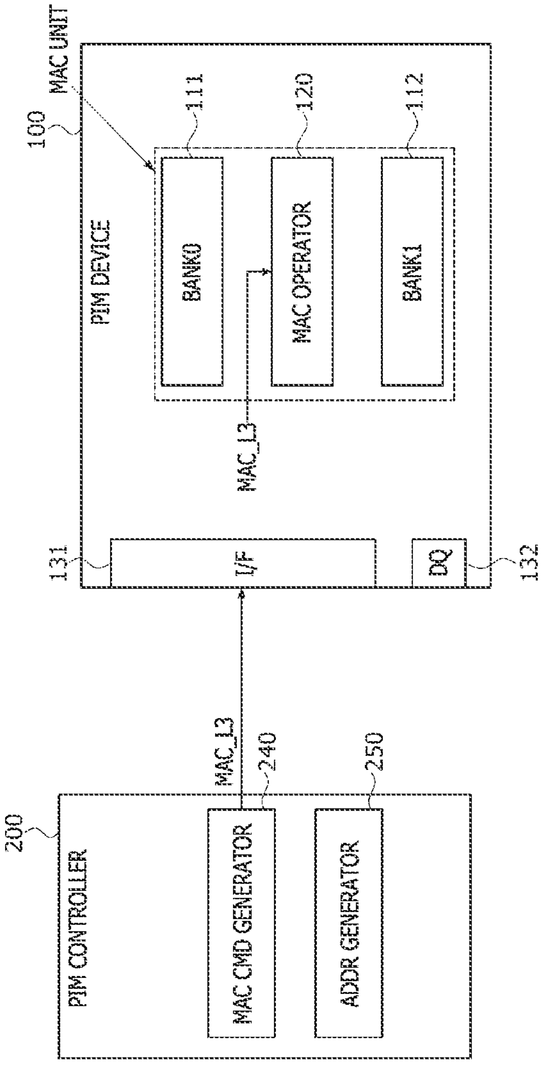

At a step 309, the MAC command generator 240 of the PIM controller 200 may generate and transmit the MAC output latch signal MAC_L3 to the PIM device 100, as illustrated in FIG. 12. The MAC output latch signal MAC_L3 may control the output latch operation of the MAC result data MAC0.0 performed by the MAC operator 120 of the PIM device 100. The MAC result data MAC0.0 inputted from the MAC circuit 122 of the MAC operator 120 may be outputted from the output latch 123-1 in synchronization with the MAC output latch signal MAC_L3, as described with reference to FIG. 4. The MAC result data MAC0.0 outputted from the output latch 123-1 may be inputted to the transfer gate 123-2 of the data output circuit 123.

Figure 13:
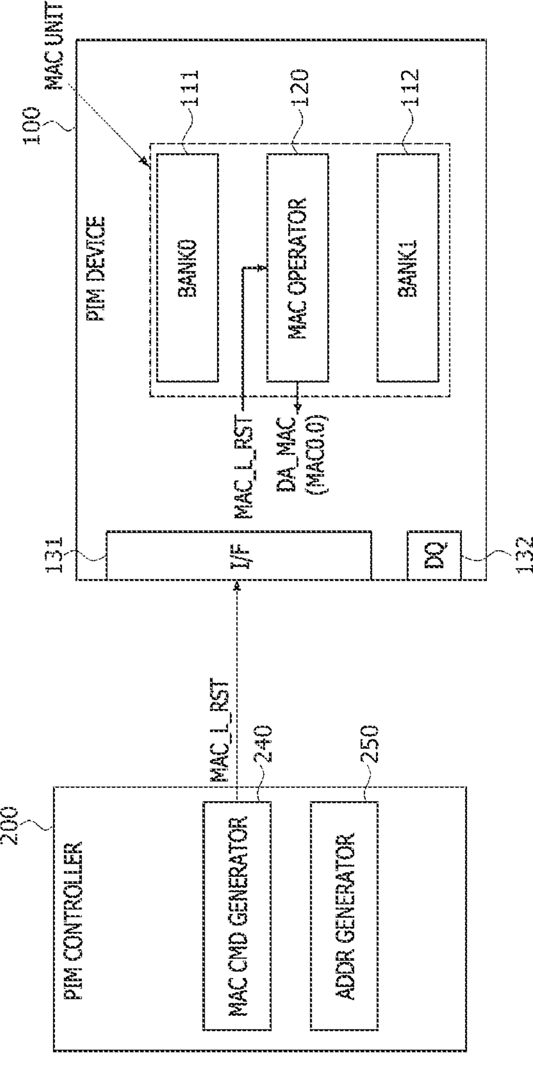

At a step 310, the MAC command generator 240 of the PIM controller 200 may generate and transmit the MAC latch reset signal MAC_L_RST to the PIM device 100, as illustrated in FIG. 13. The MAC latch reset signal MAC_L_RST may control an output operation of the MAC result data MAC0.0 generated by the MAC operator 120 and a reset operation of the output latch included in the MAC operator 120. As described with reference to FIG. 4, the transfer gate 123-2 receiving the MAC result data MAC0.0 from the output latch 123-1 of the MAC operator 120 may be synchronized with the MAC latch reset signal MAC_L_RST to output the MAC result data MAC0.0. In an embodiment, the MAC result data MAC0.0 outputted from the MAC operator 120 may be stored into the first memory bank 111 or the second memory bank 112 through the first BIO line or the second BIO line in the PIM device 100.

At a step 311, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 311. At a step 312, whether the row number changed at the step 311 is greater than the row number of the last row (i.e., the eighth row of the current example) of the weight matrix may be determined. Because the row number of the weight matrix is changed to '2' at the step 311, a process of the MAC arithmetic operation may be fed back to the step 304.

If the process of the MAC arithmetic operation is fed back to the step 304 from the step 312, then the same processes as described with reference to the steps 304 to 310 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 304 at the step 312, then the processes from the step 304 to the step 311 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 311, the MAC arithmetic operation may terminate because the row number of '9' is greater than the last row number of '8' at the step 312.

Figure 14:
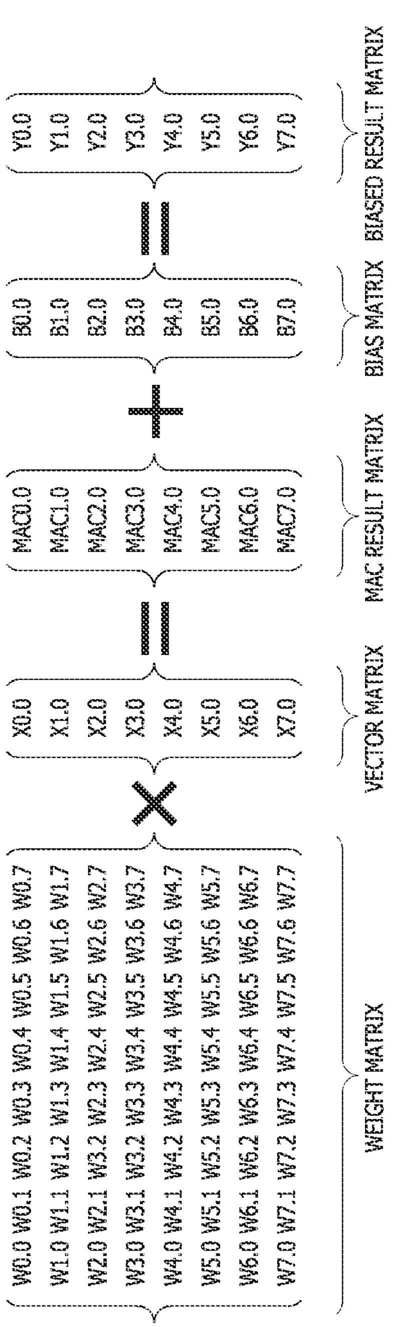
FIG. 14 illustrates another example of a MAC arithmetic operation performed in a PIM system according to a first embodiment of the present disclosure.

FIG. 14 illustrates another example of a MAC arithmetic operation performed in the PIM system 1-1 according to the first embodiment of the present disclosure. As illustrated in FIG. 14, the MAC arithmetic operation performed by the PIM system 1-1 may further include an adding calculation of the MAC result matrix and a bias matrix. Specifically, as described with reference to FIG. 5, the PIM device 100 may execute the matrix multiplying calculation of the '8×8' weight matrix and the '8×1' vector matrix according to control of the PIM controller 200. As a result of the matrix multiplying calculation of the '8×8' weight matrix and the '8×1' vector matrix, the '8×1' MAC result matrix having the eight elements MAC0.0, . . . , and MAC7.0 may be generated. The '8×1' MAC result matrix may be added to a '8×1' bias matrix. The '8×1' bias matrix may have elements B0.0, . . . , and B7.0 corresponding to bias data. The bias data may be set to reduce an error of the MAC result matrix. As a result of the adding calculation of the MAC result matrix and the bias matrix, a '8×1' biased result matrix having eight elements Y0.0, . . . , and Y7.0 may be generated.

Figure 16:
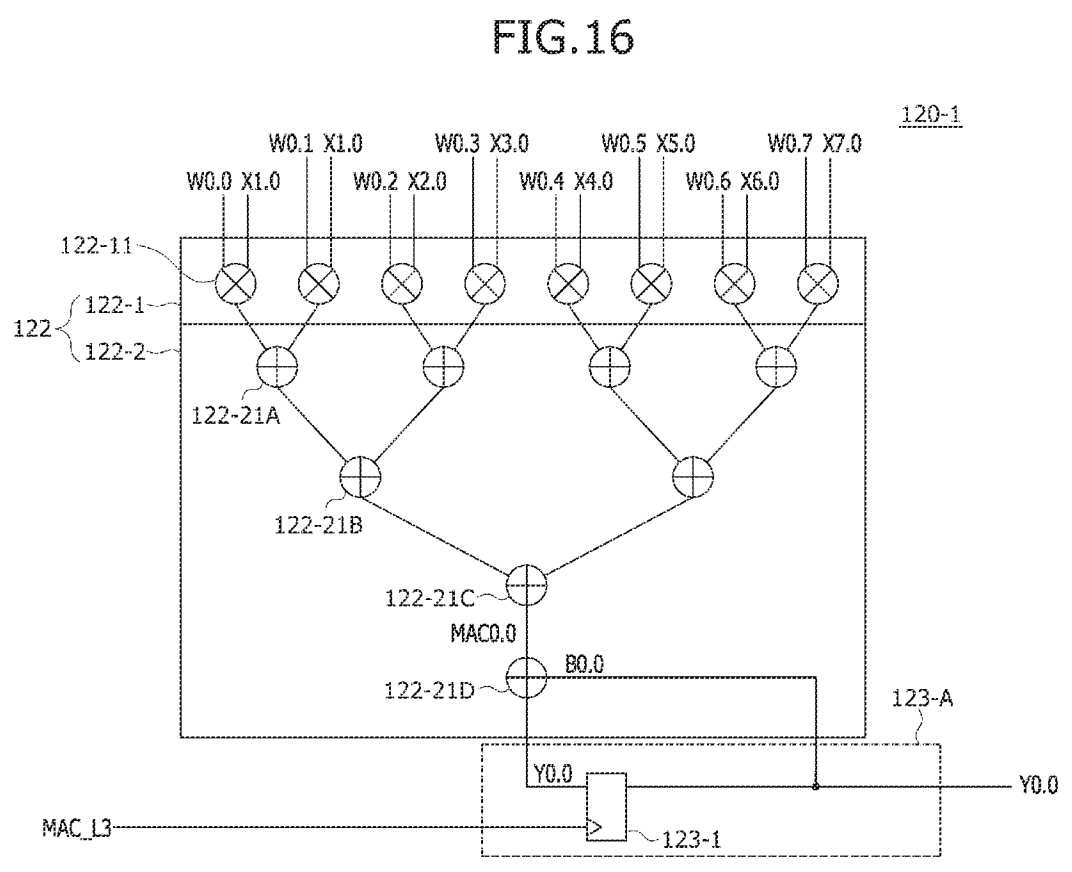

FIG. 15 is a flowchart illustrating processes of the MAC arithmetic operation described with reference to FIG. 14 in the PIM system 1-1 according to the first embodiment of the present disclosure. Moreover, FIG. 16 illustrates an example of a configuration of a MAC operator 120-1 for performing the MAC arithmetic operation of FIG. 14 in the PIM system 1-1 according to the first embodiment of the present disclosure. In FIG. 16, the same reference numerals or the same reference symbols as used in FIG. 4 denote the same elements, and the detailed descriptions of the same elements as indicated in the previous embodiment will be omitted hereinafter. Referring to FIG. 15, the first data (i.e., the weight data) may be written into the first memory bank 111 at a step 321 to perform the MAC arithmetic operation in the PIM device 100. Thus, the weight data may be stored in the first memory bank 111 of the PIM device 100. In the present embodiment, it may be assumed that the weight data are the elements W0.0, . . . , and W7.7 constituting the weight matrix of FIG. 14.

At a step 322, whether an inference is requested may be determined. An inference request signal may be transmitted from an external device located outside of the PIM system 1-1 to the PIM controller 200 of the PIM system 1-1. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 14. If the inference request signal is transmitted to the PIM controller 200 at the step 322, the PIM controller 200 may write the vector data transmitted with the inference request signal into the second memory bank 112 at a step 323. Accordingly, the vector data may be stored in the second memory bank 112 of the PIM device 100.

At a step 324, the output latch of the MAC operator may be initially set to have the bias data and the initially set bias data may be fed back to an accumulative adder of the MAC operator. This process is executed to perform the matrix adding calculation of the MAC result matrix and the bias matrix, which is described with reference to FIG. 14. In other words, the output latch 123-1 in the data output circuit 123-A of the MAC operator (120-1) is set to have the bias data. Because the matrix multiplying calculation is executed for the first row of the weight matrix, the output latch 123-1 may be initially set to have the element B0.0 located at a cross point of the first row and the first column of the bias matrix as the bias data. The output latch 123-1 may output the bias data B0.0, and the bias data B0.0 outputted from the output latch 123-1 may be inputted to the accumulative adder 122-21D of the addition logic circuit 122-2, as illustrated in FIG. 16.

In an embodiment, in order to output the bias data B0.0 out of the output latch 123-1 and to feed back the bias data B0.0 to the accumulative adder 122-21D, the MAC command generator 240 of the PIM controller 200 may transmit the MAC output latch signal MAC_L3 to the MAC operator 120-1 of the PIM device 100. When a subsequent MAC arithmetic operation is performed, the accumulative adder 122-21D of the MAC operator 120-1 may add the MAC result data MAC0.0 outputted from the adder 122-21C disposed at the last stage to the bias data B0.0 which is fed back from the output latch 123-1 to generate the biased result data Y0.0 and may output the biased result data Y0.0 to the output latch 123-1. The biased result data Y0.0 may be outputted from the output latch 123-1 in synchronization with the MAC output latch signal MAC_L3 transmitted in a subsequent process.

In a step 325, the MAC command generator 240 of the PIM controller 200 may generate and transmit the first MAC read signal MAC_RD_BK0 to the PIM device 100. In addition, the address generator 250 of the PIM controller 200 may generate and transmit the bank selection signal BS and the row/column address ADDR_R/ADDR_C to the PIM device 100. The step 325 may be executed in the same way as described with reference to FIG. 7. In a step 326, the MAC command generator 240 of the PIM controller 200 may generate and transmit the second MAC read signal MAC_RD_BK1 to the PIM device 100. In addition, the address generator 250 of the PIM controller 200 may generate and transmit the bank selection signal BS for selecting the second memory bank 112 and the row/column address ADDR_R/ADDR_C to the PIM device 100. The step 326 may be executed in the same way as described with reference to FIG. 8.

At a step 327, the MAC command generator 240 of the PIM controller 200 may generate and transmit the first MAC input latch signal MAC_L1 to the PIM device 100. The step 327 may be executed in the same way as described with reference to FIG. 9. The first MAC input latch signal MAC_L1 may control the input latch operation of the first data for the MAC operator 120 of the PIM device 100. The input latch operation of the first data may be performed in the same way as described with reference to FIG. 11. At a step 328, the MAC command generator 240 of the PIM controller 200 may generate and transmit the second MAC input latch signal MAC_L2 to the PIM device 100. The step 328 may be executed in the same way as described with reference to FIG. 10. The second MAC input latch signal MAC_L2 may control the input latch operation of the second data for the MAC operator 120 of the PIM device 100. The input latch operation of the second data may be performed in the same way as described with reference to FIG. 11.

At a step 329, the MAC circuit 122 of the MAC operator 120 may perform the MAC arithmetic operation of an Rth row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may include the four adders 122-21A disposed at the first stage, the two adders 122-21B disposed at the second stage, the adder 122-21C disposed at the third stage, and the accumulative adder 122-21D, as illustrated in FIG. 16. The accumulative adder 122-21D may add output data of the adder 122-21C to feedback data fed back from the output latch 123-1 to output the result of the adding calculation. The output data of the adder 122-21C may be the matrix multiplying result MAC0.0, which corresponds to the result of the matrix multiplying calculation of the first row of the weight matrix and the first column of the vector matrix. The accumulative adder 122-21D may add the output data MAC0.0 of the adder 122-21C to the bias data B0.0 fed back from the output latch 123-1 to output the result of the adding calculation. The output data Y0.0 of the accumulative adder 122-21D may be inputted to the output latch 123-1 disposed in a data output circuit 123-A of the MAC operator 120-1.

At a step 330, the MAC command generator 240 of the PIM controller 200 may generate and transmit the MAC output latch signal MAC_L3 to the PIM device 100. The step 330 may be executed in the same way as described with reference to FIG. 12. The MAC output latch signal MAC_L3 may control the output latch operation of the MAC result data MAC0.0, which is performed by the MAC operator 120-1 of the PIM device 100. The biased result data Y0.0 transmitted from the MAC circuit 122 of the MAC operator 120 to the output latch 123-1 may be outputted from the output latch 123-1 in synchronization with the MAC output latch signal MAC_L3. The biased result data Y0.0 outputted from the output latch 123-1 may be inputted to the transfer gate 123-2.

At a step 331, the MAC command generator 240 of the PIM controller 200 may generate and transmit the MAC latch reset signal MAC_L_RST to the PIM device 100. The step 331 may be executed in the same way as described with reference to FIG. 13. The MAC latch reset signal MAC_L_RST may control an output operation of the biased result data Y0.0 generated by the MAC operator 120 and a reset operation of the output latch 123-1 included in the MAC operator 120. The transfer gate 123-2 receiving the biased result data Y0.0 from the output latch 123-1 of the data output circuit 123-A included in the MAC operator 120 may be synchronized with the MAC latch reset signal MAC_L_RST to output the biased result data Y0.0. In an embodiment, the biased result data Y0.0 outputted from the MAC operator 120 may be stored into the first memory bank 111 or the second memory bank 112 through the first BIO line or the second BIO line in the PIM device 100.

At a step 332, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 332. At a step 333, whether the row number changed at the step 332 is greater than the row number of the last row (i.e., the eighth row of the current example) of the weight matrix may be determined. Because the row number of the weight matrix is changed to '2' at the step 332, a process of the MAC arithmetic operation may be fed back to the step 324.

If the process of the MAC arithmetic operation is fed back to the step 324 from the step 333, then the same processes as described with reference to the steps 324 to 331 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix and the bias data B0.0 in the output latch 123-1 initially set at the step 324 may be changed into the bias data B1.0. If the process of the MAC arithmetic operation is fed back to the step 324 at the step 333, the processes from the step 324 to the step 332 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 332, the MAC arithmetic operation may terminate because the row number of '9' is greater than the last row number of '8' at the step 333.

FIG. 17 illustrates yet another example of a MAC arithmetic operation performed in the PIM system 1-1 according to the first embodiment of the present disclosure. As illustrated in FIG. 17, the MAC arithmetic operation performed by the PIM system 1-1 may further include a process for applying the biased result matrix to an activation function. Specifically, as described with reference to FIG. 14, the PIM device 100 may execute the matrix multiplying calculation of the '8×8' weight matrix and the '8×1' vector matrix according to control of the PIM controller 200 to generate the MAC result matrix. In addition, the MAC result matrix may be added to the bias matrix to generate biased result matrix.

The biased result matrix may be applied to the activation function. The activation function means a function which is used to calculate a unique output value by comparing a MAC calculation value with a critical value in an MLP-type neural network. In an embodiment, the activation function may be a unipolar activation function which generates only positive output values or a bipolar activation function which generates negative output values as well as positive output values. In different embodiments, the activation function may include a sigmoid function, a hyperbolic tangent (Tanh) function, a rectified linear unit (ReLU) function, a leaky ReLU function, an identity function, and a maxout function.

Figure 18:
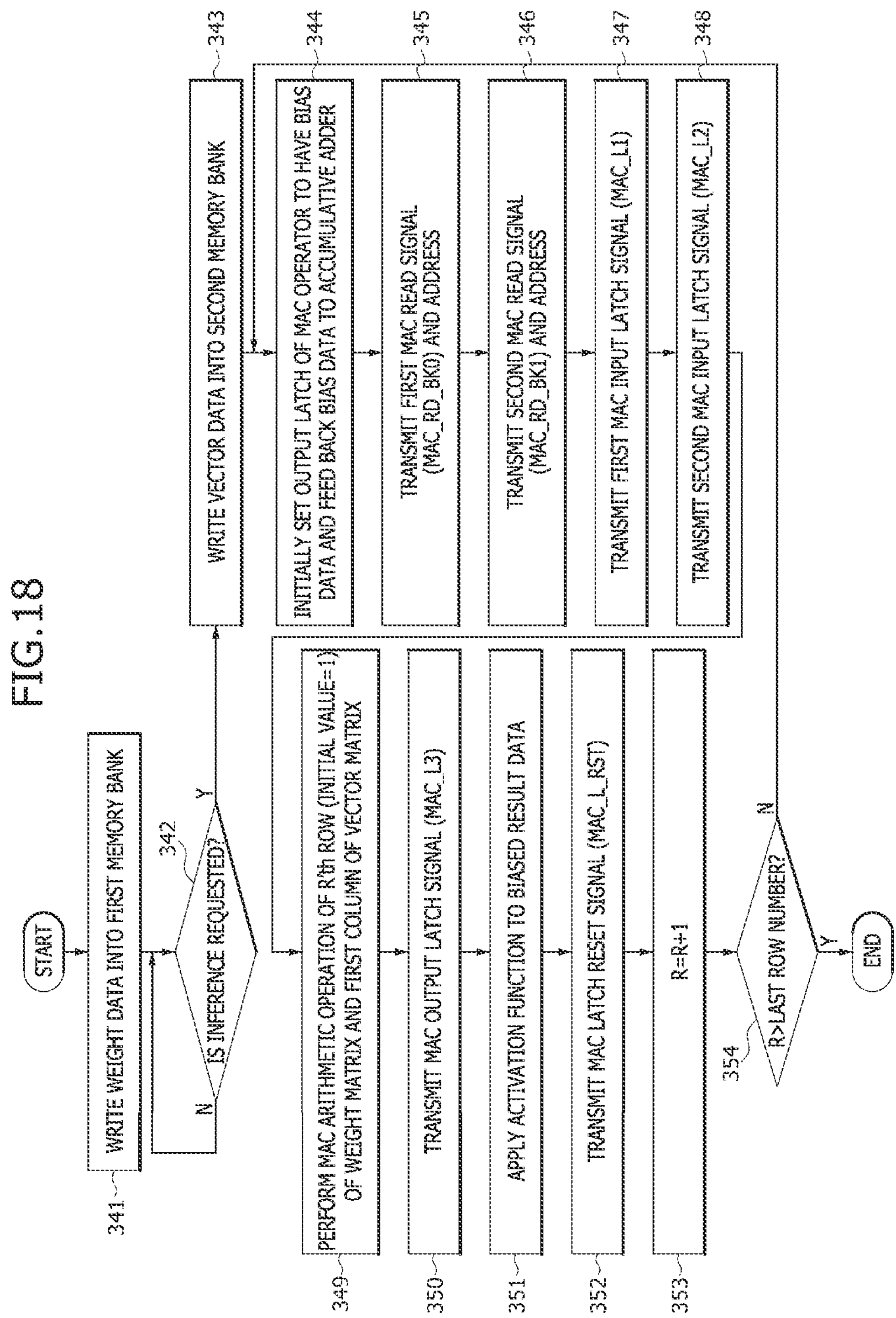
FIG. 18 is a flowchart illustrating processes of the MAC arithmetic operation illustrated in FIG. 17 in a PIM system according to a first embodiment of the present disclosure.

FIG. 18 is a flowchart illustrating processes of the MAC arithmetic operation described with reference to FIG. 17 in the PIM system 1-1 according to the first embodiment of the present disclosure. Moreover, FIG. 19 illustrates an example of a configuration of a MAC operator 120-2 for performing the MAC arithmetic operation of FIG. 17 in the PIM system 1-1 according to the first embodiment of the present disclosure. In FIG. 19, the same reference numerals or the same reference symbols as used in FIG. 4 denote the same elements, and the detailed descriptions of the same elements as mentioned in the previous embodiment will be omitted hereinafter. Referring to FIG. 18, the first data (i.e., the weight data) may be written into the first memory bank 111 at a step 341 to perform the MAC arithmetic operation in the PIM device 100. Thus, the weight data may be stored in the first memory bank 111 of the PIM device 100. In the present embodiment, it may be assumed that the weight data are the elements W0.0, . . . , and W7.7 constituting the weight matrix of FIG. 17.

At a step 342, whether an inference is requested may be determined. An inference request signal may be transmitted from an external device located outside of the PIM system 1-1 to the PIM controller 200 of the PIM system 1-1. In an embodiment, if no inference request signal is transmitted to the PIM controller 200, the PIM system 1-1 may be in a standby mode until the inference request signal is transmitted to the PIM controller 200. Alternatively, if no inference request signal is transmitted to the PIM controller 200, the PIM system 1-1 may perform operations (e.g., the data read/write operations) other than the MAC arithmetic operation in the memory mode until the inference request signal is transmitted to the PIM controller 200. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 17. If the inference request signal is transmitted to the PIM controller 200 at the step 342, then the PIM controller 200 may write the vector data transmitted with the inference request signal into the second memory bank 112 at a step 343. Accordingly, the vector data may be stored in the second memory bank 112 of the PIM device 100.

At a step 344, an output latch of a MAC operator may be initially set to have bias data and the initially set bias data may be fed back to an accumulative adder of the MAC operator. This process is executed to perform the matrix adding calculation of the MAC result matrix and the bias matrix, which is described with reference to FIG. 17. That is, as illustrated in FIG. 19, the output latch 123-1 of the MAC operator (120-2 of FIG. 19) may be initially set to have the bias data of the bias matrix. Because the matrix multiplying calculation is executed for the first row of the weight matrix, the element B0.0 located at first row and the first column of the bias matrix may be initially set as the bias data in the output latch 123-1. The output latch 123-1 may output the bias data B0.0, and the bias data B0.0 outputted from the output latch 123-1 may be inputted to the accumulative adder 122-21D of the MAC operator 120-2.

In an embodiment, in order to output the bias data B0.0 out of the output latch 123-1 and to feed back the bias data B0.0 to the accumulative adder 122-21D, the MAC command generator 240 of the PIM controller 200 may transmit the MAC output latch signal MAC_L3 to the MAC operator 120-2 of the PIM device 100. When a subsequent MAC arithmetic operation is performed, the accumulative adder 122-21D of the MAC operator 120-2 may add the MAC result data MAC0.0 outputted from the adder 122-21C disposed at the last stage to the bias data B0.0 which is fed back from the output latch 123-1 to generate the biased result data Y0.0 and may output the biased result data Y0.0 to the output latch 123-1. As illustrated in FIG. 19, the biased result data Y0.0 may be transmitted from the output latch 123-1 to an activation function logic circuit 123-5 disposed in a data output circuit 123-B of the MAC operator 120-2 in synchronization with the MAC output latch signal MAC_L3 transmitted in a subsequent process.

In a step 345, the MAC command generator 240 of the PIM controller 200 may generate and transmit the first MAC read signal MAC_RD_BK0 to the PIM device 100. In addition, the address generator 250 of the PIM controller 200 may generate and transmit the bank selection signal BS and the row/column address ADDR_R/ADDR_C to the PIM device 100. The step 345 may be executed in the same way as described with reference to FIG. 7. In a step 346, the MAC command generator 240 of the PIM controller 200 may generate and transmit the second MAC read signal MAC_RD_BK1 to the PIM device 100. In addition, the address generator 250 of the PIM controller 200 may generate and transmit the bank selection signal BS for selecting the second memory bank 112 and the row/column address ADDR_R/ADDR_C to the PIM device 100. The step 346 may be executed in the same way as described with reference to FIG. 8.

At a step 347, the MAC command generator 240 of the PIM controller 200 may generate and transmit the first MAC input latch signal MAC_L1 to the PIM device 100. The step 347 may be executed in the same way as described with reference to FIG. 9. The first MAC input latch signal MAC_L1 may control the input latch operation of the first data for the MAC operator 120 of the PIM device 100. The input latch operation of the first data may be performed in the same way as described with reference to FIG. 11. At a step 348, the MAC command generator 240 of the PIM controller 200 may generate and transmit the second MAC input latch signal MAC_L2 to the PIM device 100. The step 348 may be executed in the same way as described with reference to FIG. 10. The second MAC input latch signal MAC_L2 may control the input latch operation of the second data for the MAC operator 120 of the PIM device 100. The input latch operation of the second data may be performed in the same way as described with reference to FIG. 11.

At a step 349, the MAC circuit 122 of the MAC operator 120 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may include the four adders 122-21A disposed at the first stage, the two adders 122-21B disposed at the second stage, the adder 122-21C disposed at the third stage, and the accumulative adder 122-21D, as illustrated in FIG. 19. The accumulative adder 122-21D may add output data of the adder 122-21C to feedback data fed back from the output latch 123-1 to output the result of the adding calculation. The output data of the adder 122-21C may be the element MAC0.0 of the '8×1' MAC result matrix, which corresponds to the result of the matrix multiplying calculation of the first row of the weight matrix and the first column of the vector matrix. The accumulative adder 122-21D may add the output data MAC0.0 of the adder 122-21C to the bias data B0.0 fed back from the output latch 123-1 to output the result of the adding calculation. The output data Y0.0 of the accumulative adder 122-21D may be inputted to the output latch 123-1 disposed in the data output circuit 123-A of the MAC operator 120.

At a step 350, the MAC command generator 240 of the PIM controller 200 may generate and transmit the MAC output latch signal MAC_L3 to the PIM device 100. The step 350 may be executed in the same way as described with reference to FIG. 12. The MAC output latch signal MAC_L3 may control the output latch operation of the output latch 123-1 included in the MAC operator 120 of the PIM device 100. The biased result data Y0.0 transmitted from the MAC circuit 122 of the MAC operator 120 to the output latch 123-1 may be outputted from the output latch 123-1 in synchronization with the MAC output latch signal MAC_L3. The biased result data Y0.0 outputted from the output latch 123-1 may be inputted to the activation function logic circuit 123-5. At a step 351, the activation function logic circuit 123-5 may apply an activation function to the biased result data Y0.0 to generate a final output value, and the final output value may be inputted to the transfer gate (123-2 of FIG. 4). This, for example, is the final output value for the current of R which is incremented in step 354.

At a step 352, the MAC command generator 240 of the PIM controller 200 may generate and transmit the MAC latch reset signal MAC_L_RST to the PIM device 100. The step 352 may be executed in the same way as described with reference to FIG. 13. The MAC latch reset signal MAC_L_RST may control an output operation of the final output value generated by the MAC operator 120 and a reset operation of the output latch 123-1 included in the MAC operator 120. The transfer gate 123-2 receiving the final output value from the activation function logic circuit 123-5 of the data output circuit 123-B included in the MAC operator 120 may be synchronized with the MAC latch reset signal MAC_L_RST to output the final output value. In an embodiment, the final output value outputted from the MAC operator 120 may be stored into the first memory bank 111 or the second memory bank 112 through the first BIO line or the second BIO line in the PIM device 100.

At a step 353, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 353. At a step 354, whether the row number changed at the step 353 is greater than the row number of the last row (i.e., the eighth row) of the weight matrix may be determined. Because the row number of the weight matrix is changed to '2' at the step 353, a process of the MAC arithmetic operation may be fed back to the step 344.

If the process of the MAC arithmetic operation is fed back to the step 344 from the step 354, the same processes as described with reference to the steps 344 to 354 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix, and the bias data B0.0 in the output latch 123-1 initially set at the step 344 may be changed to the bias data B1.0. If the process of the MAC arithmetic operation is fed back to the step 344 from the step 354, the processes from the step 344 to the step 354 may be iteratively performed until the MAC arithmetic operation is performed for all of the rows of the weight matrix with the vector matrix. For an embodiment, a plurality of final output values, namely, one final output value for each incremented value of R, represents an 'N×1' final result matrix. If the MAC arithmetic operation for the eighth row of the weight matrix terminates and the row number of the weight matrix changes from '8' to '9' at the step 354, the MAC arithmetic operation may terminate because the row number of '9' is greater than the last row number of '8' at the step 354.

Figure 20:
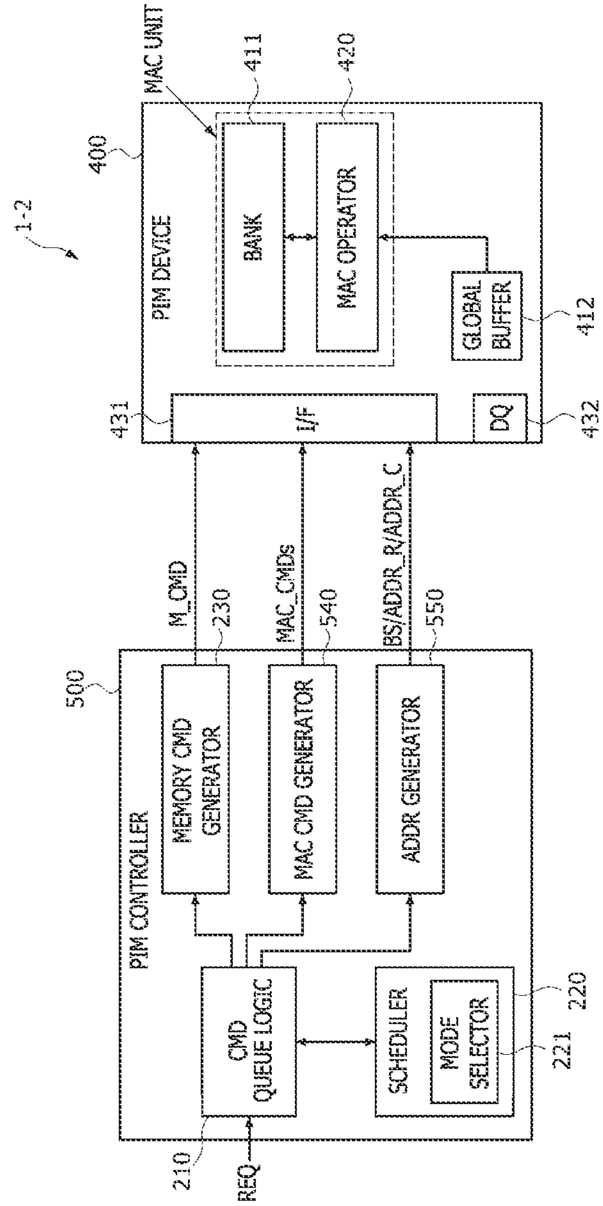
FIG. 20 is a block diagram illustrating a PIM system according to a second embodiment of the present disclosure.

FIG. 20 is a block diagram illustrating a PIM system 1-2 according to a second embodiment of the present disclosure. In FIG. 20, the same reference numerals or the same reference symbols as used in FIG. 2 denote the same elements. As illustrated in FIG. 20, the PIM system 1-2 may be configured to include a PIM device 400 and a PIM controller 500. The PIM device 400 may be configured to include a memory bank (BANK) 411 corresponding to a storage region, a global buffer 412, a MAC operator 420, an interface (I/F) 431, and a data input/output (I/O) pad 432. For an embodiment, the MAC operator 420 represents a MAC operator circuit. The memory bank (BANK) 411 and the MAC operator 420 included in the PIM device 400 may constitute one MAC unit. In another embodiment, the PIM device 400 may include a plurality of MAC units. The memory bank (BANK) 411 may represent a memory region for storing data, for example, a DRAM device. The global buffer 412 may also represent a memory region for storing data, for example, a DRAM device or an SRAM device. The memory bank (BANK) 411 may be a component unit which is independently activated and may be configured to have the same data bus width as data I/O lines in the PIM device 400. In an embodiment, the memory bank 411 may operate through interleaving such that an active operation of the memory bank 411 is performed in parallel while another memory bank is selected. The memory bank 411 may include at least one cell array which includes memory unit cells located at cross points of a plurality of rows and a plurality of columns.

Although not shown in the drawings, a core circuit may be disposed adjacent to the memory bank 411. The core circuit may include X-decoders XDECs and Y-decoders/IO circuits YDEC/IOs. An X-decoder XDEC may also be referred to as a word line decoder or a row decoder. The X-decoder XDEC may receive a row address ADDR_R from the PIM controller 500 and may decode the row address ADDR_R to select and enable one of the rows (i.e., word lines) coupled to the selected memory bank. Each of the Y-decoders/IO circuits YDEC/IOs may include a Y-decoder YDEC and an I/O circuit IO. The Y-decoder YDEC may also be referred to as a bit line decoder or a column decoder. The Y-decoder YDEC may receive a column address ADDR_C from the PIM controller 500 and may decode the column address ADDR_C to select and enable at least one of the columns (i.e., bit lines) coupled to the selected memory bank. Each of the I/O circuits may include an I/O sense amplifier for sensing and amplifying a level of a read datum outputted from the corresponding memory bank during a read operation for the memory bank 411. In addition, the I/O circuit may include a write driver for driving a write datum during a write operation for the memory bank 411.

The MAC operator 420 of the PIM device 400 may have mostly the same configuration as the MAC operator 120 described with reference to FIG. 4. That is, the MAC operator 420 may be configured to include the data input circuit 121, the MAC circuit 122, and the data output circuit 123, as described with reference to FIG. 4. The data input circuit 121 may be configured to include the first input latch 121-1 and the second input latch 121-2. The MAC circuit 122 may be configured to include the multiplication logic circuit 122-1 and the addition logic circuit 122-2. The data output circuit 123 may be configured to include the output latch 123-1, the transfer gate 123-2, the delay circuit 123-3, and the inverter 123-4. In an embodiment, the first input latch 121-1, the second input latch 121-2, and the output latch 123-1 may be realized using flip-flops.

The MAC operator 420 may be different from the MAC operator 120 in that a MAC input latch signal MAC_L1 is simultaneously inputted to both of clock terminals of the first and second input latches 121-1 and 121-2. As indicated in the following descriptions, the weight data and the vector data may be simultaneously transmitted to the MAC operator 420 of the PIM device 400 included in the PIM system 1-2 according to the present embodiment. That is, the first data DA1 (i.e., the weight data) and the second data DA2 (i.e., the vector data) may be simultaneously inputted to both of the first input latch 121-1 and the second input latch 121-2 constituting the data input circuit 121, respectively. Accordingly, it may be unnecessary to apply an extra control signal to the clock terminals of the first and second input latches 121-1 and 121-2, and thus the MAC input latch signal MAC_L1 may be simultaneously inputted to both of the clock terminals of the first and second input latches 121-1 and 121-2 included in the MAC operator 420.

In another embodiment, the MAC operator 420 may be realized to have the same configuration as the MAC operator 120-1 described with reference to FIG. 16 to perform the operation illustrated in FIG. 14. Even in such a case, the MAC operator 420 may have the same configuration as described with reference to FIG. 16 except that the MAC input latch signal MAC_L1 is simultaneously inputted to both of the clock terminals of the first and second input latches 121-1 and 121-2 constituting the data input circuit 121. In yet another embodiment, the MAC operator 420 may be realized to have the same configuration as the MAC operator 120-2 described with reference to FIG. 19 to perform the operation illustrated in FIG. 17. Even in such a case, the MAC operator 420 may have the same configuration as described with reference to FIG. 19 except that the MAC input latch signal MAC_L1 is simultaneously inputted to both of the clock terminals of the first and second input latches 121-1 and 121-2 constituting the data input circuit 121.

The interface 431 of the PIM device 400 may receive the memory command M_CMD, the MAC commands MAC_CMDs, the bank selection signal BS, and the row/column addresses ADDR_R/ADDR_C from the PIM controller 500. The interface 431 may output the memory command M_CMD, together with the bank selection signal BS and the row/column addresses ADDR_R/ADDR_C, to the memory bank 411. The interface 431 may output the MAC commands MAC_CMDs to the memory bank 411 and the MAC operator 420. In such a case, the interface 431 may output the bank selection signal BS and the row/column addresses ADDR_R/ADDR_C to the memory bank 411. The data I/O pad 432 of the PIM device 400 may function as a data communication terminal between a device external to the PIM device 400, the global buffer 412, and the MAC unit (which includes the memory bank 411 and the MAC operator 420) included in the PIM device 400. The external device to the PIM device 400 may correspond to the PIM controller 500 of the PIM system 1-2 or a host located outside the PIM system 1-2. Accordingly, data outputted from the host or the PIM controller 500 may be inputted into the PIM device 400 through the data I/O pad 432. In addition, data generated by the PIM device 400 may be transmitted to the external device to the PIM device 400 through the data I/O pad 432.

The PIM controller 500 may control operations of the PIM device 400. In an embodiment, the PIM controller 500 may control the PIM device 400 such that the PIM device 400 operates in the memory mode or the MAC mode. In the event that the PIM controller 500 controls the PIM device 400 such that the PIM device 400 operates in the memory mode, the PIM device 400 may perform a data read operation or a data write operation for the memory bank 411. In the event that the PIM controller 500 controls the PIM device 400 such that the PIM device 400 operates in the MAC mode, the PIM device 400 may perform the MAC arithmetic operation for the MAC operator 420. In the event that the PIM controller 500 controls the PIM device 400 such that the PIM device 400 operates in the MAC mode, the PIM device 400 may also perform the data read operation and the data write operation for the memory bank 411 and the global buffer 412 to execute the MAC arithmetic operation.

The PIM controller 500 may be configured to include the command queue logic 210, the scheduler 220, the memory command generator 230, a MAC command generator 540, and an address generator 550. The scheduler 220 may include the mode selector 221. The command queue logic 210 may receive the request REQ from an external device (e.g., a host of the PIM system 1-2) and store a command queue corresponding the request REQ in the command queue logic 210. The command queue stored in the command queue logic 210 may be transmitted to the memory command generator 230 or the MAC command generator 540 according to a sequence determined by the scheduler 220. The scheduler 220 may adjust a timing of the command queue when the command queue stored in the command queue logic 210 is outputted from the command queue logic 210. The scheduler 210 may include the mode selector 221 that generates a mode selection signal including information on whether command queue stored in the command queue logic 210 relates to the memory mode or the MAC mode. The memory command generator 230 may receive the command queue related to the memory mode of the PIM device 400 from the command queue logic 210 to generate and output the memory command M_CMD. The command queue logic 210, the scheduler 220, the mode selector 221, and the memory command generator 230 may have the same function as described with reference to FIG. 2.

The MAC command generator 540 may receive the command queue related to the MAC mode of the PIM device 400 from the command queue logic 210. The MAC command generator 540 may decode the command queue to generate and output the MAC commands MAC_CMDs. The MAC commands MAC_CMDs outputted from the MAC command generator 540 may be transmitted to the PIM device 400. The data read operation for the memory bank 411 of the PIM device 400 may be performed by the MAC commands MAC_CMDs outputted from the MAC command generator 540, and the MAC arithmetic operation of the MAC operator 420 may also be performed by the MAC commands MAC_CMDs outputted from the MAC command generator 540. The MAC commands MAC_CMDs and the MAC arithmetic operation of the PIM device 400 according to the MAC commands MAC_CMDs will be described in detail with reference to FIG. 21.

The address generator 550 may receive address information from the command queue logic 210. The address generator 550 may generate the bank selection signal BS for selecting a memory bank where, for example, the memory bank 411 represents multiple memory banks. The address generator 550 may transmit the bank selection signal BS to the PIM device 400. In addition, the address generator 550 may generate the row address ADDR_R and the column address ADDR_C for accessing a region (e.g., memory cells) in the memory bank 411 and may transmit the row address ADDR_R and the column address ADDR_C to the PIM device 400.

Figure 21:
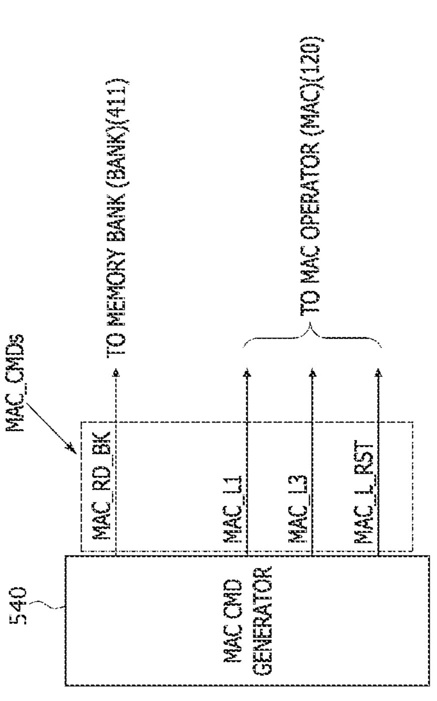
FIG. 21 illustrates MAC commands outputted from a MAC command generator of a PIM controller included in a PIM system according to a second embodiment of the present disclosure.

FIG. 21 illustrates the MAC commands MAC_CMDs outputted from the MAC command generator 540 included in the PIM system 1-2 according to the second embodiment of the present disclosure. As illustrated in FIG. 21, the MAC commands MAC_CMDs may include first to fourth MAC command signals. In an embodiment, the first MAC command signal may be a MAC read signal MAC_RD_BK, the second MAC command signal may be a MAC input latch signal MAC_L1, the third MAC command signal may be a MAC output latch signal MAC_L3, and the fourth MAC command signal may be a MAC latch reset signal MAC_L_RST.

The MAC read signal MAC_RD_BK may control an operation for reading the first data (e.g., the weight data) out of the memory bank 411 to transmit the first data to the MAC operator 420. The MAC input latch signal MAC_L1 may control an input latch operation of the weight data transmitted from the first memory bank 411 to the MAC operator 420. The MAC output latch signal MAC_L3 may control an output latch operation of the MAC result data generated by the MAC operator 420. And, the MAC latch reset signal MAC_L_RST may control an output operation of the MAC result data generated by the MAC operator 420 and a reset operation of an output latch included in the MAC operator 420.

The PIM system 1-2 according to the present embodiment may also be configured to perform the deterministic MAC arithmetic operation. Thus, the MAC commands MAC_CMDs transmitted from the PIM controller 500 to the PIM device 400 may be sequentially generated with fixed time intervals. Accordingly, the PIM controller 500 does not require any extra end signals of various operations executed for the MAC arithmetic operation to generate the MAC commands MAC_CMDs for controlling the MAC arithmetic operation. In an embodiment, latencies of the various operations executed by MAC commands MAC_CMDs for controlling the MAC arithmetic operation may be set to have fixed values in order to perform the deterministic MAC arithmetic operation. In such a case, the MAC commands MAC_CMDs may be sequentially outputted from the PIM controller 500 with fixed time intervals corresponding to the fixed latencies.

Figure 22:
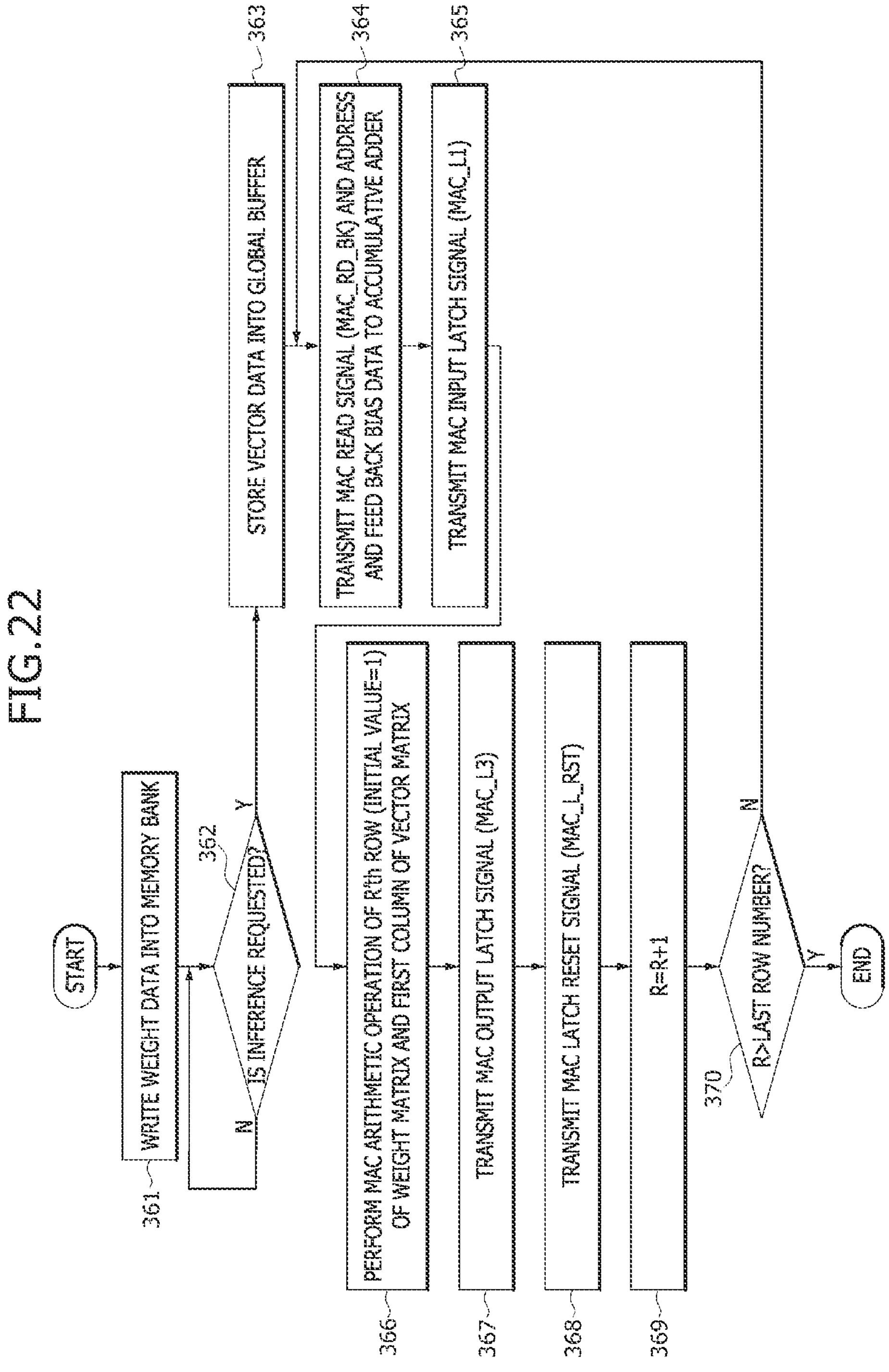
FIG. 22 is a flowchart illustrating processes of the MAC arithmetic operation illustrated in FIG. 5 in a PIM system according to a second embodiment of the present disclosure.

FIG. 22 is a flowchart illustrating processes of the MAC arithmetic operation described with reference to FIG. 5, which are performed in the PIM system 1-2 according to the second embodiment of the present disclosure. In addition, FIGS. 23 to 26 are block diagrams illustrating the processes of the MAC arithmetic operation illustrated in FIG. 5, which are performed in the PIM system 1-2 according to the second embodiment of the present disclosure. Referring to FIGS. 22 to 26, the first data (i.e., the weight data) may be written into the memory bank 411 at a step 361 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 5.

At a step 362, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 5. If the inference request signal is transmitted to the PIM controller 500 at the step 362, then the PIM controller 500 may write the vector data transmitted with the inference request signal into the global buffer 412 at a step 363. Accordingly, the vector data may be stored in the global buffer 412 of the PIM device 400.

Figure 23:
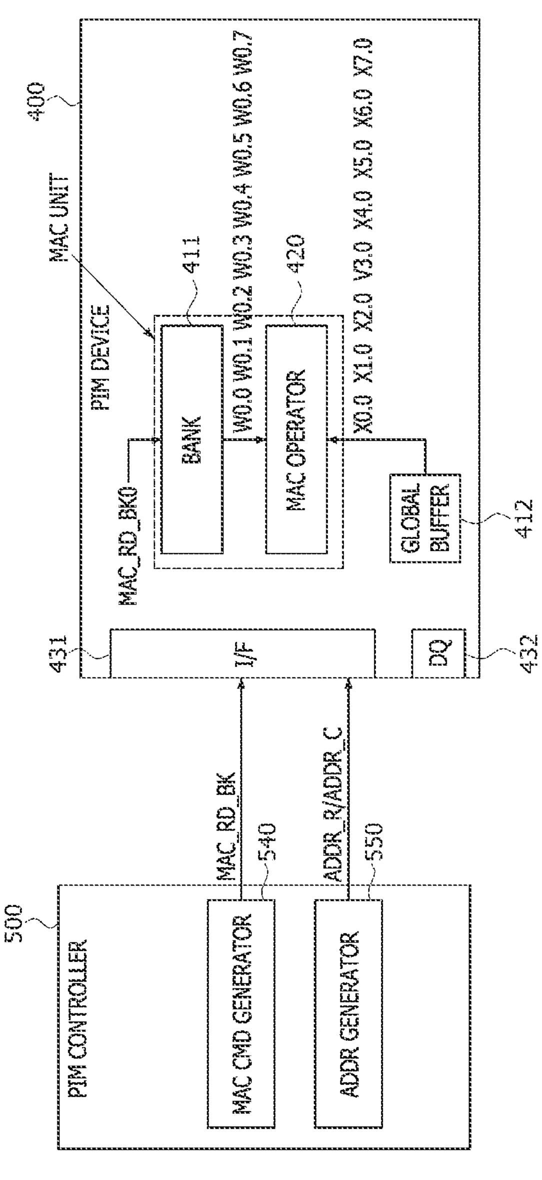

At a step 364, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. Although not shown in the drawings, if a plurality of memory banks are disposed in the PIM device 400, the address generator 550 may transmit a bank selection signal for selecting the memory bank 411 among the plurality of memory banks as well as the row/column address ADDR_R/ADDR_C to the PIM device 400. The MAC read signal MAC_RD_BK inputted to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK outputted from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

Figure 24:
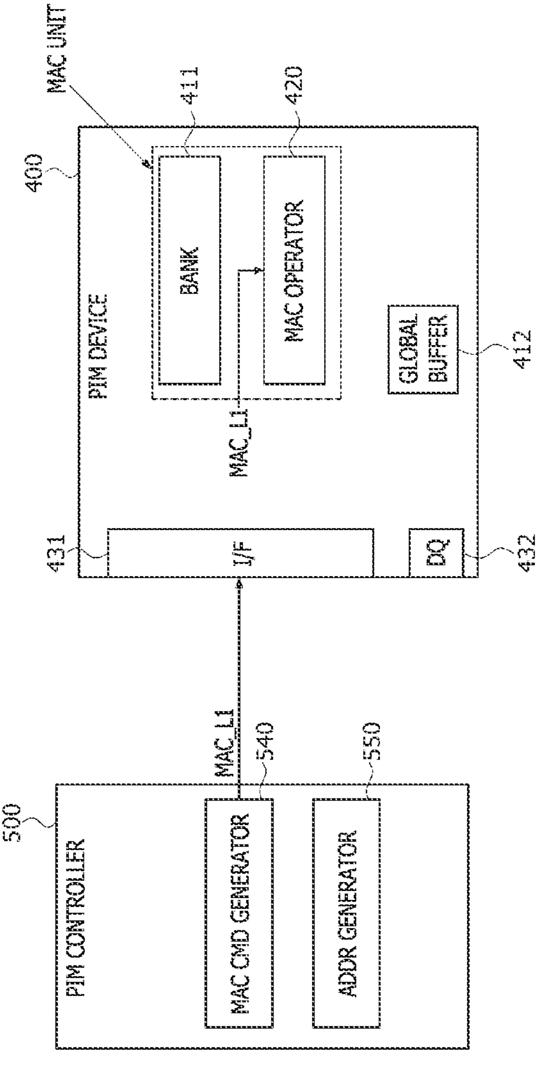

At a step 365, the MAC command generator 540 of the PIM controller 500 may generate and transmit the MAC input latch signal MAC_L1 to the PIM device 400, as illustrated in FIG. 24. The MAC input latch signal MAC_L1 may control the input latch operation of the weight data and the vector data for the MAC operator 420 of the PIM device 400. The elements W0.0, . . . , and W0.7 in the first row of the weight matrix and the elements X0.0, . . . , and X7.0 in the first column of the vector matrix may be inputted to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, . . . , and W0.7 in the first row of the weight matrix may be inputted to the first to eighth multipliers 122-11, respectively, and the elements X0.0, . . . , and X7.0 in the first column of the vector matrix may also be inputted to the first to eighth multipliers 122-11, respectively.

At a step 366, the MAC circuit 122 of the MAC operator 420 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, as described with reference to FIG. 4, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may receive output data from the multipliers 122-11 and may perform the adding calculation of the output data of the multipliers 122-11 to output the result data of the adding calculation. The output data of the addition logic circuit 122-2 may correspond to result data (i.e., MAC result data) of the MAC arithmetic operation of the first row included in the weight matrix and the column included in the vector matrix. Thus, the output data of the addition logic circuit 122-2 may correspond to the element MAC0.0 located at the first row of the '8×1' MAC result matrix having the eight elements of MAC0.0, . . . , and MAC7.0 illustrated in FIG. 5. The output data MAC0.0 of the addition logic circuit 122-2 may be inputted to the output latch 123-1 disposed in the data output circuit 123 of the MAC operator 420, as described with reference to FIG. 4.

At a step 367, the MAC command generator 540 of the PIM controller 500 may generate and transmit the MAC output latch signal MAC_L3 to the PIM device 400, as illustrated in FIG. 25. The MAC output latch signal MAC_L3 may control the output latch operation of the MAC result data MAC0.0 performed by the MAC operator 420 of the PIM device 400. The MAC result data MAC0.0 transmitted from the MAC circuit 122 of the MAC operator 420 to the output latch 123-1 may be outputted from the output latch 123-1 by the output latch operation performed in synchronization with the MAC output latch signal MAC_L3, as described with reference to FIG. 4. The MAC result data MAC0.0 outputted from the output latch 123-1 may be inputted to the transfer gate 123-2 of the data output circuit 123.

Figure 26:
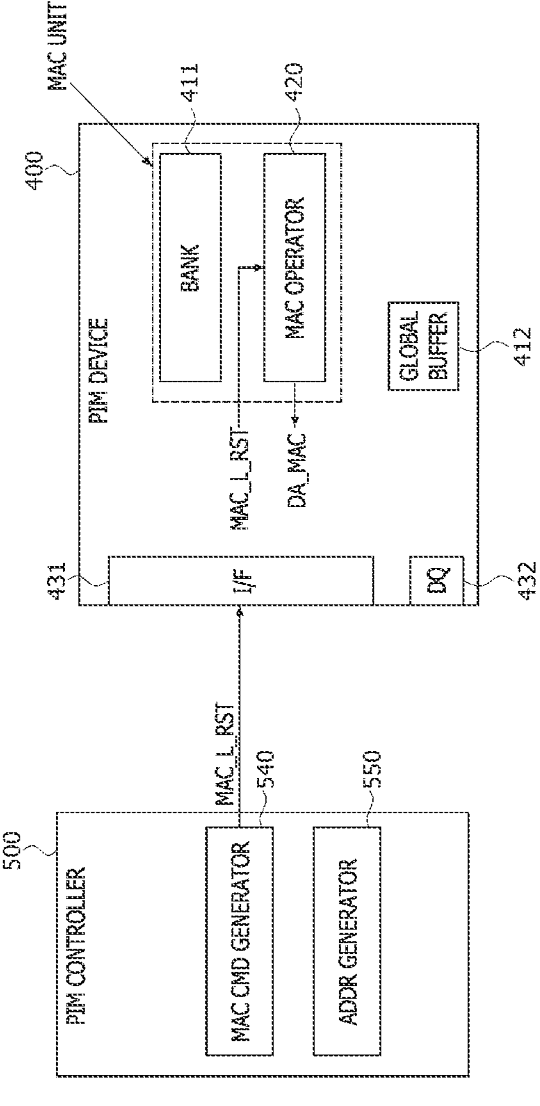

At a step 368, the MAC command generator 540 of the PIM controller 500 may generate and transmit the MAC latch reset signal MAC_L_RST to the PIM device 400, as illustrated in FIG. 26. The MAC latch reset signal MAC_L_RST may control an output operation of the MAC result data MAC0.0 generated by the MAC operator 420 and a reset operation of the output latch 123-1 included in the MAC operator 420. As described with reference to FIG. 4, the transfer gate 123-2 receiving the MAC result data MAC0.0 from the output latch 123-1 of the MAC operator 420 may be synchronized with the MAC latch reset signal MAC_L_RST to output the MAC result data MAC0.0. In an embodiment, the MAC result data MAC0.0 outputted from the MAC operator 420 may be stored into the memory bank 411 through the BIO line in the PIM device 400.

At a step 369, the row number 'R' of the weight matrix for which the MAC arithmetic operation is performed may be increased by '1'. Because the MAC arithmetic operation for the first row among the first to eight rows of the weight matrix has been performed during the previous steps, the row number of the weight matrix may change from '1' to '2' at the step 369. At a step 370, whether the row number changed at the step 369 is greater than the row number of the last row (i.e., the eighth row) of the weight matrix may be determined. Because the row number of the weight matrix is changed to '2' at the step 370, a process of the MAC arithmetic operation may be fed back to the step 364.

If the process of the MAC arithmetic operation is fed back to the step 364 from the step 370, the same processes as described with reference to the steps 364 to 370 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 364 from the step 370, the processes from the step 364 to the step 370 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 369, the MAC arithmetic operation may terminate because the row number of '9' is greater than the last row number of '8' at the step 370.

Figure 27:
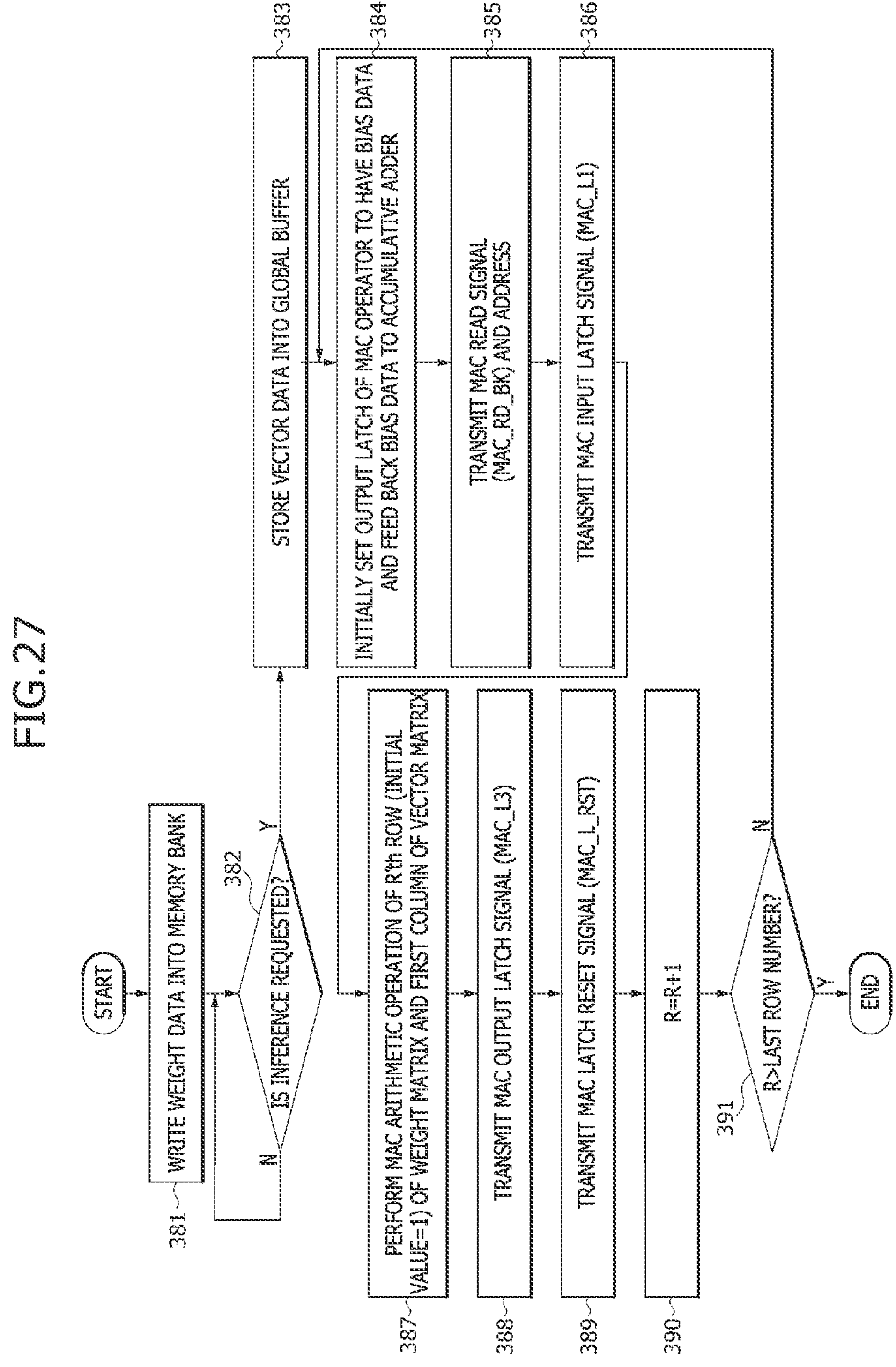
FIG. 27 is a flowchart illustrating processes of the MAC arithmetic operation illustrated in FIG. 14 in a PIM system according to a second embodiment of the present disclosure.

FIG. 27 is a flowchart illustrating processes of the MAC arithmetic operation described with reference to FIG. 14, which are performed in the PIM system 1-2 according to the second embodiment of the present disclosure. In order to perform the MAC arithmetic operation according to the present embodiment, the MAC operator 420 of the PIM device 400 may have the same configuration as the MAC operator 120-1 illustrated in FIG. 16. Referring to FIGS. 20 and 27, the first data (i.e., the weight data) may be written into the memory bank 411 at a step 381 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 14.

At a step 382, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 14. If the inference request signal is transmitted to the PIM controller 500 at the step 382, then the PIM controller 500 may write the vector data transmitted with the inference request signal into the global buffer 412 at a step 383. Accordingly, the vector data may be stored in the global buffer 412 of the PIM device 400.

At a step 384, an output latch of a MAC operator 420 may be initially set to have bias data and the initially set bias data may be fed back to an accumulative adder of the MAC operator 420. This process is executed to perform the matrix adding calculation of the MAC result matrix and the bias matrix, which is described with reference to FIG. 14. That is, as illustrated in FIG. 16, the output latch 123-1 of the data output circuit 123-A included in the MAC operator 420 may be initially set to have the bias data of the bias matrix. Because the matrix multiplying calculation is executed for the first row of the weight matrix, the element B0.0 located at first row of the bias matrix may be initially set as the bias data in the output latch 123-1. The output latch 123-1 may output the bias data B0.0, and the bias data B0.0 outputted from the output latch 123-1 may be inputted to the accumulative adder 122-21D of the addition logic circuit 122-2 included in the MAC operator 420.

In an embodiment, in order to output the bias data B0.0 out of the output latch 123-1 and to feed back the bias data B0.0 to the accumulative adder 122-21D, the MAC command generator 540 of the PIM controller 500 may transmit the MAC output latch signal MAC_L3 to the MAC operator 420 of the PIM device 400. When a subsequent MAC arithmetic operation is performed, the accumulative adder 122-21D of the MAC operator 420 may add the MAC result data MAC0.0 outputted from the adder 122-21C disposed at the last stage to the bias data B0.0 which is fed back from the output latch 123-1 to generate the biased result data Y0.0 and may output the biased result data Y0.0 to the output latch 123-1. The biased result data Y0.0 may be outputted from the output latch 123-1 in synchronization with the MAC output latch signal MAC_L3 transmitted in a subsequent process.

At a step 385, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. The MAC read signal MAC_RD_BK inputted to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK outputted from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

At a step 386, the MAC command generator 540 of the PIM controller 500 may generate and transmit the MAC input latch signal MAC_L1 to the PIM device 400, as illustrated in FIG. 24. The MAC input latch signal MAC_L1 may control the input latch operation of the weight data and the vector data for the MAC operator 420 of the PIM device 400. The elements W0.0, . . . , and W0.7 in the first row of the weight matrix and the elements X0.0, . . . , and X7.0 in the first column of the vector matrix may be inputted to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, . . . , and W0.7 in the first row of the weight matrix may be inputted to the first to eighth multipliers 122-11, respectively, and the elements X0.0, . . . , and X7.0 in the first column of the vector matrix may also be inputted to the first to eighth multipliers 122-11, respectively.

At a step 387, the MAC circuit 122 of the MAC operator 420 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may receive output data of the multipliers 122-11 and may perform the adding calculation of the output data of the multipliers 122-11 to output the result data of the adding calculation to the accumulative adder 122-21D. The output data of the adder 122-21C included in the addition logic circuit 122-2 may correspond to result data (i.e., MAC result data) of the MAC arithmetic operation of the first row included in the weight matrix and the column included in the vector matrix. The accumulative adder 122-21D may add the output data MAC0.0 of the adder 122-21C to the bias data B0.0 fed back from the output latch 123-1 and may output the result data of the adding calculation. The output data (i.e., the biased result data Y0.0) of the accumulative adder 122-21D may be inputted to the output latch 123-1 disposed in the data output circuit 123-A of the MAC operator 420.

At a step 388, the MAC command generator 540 of the PIM controller 500 may generate and transmit the MAC output latch signal MAC_L3 to the PIM device 400, as described with reference to FIG. 25. The MAC output latch signal MAC_L3 may control the output latch operation for the output latch 123-1 of the MAC operator 420 included in the PIM device 400. The output latch 123-1 of the MAC operator 420 may output the biased result data Y0.0 according to the output latch operation performed in synchronization with the MAC output latch signal MAC_L3. The biased result data Y0.0 outputted from the output latch 123-1 may be inputted to the transfer gate 123-2 of the data output circuit 123-A.

At a step 389, the MAC command generator 540 of the PIM controller 500 may generate and transmit the MAC latch reset signal MAC_L_RST to the PIM device 400, as illustrated in FIG. 26. The MAC latch reset signal MAC_L_RST may control an output operation of the biased result data Y0.0 generated by the MAC operator 420 and a reset operation of the output latch 123-1 included in the MAC operator 420. The transfer gate 123-2 receiving the biased result data Y0.0 from the output latch 123-1 of the MAC operator 420 may be synchronized with the MAC latch reset signal MAC_L_RST to output the biased result data Y0.0. In an embodiment, the biased result data Y0.0 outputted from the MAC operator 420 may be stored into the memory bank 411 through the BIO line in the PIM device 400.

At a step 390, the row number 'R' of the weight matrix for which the MAC arithmetic operation is performed may be increased by '1'. Because the MAC arithmetic operation for the first row among the first to eight rows of the weight matrix has been performed at the previous steps, the row number of the weight matrix may change from '1' to '2' at the step 390. At a step 391, whether the row number changed at the step 390 is greater than the row number of the last row (i.e., the eighth row) of the weight matrix may be determined. Because the row number of the weight matrix is changed to '2' at the step 390, a process of the MAC arithmetic operation may be fed back to the step 384.

If the process of the MAC arithmetic operation is fed back to the step 384 at the step 391, the same processes as described with reference to the steps 384 to 391 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix. If the process of the MAC arithmetic operation is fed back to the step 384 at the step 391, then the processes from the step 384 to the step 390 may be iteratively performed until the MAC arithmetic operation is performed for all of the rows of the weight matrix with the vector matrix. If the MAC arithmetic operation for the eighth row of the weight matrix terminates and the row number of the weight matrix changes from '8' to '9' at the step 390, then the MAC arithmetic operation may terminate because the row number of '9' is greater than the last row number of '8' at the step 391.

Figure 28:
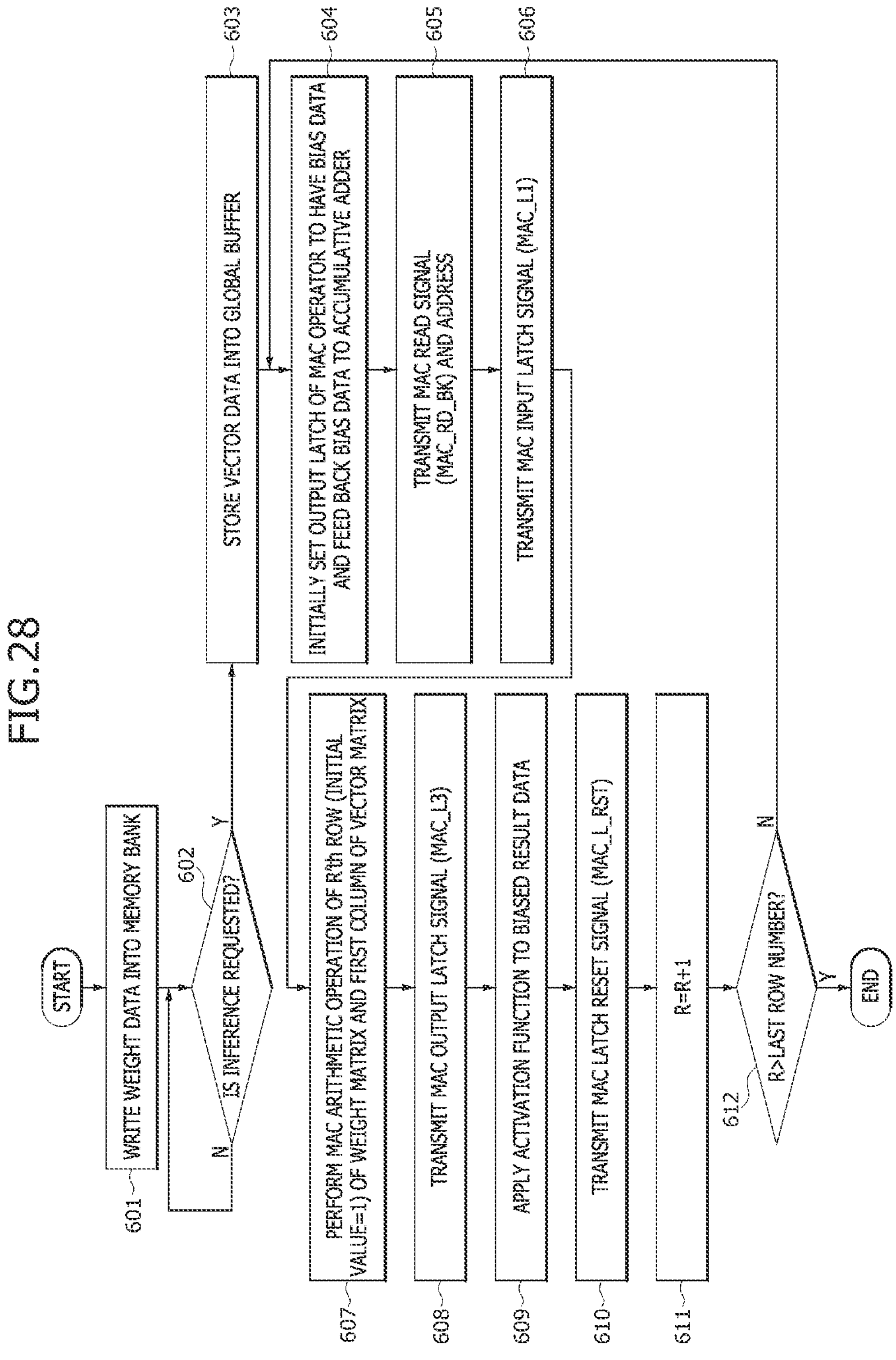
FIG. 28 is a flowchart illustrating processes of the MAC arithmetic operation illustrated in FIG. 17 in a PIM system according to a second embodiment of the present disclosure.

FIG. 28 is a flowchart illustrating processes of the MAC arithmetic operation described with reference to FIG. 17, which are performed in the PIM system 1-2 according to the second embodiment of the present disclosure. In order to perform the MAC arithmetic operation according to the present embodiment, the MAC operator 420 of the PIM device 400 may have the same configuration as the MAC operator 120-2 illustrated in FIG. 19. Referring to FIGS. 19 and 28, the first data (i.e., the weight data) may be written into the memory bank 411 at a step 601 to perform the MAC arithmetic operation. Thus, the weight data may be stored in the memory bank 411 of the PIM device 400. In the present embodiment, it may be assumed that the weight data are the elements W0.0, . . . , and W7.7 constituting the weight matrix of FIG. 17.

At a step 602, whether an inference is requested may be determined. An inference request signal may be transmitted from an external device located outside of the PIM system 1-2 to the PIM controller 500 of the PIM system 1-2. In an embodiment, if no inference request signal is transmitted to the PIM controller 500, the PIM system 1-2 may be in a standby mode until the inference request signal is transmitted to the PIM controller 500. Alternatively, if no inference request signal is transmitted to the PIM controller 500, the PIM system 1-2 may perform operations (e.g., data read/write operations) other than the MAC arithmetic operation in the memory mode until the inference request signal is transmitted to the PIM controller 500. In the present embodiment, it may be assumed that the second data (i.e., the vector data) are transmitted together with the inference request signal. In addition, it may be assumed that the vector data are the elements X0.0, . . . , and X7.0 constituting the vector matrix of FIG. 17. If the inference request signal is transmitted to the PIM controller 500 at the step 602, then the PIM controller 500 may write the vector data transmitted with the inference request signal into the global buffer 412 at a step 603. Accordingly, the vector data may be stored in the global buffer 412 of the PIM device 400.

At a step 604, an output latch of a MAC operator 420 may be initially set to have bias data and the initially set bias data may be fed back to an accumulative adder of the MAC operator 420. This process is executed to perform the matrix adding calculation of the MAC result matrix and the bias matrix, which is described with reference to FIG. 17. That is, as described with reference to FIG. 19, the output latch 123-1 of the data output circuit 123-B included in the MAC operator 420 may be initially set to have the bias data of the bias matrix. Because the matrix multiplying calculation is executed for the first row of the weight matrix, the element B0.0 located at first row of the bias matrix may be initially set as the bias data in the output latch 123-1. The output latch 123-1 may output the bias data B0.0, and the bias data B0.0 outputted from the output latch 123-1 may be inputted to the accumulative adder 122-21D of the addition logic circuit 122-2 included in the MAC operator 420.

In an embodiment, in order to output the bias data B0.0 out of the output latch 123-1 and to feed back the bias data B0.0 to the accumulative adder 122-21D, the MAC command generator 540 of the PIM controller 500 may transmit the MAC output latch signal MAC_L3 to the MAC operator 420 of the PIM device 400. When a subsequent MAC arithmetic operation is performed, the accumulative adder 122-21D of the MAC operator 420 may add the MAC result data MAC0.0 outputted from the adder 122-21C disposed at the last stage of the addition logic circuit 122-2 to the bias data B0.0 which is fed back from the output latch 123-1 to generate the biased result data Y0.0 and may output the biased result data Y0.0 to the output latch 123-1. The biased result data Y0.0 may be outputted from the output latch 123-1 in synchronization with the MAC output latch signal MAC_L3 transmitted in a subsequent process.

At a step 605, the MAC command generator 540 of the PIM controller 500 may generate and transmit the MAC read signal MAC_RD_BK to the PIM device 400, as illustrated in FIG. 23. In such a case, the address generator 550 of the PIM controller 500 may generate and transmit the row/column address ADDR_R/ADDR_C to the PIM device 400. The MAC read signal MAC_RD_BK inputted to the PIM device 400 may control the data read operation for the memory bank 411 of the PIM device 400. The memory bank 411 may output and transmit the elements W0.0, . . . , and W0.7 in the first row of the weight matrix of the weight data stored in a region of the memory bank 411, which is designated by the row/column address ADDR_R/ADDR_C, to the MAC operator 420 in response to the MAC read signal MAC_RD_BK. In an embodiment, the data transmission from the memory bank 411 to the MAC operator 420 may be executed through a BIO line which is provided specifically for data transmission between the memory bank 411 and the MAC operator 420.

Meanwhile, the vector data X0.0, . . . , and X7.0 stored in the global buffer 412 may also be transmitted to the MAC operator 420 in synchronization with a point in time when the weight data are transmitted from the memory bank 411 to the MAC operator 420. In order to transmit the vector data X0.0, . . . , and X7.0 from the global buffer 412 to the MAC operator 420, a control signal for controlling the read operation for the global buffer 412 may be generated in synchronization with the MAC read signal MAC_RD_BK outputted from the MAC command generator 540 of the PIM controller 500. The data transmission between the global buffer 412 and the MAC operator 420 may be executed through a GIO line. Thus, the weight data and the vector data may be independently transmitted to the MAC operator 420 through two separate transmission lines, respectively. In an embodiment, the weight data and the vector data may be simultaneously transmitted to the MAC operator 420 through the BIO line and the GIO line, respectively.

At a step 606, the MAC command generator 540 of the PIM controller 500 may generate and transmit the MAC input latch signal MAC_L1 to the PIM device 400, as described with reference to FIG. 24. The MAC input latch signal MAC_L1 may control the input latch operation of the weight data and the vector data for the MAC operator 420 of the PIM device 400. The elements W0.0, . . . , and W0.7 in the first row of the weight matrix and the elements X0.0, . . . , and X7.0 in the first column of the vector matrix may be inputted to the MAC circuit 122 of the MAC operator 420 by the input latch operation. The MAC circuit 122 may include the plurality of multipliers (e.g., the eight multipliers 122-11), the number of which is equal to the number of columns of the weight matrix and the number of rows of the vector matrix. The elements W0.0, . . . , and W0.7 in the first row of the weight matrix may be inputted to the first to eighth multipliers 122-11, respectively, and the elements X0.0, . . . , and X7.0 in the first column of the vector matrix may also be inputted to the first to eighth multipliers 122-11, respectively.

At a step 607, the MAC circuit 122 of the MAC operator 420 may perform the MAC arithmetic operation of an $R^{th}$ row of the weight matrix and the first column of the vector matrix, which are inputted to the MAC circuit 122. An initial value of 'R' may be set as '1'. Thus, the MAC arithmetic operation of the first row of the weight matrix and the first column of the vector matrix may be performed a first time. Specifically, each of the multipliers 122-11 of the multiplication logic circuit 122-1 may perform a multiplying calculation of the inputted data, and the result data of the multiplying calculation may be inputted to the addition logic circuit 122-2. The addition logic circuit 122-2 may receive output data of the multipliers 122-11 and may perform the adding calculation of the output data of the multipliers 122-11 to output the result data of the adding calculation to the accumulative adder 122-21D. The output data of the adder 122-21C included in the addition logic circuit 122-2 may correspond to result data (i.e., the MAC result data MAC0.0) of the MAC arithmetic operation of the first row included in the weight matrix and the column included in the vector matrix. The accumulative adder 122-21D may add the output data MAC0.0 of the adder 122-21C to the bias data B0.0 fed back from the output latch 123-1 and may output the result data of the adding calculation. The output data (i.e., the biased result data Y0.0) of the accumulative adder 122-21D may be inputted to the output latch 123-1 disposed in the data output circuit 123-A of the MAC operator 420.

At a step 608, the MAC command generator 540 of the PIM controller 500 may generate and transmit the MAC output latch signal MAC_L3 to the PIM device 400, as described with reference to FIG. 25. The MAC output latch signal MAC_L3 may control the output latch operation for the output latch 123-1 of the MAC operator 420 included in the PIM device 400. The output latch 123-1 of the MAC operator 420 may output the biased result data Y0.0 according to the output latch operation performed in synchronization with the MAC output latch signal MAC_L3. The biased result data Y0.0 outputted from the output latch 123-1 may be inputted to the activation function logic circuit 123-5, which is illustrated in FIG. 19. At a step 609, the activation function logic circuit 123-5 may apply an activation function to the biased result data Y0.0 to generate a final output value, and the final output value may be inputted to the transfer gate (123-2 of FIG. 4).

At a step 610, the MAC command generator 540 of the PIM controller 500 may generate and transmit the MAC latch reset signal MAC_L_RST to the PIM device 400, as described with reference to FIG. 26. The MAC latch reset signal MAC_L_RST may control an output operation of the final output value generated by the MAC operator 420 and a reset operation of the output latch 123-1 included in the MAC operator 420. The transfer gate 123-2 receiving the final output value from the activation function logic circuit 123-5 of the data output circuit 123-B included in the MAC operator 420 may be synchronized with the MAC latch reset signal MAC_L_RST to output the final output value. In an embodiment, the final output value outputted from the MAC operator 420 may be stored into the memory bank 411 through the BIO line in the PIM device 400.

At a step 611, the row number 'R' of the weight matrix for which the MAC arithmetic operation is performed may be increased by '1'. Because the MAC arithmetic operation for the first row among the first to eight rows of the weight matrix has been performed at the previous steps, the row number of the weight matrix may change from '1' to '2' at the step 611. At a step 612, whether the row number changed at the step 611 is greater than the row number of the last row (i.e., the eighth row) of the weight matrix may be determined. Because the row number of the weight matrix is changed to '2' at the step 611, a process of the MAC arithmetic operation may be fed back to the step 604.

If the process of the MAC arithmetic operation is fed back to the step 604 from the step 612, the same processes as described with reference to the steps 604 to 612 may be executed again for the increased row number of the weight matrix. That is, as the row number of the weight matrix changes from '1' to '2', the MAC arithmetic operation may be performed for the second row of the weight matrix instead of the first row of the weight matrix with the vector matrix to generate the MAC result data (corresponding to the element MAC1.0 located in the second row of the MAC result matrix) and the bias data (corresponding to the element B1.0 located in the second row of the bias matrix). If the process of the MAC arithmetic operation is fed back to the step 604 from the step 612, the processes from the step 604 to the step 612 may be iteratively performed until the MAC arithmetic operation is performed for all of the rows (i.e., first to eighth rows) of the weight matrix with the vector matrix. If the MAC arithmetic operation for the eighth row of the weight matrix terminates and the row number of the weight matrix changes from '8' to '9' at the step 611, the MAC arithmetic operation may terminate because the row number of '9' is greater than the last row number of '8' at the step 612.

FIG. 29 is a block diagram illustrating a PIM system 1-3 according to a third embodiment of the present disclosure. As illustrated in FIG. 29, the PIM system 1-3 may have substantially the same configuration as the PIM system 1-1 illustrated in FIG. 2 except that a PIM controller 200A of the PIM system 1-3 further includes a mode register set (MRS) 260 as compared with the PIM controller 200 of the PIM system 1-1. Thus, the same explanation as described with reference to FIG. 2 will be omitted hereinafter. The mode register set 260 in the PIM controller 200A may receive an MRS signal instructing arrangement of various signals necessary for the MAC arithmetic operation of the PIM system 1-3. In an embodiment, the mode register set 260 may receive the MRS signal from the mode selector 221 included in the scheduler 220. However, in another embodiment, the MRS signal may be provided by an extra logic circuit other than the mode selector 221. The mode register set 260 receiving the MRS signal may transmit the MRS signal to the MAC command generator 240. For an embodiment, the MRS 260 represents a MRS circuit.

In an embodiment, the MRS signal may include timing information on when the MAC commands MAC_CMDs are generated. In such a case, the deterministic operation of the PIM system 1-3 may be performed by the MRS signal provided by the MRS 260. In another embodiment, the MRS signal may include information on the timing related to an interval between the MAC modes or information on a mode change between the MAC mode and the memory mode. In an embodiment, generation of the MRS signal in the MRS 260 may be executed before the vector data are stored in the second memory bank 112 of the PIM device 100 by the inference request signal transmitted from an external device to the PIM controller 200A. Alternatively, the generation of the MRS signal in the MRS 260 may be executed after the vector data are stored in the second memory bank 112 of the PIM device 100 by the inference request signal transmitted from an external device to the PIM controller 200A.

FIG. 30 is a block diagram illustrating a PIM system 1-4 according to a fourth embodiment of the present disclosure. As illustrated in FIG. 30, the PIM system 1-4 may have substantially the same configuration as the PIM system 1-2 illustrated in FIG. 20 except that a PIM controller 500A of the PIM system 1-4 further includes the mode register set (MRS) 260 as compared with the PIM controller 500 of the PIM system 1-2. Thus, the same explanation as described with reference to FIG. 20 will be omitted hereinafter. The mode register set 260 in the PIM controller 500A may receive an MRS signal instructing arrangement of various signals necessary for the MAC arithmetic operation of the PIM system 1-4. In an embodiment, the mode register set 260 may receive the MRS signal from the mode selector 221 included in the scheduler 220. However, in another embodiment, the MRS signal may be provided by an extra logic circuit other than the mode selector 221. The mode register set 260 receiving the MRS signal may transmit the MRS signal to the MAC command generator 540.

In an embodiment, the MRS signal may include timing information on when the MAC commands MAC_CMDs are generated. In such a case, the deterministic operation of the PIM system 1-4 may be performed by the MRS signal provided by the MRS 260. In another embodiment, the MRS signal may include information on the timing related to an interval between the MAC modes or information on a mode change between the MAC mode and the memory mode. In an embodiment, generation of the MRS signal in the MRS 260 may be executed before the vector data are stored in the global buffer 412 of the PIM device 400 by the inference request signal transmitted from an external device to the PIM controller 500A. Alternatively, the generation of the MRS signal in the MRS 260 may be executed after the vector data are stored in the global buffer 412 of the PIM device 400 by the inference request signal transmitted from an external device to the PIM controller 500A.

FIG. 31 is a block diagram illustrating a PIM device 600 according to an embodiment of the present disclosure. Referring to FIG. 31, the PIM device 600 may include a plurality of, for example, "N" memory banks BK0-BK"N−1" ("N" is a natural number of 2 or more), "N" MAC operators MAC0-MAC"N−1", a first global buffer GB0, a second global buffer GB1, a command decoder 611, an address latch 612, and a data input/output circuit 613.

A "K"$^{th}$ memory bank BK"K−1" ("K" is 1, 2, . . . , N−1, N) among the "N" memory banks BK0-BK"N−1" and a "K"$^{th}$ MAC operator MAC"K−1" among the "N" MAC operators MAC0-MAC"N−1" may constitute a "K"$^{th}$ MAC unit MU"K−1". As illustrated in FIG. 31, a first memory bank BK0 and a first MAC operator MAC0 may constitute a first MAC unit MU0. A second memory bank BK1 and a second MAC operator MAC1 may constitute a second MAC unit MU1. A third memory bank BK2 and a third MAC operator MAC2 may constitute a third MAC unit MU2. A fourth memory bank BK3 and a fourth MAC operator MAC3 may constitute a fourth MAC unit MU3. An "N−1"$^{th}$ memory bank BK"N−2" and an "N−1"$^{th}$ MAC operator MAC"N−2" may constitute an "N−1"$^{th}$ MAC unit MU"N−2". In addition, an "N"$^{th}$ memory bank BK"N−1" and an "N"$^{th}$ MAC operator MAC"N−1" may constitute an "N"$^{th}$ MAC unit MU"N−1". As described above, one memory bank and one MAC operator may constitute one MAC unit, but this is only an example, and the configuration of the MAC unit may be variously implemented. For example, two or more memory banks and one MAC operator may constitute one MAC unit.

The "K"$^{th}$ memory bank BK"K−1" constituting the "K"$^{th}$ MAC unit MU"K−1" may provide "K"$^{th}$ weight data for a MAC arithmetic operation to the "K"$^{th}$ MAC operator MAC"K−1". For example, the first memory bank BK0 of the first MAC unit MU0 may provide first weight data to the first MAC operator MAC0. The second memory bank BK1 of the second MAC unit MU1 may provide second weight data to the second MAC operator MAC1. Similarly, the "N"$^{th}$ memory bank BK"N−1" of the "N"$^{th}$ MAC unit MU"N−1" may provide "N"$^{th}$ weight data to the "N"$^{th}$ MAC operator MAC"N−1". The transmission of the weight data from the memory banks BK0-BK"N−1" to the MAC operators MAC0-MAC"N−1" may be performed through a GIO line.

The first global buffer GB0 and the second global buffer GB1 may perform vector data provision operations of providing vector data for MAC arithmetic operations to the MAC operators MAC0-MAC"N−1". In addition, the first global buffer GB0 and the second global buffer GB1 may perform MAC result data storage operations of storing MAC result data generated by the MAC arithmetic operations. In the process in which the PIM device 600 according to the present embodiment performs the MAC arithmetic operations for an MLP type neural network, the first global buffer GB0 and the second global buffer GB1 may alternately perform the vector data provision operation and the MAC result data storage operation. For example, when the first global buffer GB0 performs the vector data provision operation, the second global buffer GB1 may perform the MAC result data storage operation. On the other hand, when the first global buffer GB0 performs the MAC result data storage operation, the second global buffer GB1 may perform the vector data provision operation.

The PIM device 600 may perform a vector data write operation of storing vector data in one of the first global buffer GB0 and the second global buffer GB1 before performing the MAC arithmetic operation. In the following embodiments, it is assumed that the first global buffer GB0 performs the write operation on vector data. In an embodiment, the vector data to be written in the first global buffer GB0 may be stored in the memory banks BK0-BK"N−1". In this case, before the first global buffer GB0 performs the write operation on the vector data, a read operation may precede on the vector data of the memory banks BK0-BK"N−1". That is, a host or a controller may transmit a read command to the PIM device 600 so that the memory banks BK0-BK"N−1" may perform the read operation on the vector data. The memory banks BK0-BK"N−1" of the PIM device 600 may transmit the vector data to the host or the controller according to a read command. When the vector data is transmitted, the host or the controller may transmit the read vector data together with the write command to the PIM device 600 so that the first global buffer GB0 may perform the vector data write operation. The first global buffer GB0 of the PIM device 600 may store the vector data according to the write command.

The host or the controller may transmit a MAC arithmetic command to the PIM device 600 so that the first global buffer GB0 may perform a vector data provision operation. The first global buffer GB0 of the PIM device 600 may provide the vector data in common to all MAC operators MAC0-MAC"N−1" according to the MAC arithmetic command from the host or the controller. In an embodiment, the vector data transmission from the first global buffer GB0 to the MAC operators MAC0-MAC"N−1" may be performed through the GIO line. Even when the second global buffer GB1 performs the vector data provision operation, the vector data provision operation may be performed in the same manner as in the case of the first global buffer GB0.

The host or the controller may transmit a first MAC result data write command to the PIM device 600 so that the second global buffer GB1 may perform a MAC result data storage operation. Accordingly, the MAC operators MAC0-MAC"N−1" of the PIM device 600 may transmit MAC result data to the second global buffer GB1. The second global buffer GB1 may perform the MAC result data storage operation of storing the MAC result data transmitted from the MAC operators MAC0-MAC"N−1". Even when the first global buffer GB0 performs the MAC result data storage operation, the MAC result data storage operation may be performed in the same manner as in the case of the second global buffer GB1.

When output data of an output layer of the MLP is generated in the PIM device 600, that is, when all MAC arithmetic operations for the MLP are finished, the global buffer that stores the MAC result data in the output layer, that is, the output data, for example, the second global buffer GB1 may perform a read operation on the output data. The host or the controller may transmit an output data read command to the PIM device 600 so that the second global buffer GB1 may perform the output data read operation. Accordingly, the second global buffer GB1 of the PIM device 600 may transmit the output data to the host or the controller. Even when the first global buffer GB0 performs the output data read operation, the output data read operation may be performed in the same manner as in the case of the second global buffer GB1. When the output data read operation is performed, the host or the controller may transmit the write command and the output data to the PIM device 600. According to the write command from the host or the controller, the memory banks BK0-BK"N−1" of the PIM device 600 may store the output data transmitted from the host or the controller.

The MAC operators MAC0-MAC"N−1" may perform MAC arithmetic operations of matrix multiplication using the weight data and the vector data transmitted from the memory banks BK0-BK"N−1" and the first global buffer GB0, respectively, or from the weight data and the vector data transmitted from the memory banks BK0-BK"N−1" and the second global buffer GB1, respectively. The MAC operators MAC0-MAC"N−1" may generate MAC result data as a result of performing the MAC arithmetic operations. The MAC operators MAC0-MAC"N−1" may transmit the MAC result data to the first global buffer GB0 or the second global buffer GB1 through the GIO line. In an embodiment, the MAC arithmetic operations of the MAC operators MAC0-MAC"N−1" may be performed in synchronization with clock signals transmitted from the memory banks BK0-BK"N−1".

The command decoder 611 may receive a command CMD from the host or the controller and generate and output control signals for controlling various operations of the MAC units MU0-MU"N−1", the first global buffer GB0, and the second global buffer GB1. In an embodiment, the control signals output from the command decoder 611 may include a read control signal RD, a write control signal WR, a vector data write control signal WR_V, a MAC arithmetic control signal MAC, an output data read control signal RD_OUT, and a MAC result data write control signal WR_RST.

When the read control signal RD is output from the command decoder 611, the memory banks BK0-BK“N−1” may transmit read data to the host or the controller through the GIO line and the data input/output circuit 613. When the write control signal WR is output from the command decoder 611, the memory banks BK0-BK“N−1” may store the write data that is output from the host or the controller to be transmitted through the data input/output circuit 613 and the GIO line. When the vector data write control signal WR_V is output from the command decoder 611, the first global buffer GB0 or the second global buffer GB1 may store the vector data that is transmitted from the host or the controller to be transmitted through the data input/output circuit 613 and the GIO line. When the MAC arithmetic control signal MAC is output from the command decoder 611, the memory banks BK0-BK“N−1” may transmit weight data and a MAC clock signal to the MAC operators MAC0-MAC“N−1”, and the first global buffer GB0 or the second global buffer GB1 may transmit the vector data to the MAC operators MAC0-MAC“N−1”. The MAC operators MAC0-MAC“N−1” may be synchronized with the MAC clock signal to perform MAC arithmetic operations using the weight data and the vector data. When the MAC result data write control signal WR_RST is output from the command decoder 611, the MAC operators MAC0-MAC“N−1” may transmit the MAC result data generated as a result of the MAC arithmetic operations to the first global buffer GB0 or the second global buffer GB1. The first global buffer GB0 or the second global buffer GB1 receiving the MAC result data may store the MAC result data. When the output data read control signal RD_OUT is output from the command decoder 611, the first global buffer GB0 or the second global buffer GB1 may transmit output data, which is the MAC result data in the output layer, to the host or the controller through the GIO line and the data input/output circuit 613.

The address latch 612 may receive an address signal ADDR from the host or the controller. The address latch 612 may latch the address signal ADDR to generate and output a row address RA and a bank address BA. The row address RA and the bank address BA output from the address latch 612 may be transmitted to the memory banks BK0-BK“N−1”. The address latch 612 may latch the address signal ADDR to generate and output a column address CA. The column address CA output from the address latch 612 may be transmitted to the first global buffer GB0 or the second global buffer GB1 and the memory banks BK0-BK“N−1”.

The data input/output circuit 613 may receive data DATA from the host or the controller, or may transmit data DATA to the host or the controller. In an embodiment, the data input/output circuit 613 may include a plurality of input/output terminals. In an embodiment, the data input/output circuit 613 may include a data input/output buffer. The data input/output circuit 613 may exchange data with the memory banks BK0-BK“N−1”, the first global buffer GB0, and the second global buffer GB1 through the GIO line in the PIM device 600. The data input/output circuit 613 may transmit the vector data or the MAC result data to the first global buffer GB0 or the second global buffer GB1 through the GIO line in the PIM device 600. The data input/output circuit 613 may receive the MAC result data from the first global buffer GB0 or the second global buffer GB1 to transmit the received MAC result data to the host or the controller through the GIO line in the PIM device 600.

Figure 32:
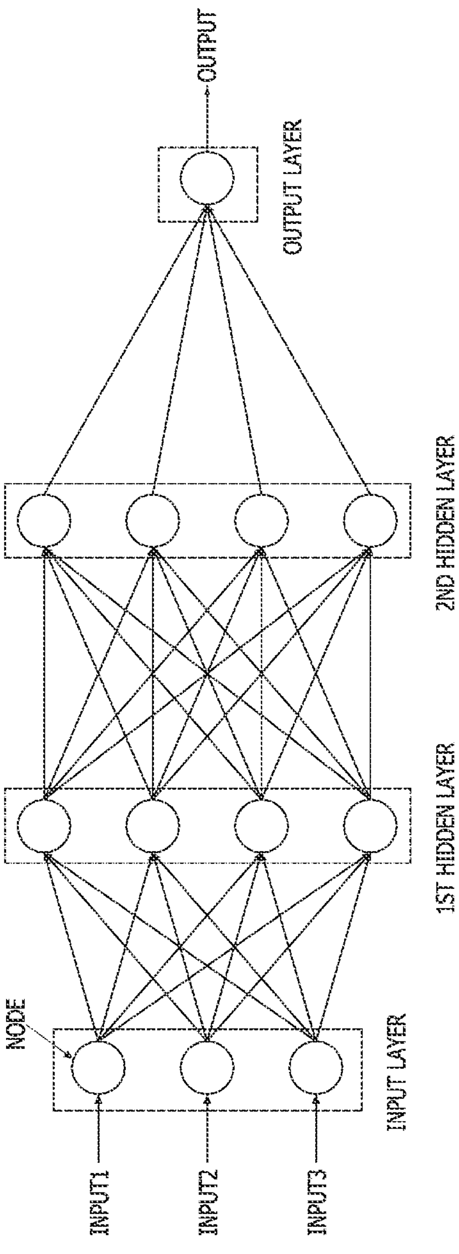
FIG. 32 is a diagram illustrating an example of a neural network operation performed by the PIM device of FIG. 31.

FIG. 32 is a diagram illustrating an example of a neural network operation performed by the PIM device 600 of FIG. 31. Referring to FIG. 32, the neural network may be configured with a multi-layer perception (MLP) including an input layer, at least one hidden layer, and an output layer. In this embodiment, a case in which the neural network includes two hidden layers is shown as an example, but in the case of a deep MLP, three or more hidden layers may be disposed between the input layer and the output layer. In the following embodiments, it is assumed that the MLP has already been learned and a weight matrix is set in each layer. Each of the input layer, the first hidden layer, the second hidden layer, and the output layer may include at least one node. As illustrated in FIG. 32, the input layer may include three nodes, each of the first hidden layer and the second hidden layer may include four nodes, and the output layer may include one node. However, such a configuration is only an example, and the number of nodes in each of the input layer, the first hidden layer, the second hidden layer, and the output layer may be variously set. The nodes of the input layer may respectively receive input data INPUT1, INPUT2, and INPUT3. Output data output from the input layer may be used as input data of the first hidden layer. Output data output from the first hidden layer may be used as input data of the second hidden layer. In addition, output data output from the second hidden layer may be used as input data of the output layer.

The input data input to each of the input layer, the first hidden layer, the second hidden layer, and the output layer may have a vector matrix format used in the matrix multiplication. In the input layer, first matrix multiplication on a first vector matrix, which is the input data INPUT1, INPUT2, and INPUT3, and a first weight matrix, that is, a first MAC arithmetic operation may be performed. The input layer may perform the first MAC arithmetic operation to generate a second vector matrix, and may transmit the generated second vector matrix to the first hidden layer. In the first hidden layer, second matrix multiplication on the second vector matrix and a second weight matrix, that is, a second MAC arithmetic operation may be performed. The first hidden layer may perform the second MAC arithmetic operation to generate a third vector matrix, and may transmit the generated third vector matrix to the second hidden layer. In the second hidden layer, third matrix multiplication on the third vector matrix and a third weight matrix, that is, a third MAC arithmetic operation may be performed. The second hidden layer may perform the third MAC arithmetic operation to generate a fourth vector matrix, and may transmit the generated fourth vector matrix to the output layer. In the output layer, fourth matrix multiplication on the fourth vector matrix and a fourth weight matrix, that is, a fourth MAC arithmetic operation may be performed. The output layer may perform the fourth MAC arithmetic operation to generate final output data OUTPUT.

The PIM device 600 of FIG. 31 may perform the first to fourth MAC arithmetic operations to perform the MLP operation of FIG. 32. In order for the PIM device 600 to perform the first MAC arithmetic operation in the input layer, first vector data as elements of the first vector matrix and first weight data as elements of the first weight matrix may be provided to the MAC units MU0-MU“N−1”. When the first MAC arithmetic operation is performed, the MAC units MU0-MU“N−1” may output second vector data used as input data to the first hidden layer. In order for the PIM device 600 to perform the second MAC arithmetic operation in the first hidden layer, second vector data and second weight data may be provided to the MAC units MU0-

MU"N−1". When the second MAC arithmetic operation is performed, the MAC units MU0-MU"N−1" may output third vector data used as input data to the second hidden layer. In order for the PIM device 600 to perform the third MAC arithmetic operation in the second hidden layer, third vector data and third weight data may be provided to the MAC units MU0-MU"N−1". When the third MAC arithmetic operation is performed, the MAC units MU0-MU"N−1" may output fourth vector data used as input data to the output layer. In order for the PIM device 600 to perform the fourth MAC arithmetic operation in the output layer, the fourth vector data and fourth weight data may be provided to the MAC units MU0-MU"N−1".

Figure 33:
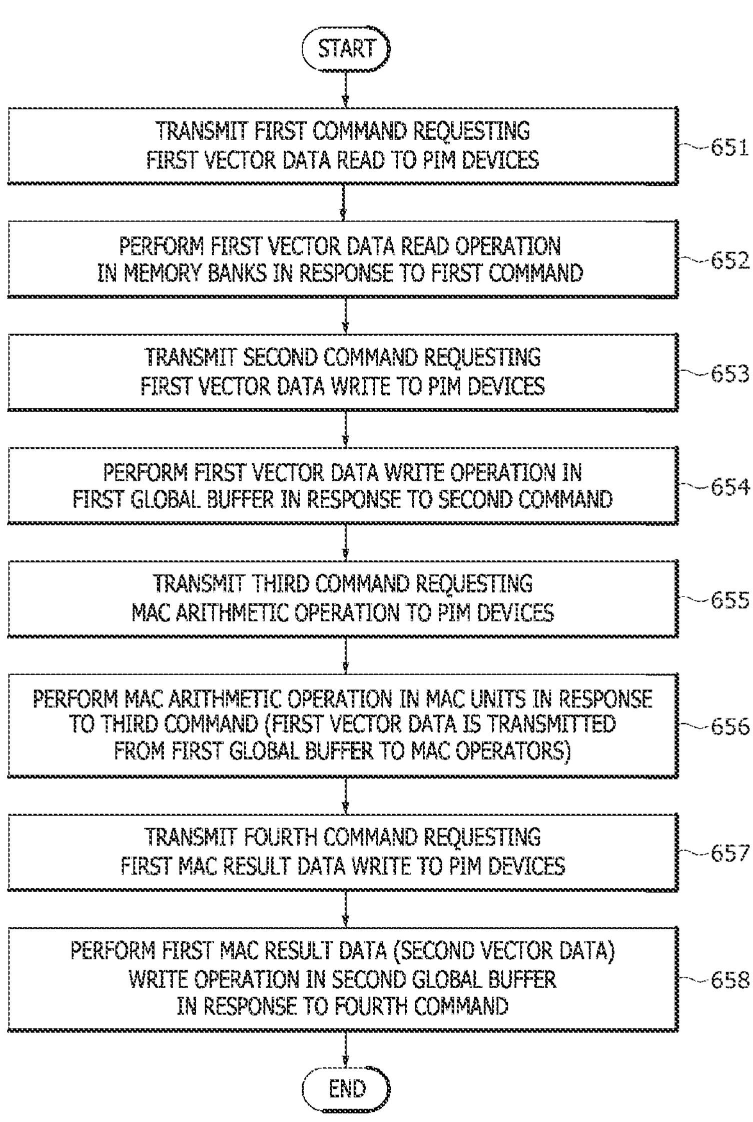
FIG. 33 is a flowchart illustrating operations of a host for performing an input layer operation of an MLP of FIG. 32 and the PIM device of FIG. 31.

FIG. 33 is a flowchart illustrating operations of a host and the PIM device 600 of FIG. 31 for performing the input layer operation of the MLP of FIG. 32. FIGS. 34 to 37 are diagrams illustrating the operations of the PIM device 600 in steps of the flowchart of FIG. 33. In the following embodiments, descriptions on an active operation and a pre-charge operation in the memory banks BK0-BK"N−1" of the PIM device 600 will be omitted. First, referring to FIGS. 33 and 34, in step 651, the host may transmit a first command CMD1 and a first address ADDR1 to the PIM device 600. Here, the first command CMD1 may be defined as a command requesting a data read operation of the memory banks BK0-BK"N−1". In step 652, the PIM device 600 may perform a read operation on first vector data DA_V1 in the memory banks BK0-BK"N−1" in response to the first command CMD1.

Specifically, the command decoder 611 may decode the first command CMD1 from the host to generate and output a read control signal RD. The address latch 612 may latch the first address ADDR1 from the host to output a first bank address BA1/first column address CA1. In various embodiments below, it is assumed that the first vector data DA_V1 has been stored in the first memory bank BK0. In this case, the first bank address BA1 may designate the first memory bank BK0, and the first column address CA1 may designate columns in which the first vector data DA_V1 is stored in the first memory bank BK0. The first memory bank BK0 may transmit the first vector data DA_V1 to the data input/output circuit 613 through the GIO line in response to the read control signal RD. The data input/output circuit 613 may output the first vector data DA_V1 to transmit the first vector data DA_V1 to the host. In this way, by performing the steps 651 and 652, the first vector data DA_V1 stored in the first memory bank BK0 of the PIM device 600 may be transmitted to the host.

Figure 35:
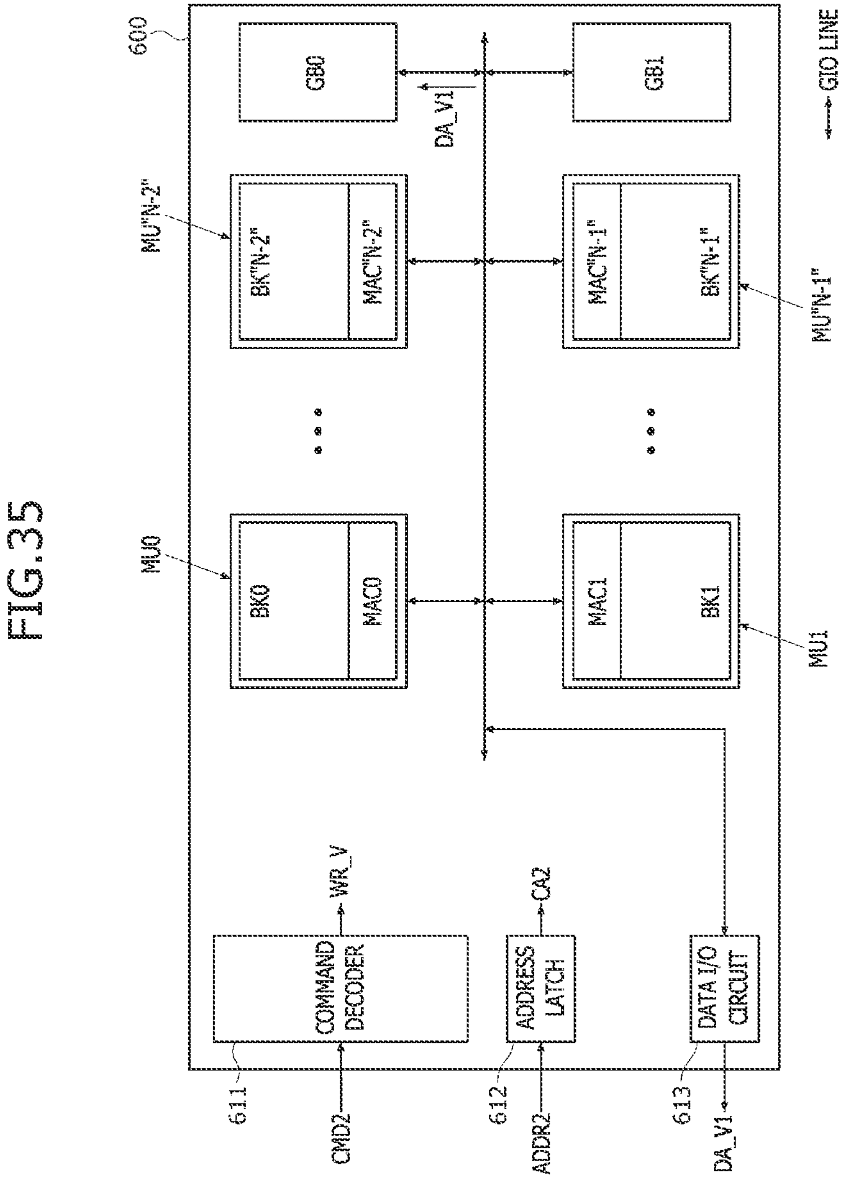
FIG. 35 is a diagram illustrating operations of the PIM device according to steps 713 and 714 in the flowchart of FIG. 33.

Next, referring to FIGS. 33 and 35, in step 653, the host may transmit a second command CMD2, a second address ADDR2, and the first vector data DA_V1 to the PIM device 600. Here, the second command CMD2 may be defined as a command requesting a vector data write operation of the first global buffer GB0 or the second global buffer GB1. In an embodiment, the host may transmit a signal designating the first global buffer GB0 together with the second command CMD2 to the PIM device 600. In step 654, the first global buffer GB0 of the PIM device 600 may perform a write operation on the first vector data DA_V1 in response to the second command CMD2. Specifically, the command decoder 611 may decode the second command CMD2 from the host to generate and output a vector data write control signal WR_V. The address latch 612 may latch the second address ADDR2 from the host to output a second column address CA2. The second column address CA2 may designate columns in which the first vector data DA_V1 is to be stored in the first global buffer GB0. In an embodiment, the second column address CA2 may be the same as a column address of columns in which weight data is stored in the memory banks BK0-BK"N−1". The data input/output circuit 613 may transmit the first vector data DA_V1 transmitted from the host to the first global buffer GB0 through the GIO line. The first global buffer GB0 may store the first vector data DA_V1 in the columns designated by the second column address CA2 in response to the vector data write control signal WR_V. In this way, by performing the steps 653 and 654, the first vector data DA_V1 may be transmitted from the host to the first global buffer GB0 of the PIM device 600.

Figure 36:
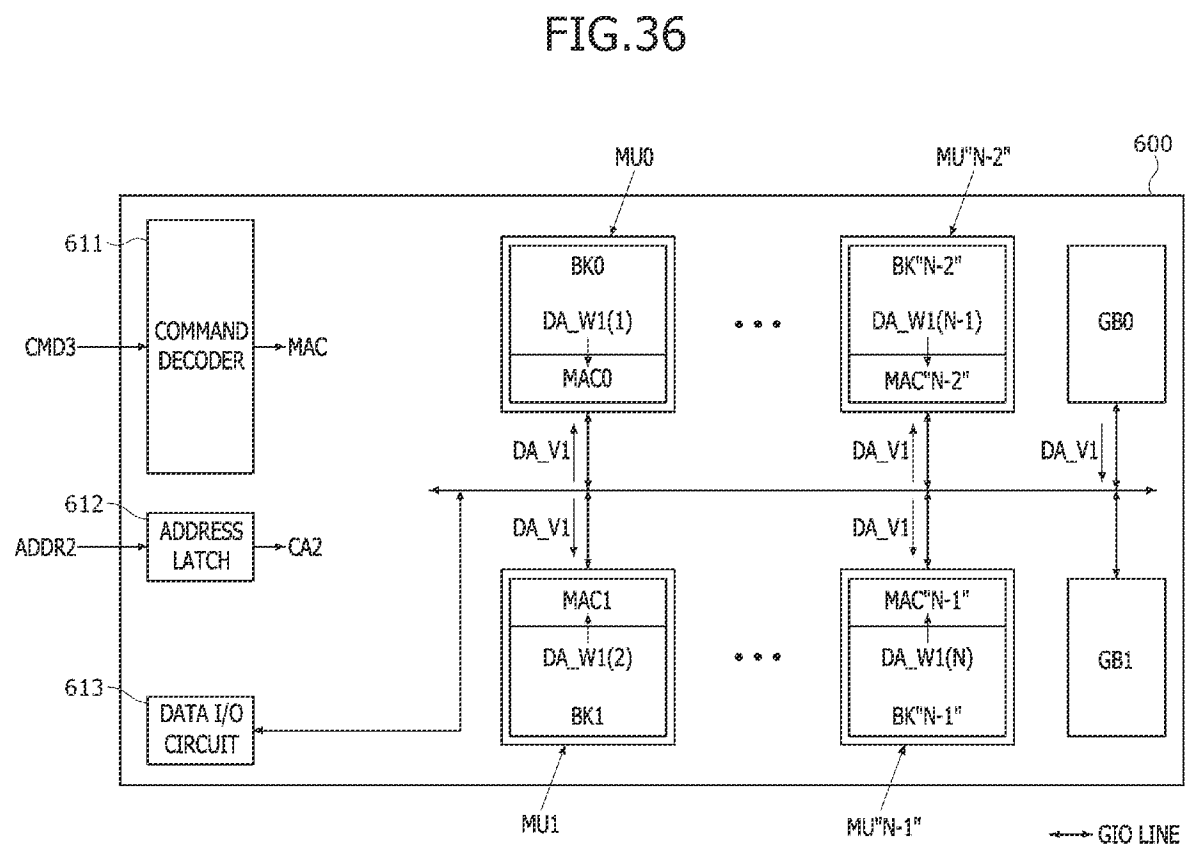

Next, referring to FIGS. 33 and 36, in step 655, the host may transmit a third command CMD3 and a second address ADDR2 to the PIM device 600. Here, the third command CMD3 may be defined as a command requesting MAC arithmetic operations of the MAC operators MAC0-MAC"N−1". In step 656, the MAC operators MAC0-MAC"N−1" of the PIM device 600 may perform the MAC arithmetic operations in the input layer in response to the third command CMD3.

Specifically, the command decoder 611 may decode the third command CDM3 from the host to generate and output a MAC arithmetic signal MAC. The address latch 612 may latch the second address ADDR2 from the host to output a second column address CA2. The memory banks BK0-BK"N−1" may transmit first weight data DA_W1(1)-DA_W1(N) to the MAC operators MAC0-MAC"N−1", respectively. As illustrated in FIG. 36, the first memory bank BK0 may transmit a first set DA_W1(1) of the first weight data to the first MAC operator MAC0. The second memory bank BK1 may transmit a second set DA_W1(2) of the first weight data to the second MAC operator MAC1. The "N−1"*th* memory bank BK"N−2" may transmit an "N−1"*th* set DA_W1(N−1) of the first weight data to the "N−1"*th* MAC operator MAC"N−2". In addition, the "N"*th* memory bank BK"N−1" may transmit an "N"*th* set DA_W1(N) of the first weight data to the "N"*th* MAC operator MAC"N−1". The first global buffer GB0 may transmit the first vector data DA_V1 in common to the MAC operators MAC0-MAC"N−1".

The MAC operators MAC0-MAC"N−1" may perform MAC arithmetic operations using the received weight data and vector data. The first MAC operator MAC0 may perform the MAC arithmetic operation on the first set DA_W1(1) of the first weight data and the first vector data DA_V1. The second MAC operator MAC1 may perform the MAC arithmetic operation on the second set DA_W1(2) of the first weight data and the first vector data DA_V1. The "N−1"*th* MAC operator MAC"N−2" may perform the MAC arithmetic operation on the "N−1"*th* set DA_W1(N−1) of the first weight data and the first vector data DA_V1. The "N"*th* MAC operator MAC"N−1" may perform the MAC arithmetic operation on the "N"*th* set DA_W1(N) of the first weight data and the first vector data DA_V1.

Figure 37:
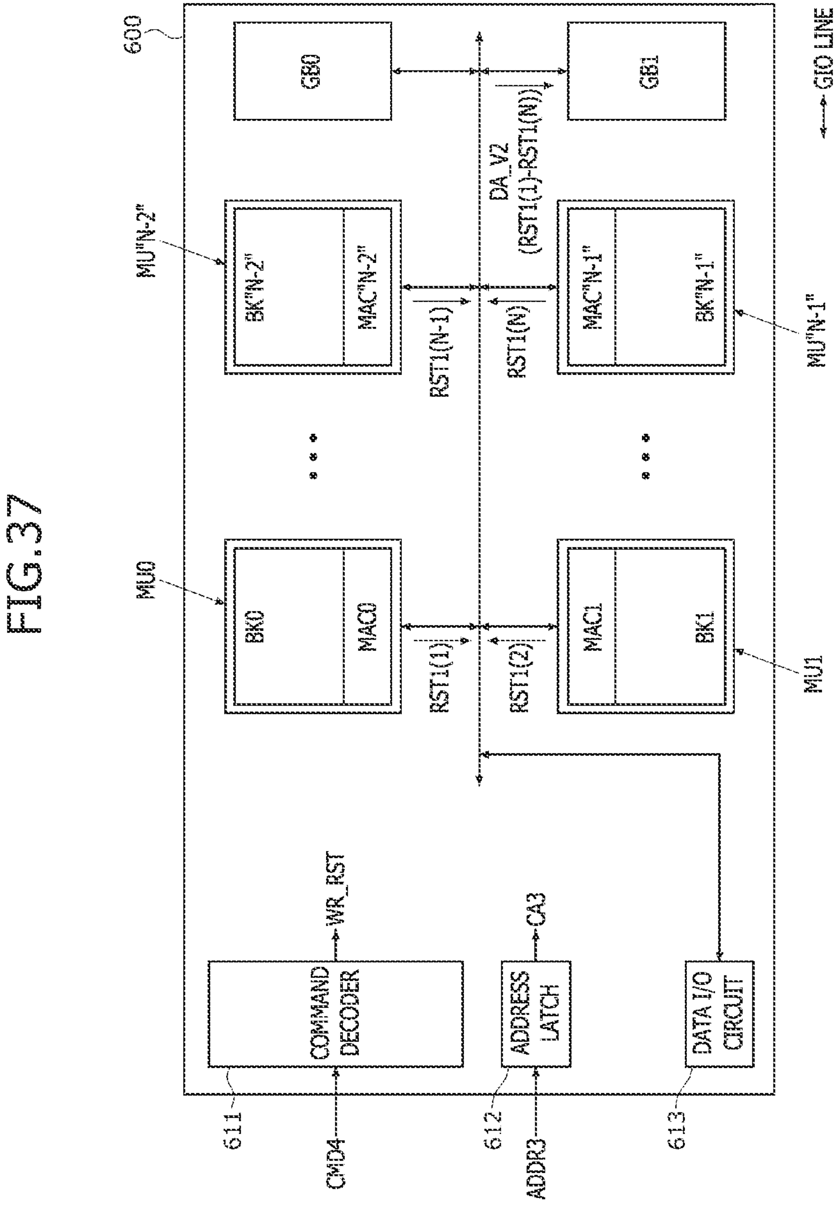
FIG. 37 is a diagram illustrating operations of the PIM device according to steps 717 and 718 in the flowchart of FIG. 33.

Next, referring to FIGS. 33 and 37, in step 657, the host may transmit a fourth command CMD4 and a third address ADDR3 to the PIM device 600. Here, the fourth command CMD4 may be defined as a command requesting a MAC result data write operation of the first global buffer GB0 or the second global buffer GB1. In an embodiment, the host may transmit a signal designating the second global buffer GB1 together with the fourth command CMD4 to the PIM device 600. In step 658, in response to the fourth command CMD4, the MAC operators MAC0-MAC"N−1" of the PIM device 600 may transmit first MAC result data RST1(1)-RST1(N) to the second global buffer GB1 through the GIO line, and the second global buffer GB1 may perform a write operation on the first MAC result data RST1(1)-RST1(N).

Specifically, the command decoder 611 may decode the fourth command CMD4 from the host to generate and output a MAC result data write control signal WR_RST. The address latch 612 may latch the third address ADDR3 from the host to output a third column address CA3. The MAC operators MAC0-MAC"N−1" may output the first MAC result data RST1(1)-RST1(N) generated by the MAC arithmetic operation in the input layer to the GIO line in response to the MAC result data write control signal WR_RST. The first MAC result data RST1(1)-RST1(N) output from the MAC operators MAC0-MAC"N−1" may constitute second vector data DA_V2 to be input to the first hidden layer of the MLP of FIG. 32.

As illustrated in FIG. 37, the first MAC operator MAC0 may output the first MAC result data RST1(1) constituting a first set of the second vector data DA_V2. The second MAC operator MAC1 may output the first MAC result data RST1(2) constituting a second set of the second vector data DA_V2. The "N−1"$^{th}$ MAC operator MAC"N−2" may output the first MAC result data RST1(N−1) constituting an "N−1"$^{th}$ set of the second vector data DA_V2. The "N"$^{th}$ MAC operator MAC"N−1" may output the first MAC result data RST1(N) constituting an "N"$^{th}$ set of the second vector data DA_V2. The second vector data DA_V2 may have a vector matrix format having the first MAC result data RST1(1)-RST1(N) as elements. The first MAC result data RST1(1)-RST1(N) output from the MAC operators MAC0-MAC"N−1", that is, the second vector data DA_V2 may be transmitted to the second global buffer GB1 through the GIO line. The second global buffer GB1 may store the second vector data DA_V2 transmitted through the GIO line in columns designated by the third column address CA3. In this way, by performing the steps 657 and 658, the first MAC result data RST1(1)-RST1(N) may be output from the MAC operators MAC0-MAC"N−1", and may be stored in the second global buffer GB1 as the second vector data DA_V2.

Figure 38:
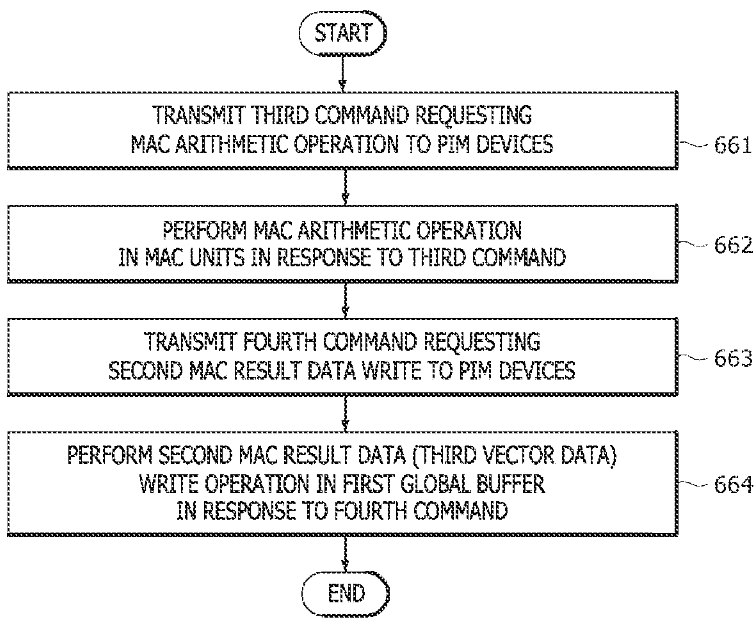
FIG. 38 is a flowchart illustrating operations of a host for performing a first hidden layer operation of the MLP of FIG. 32 and the PIM device of FIG. 31.
Figure 39:
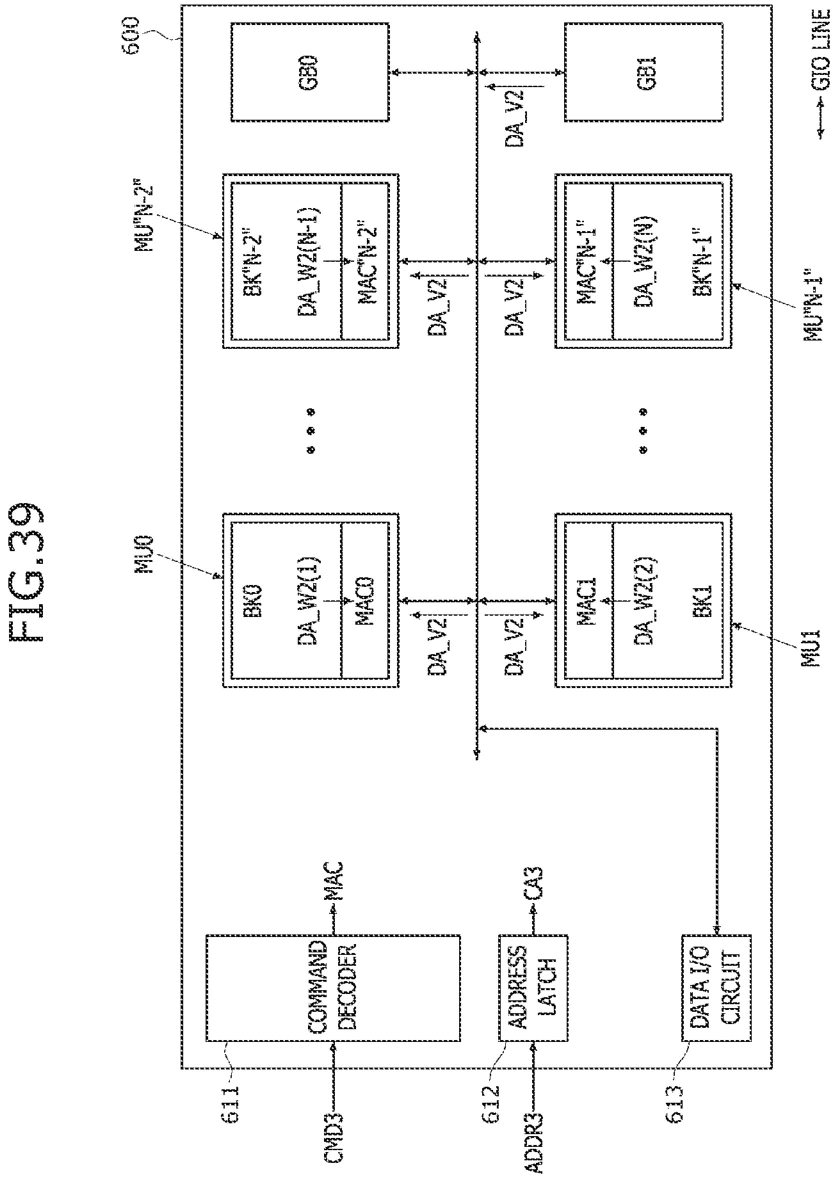
FIG. 39 is a diagram illustrating operations of the PIM device according to steps 721 and 722 in the flowchart of FIG. 38.
Figure 40:
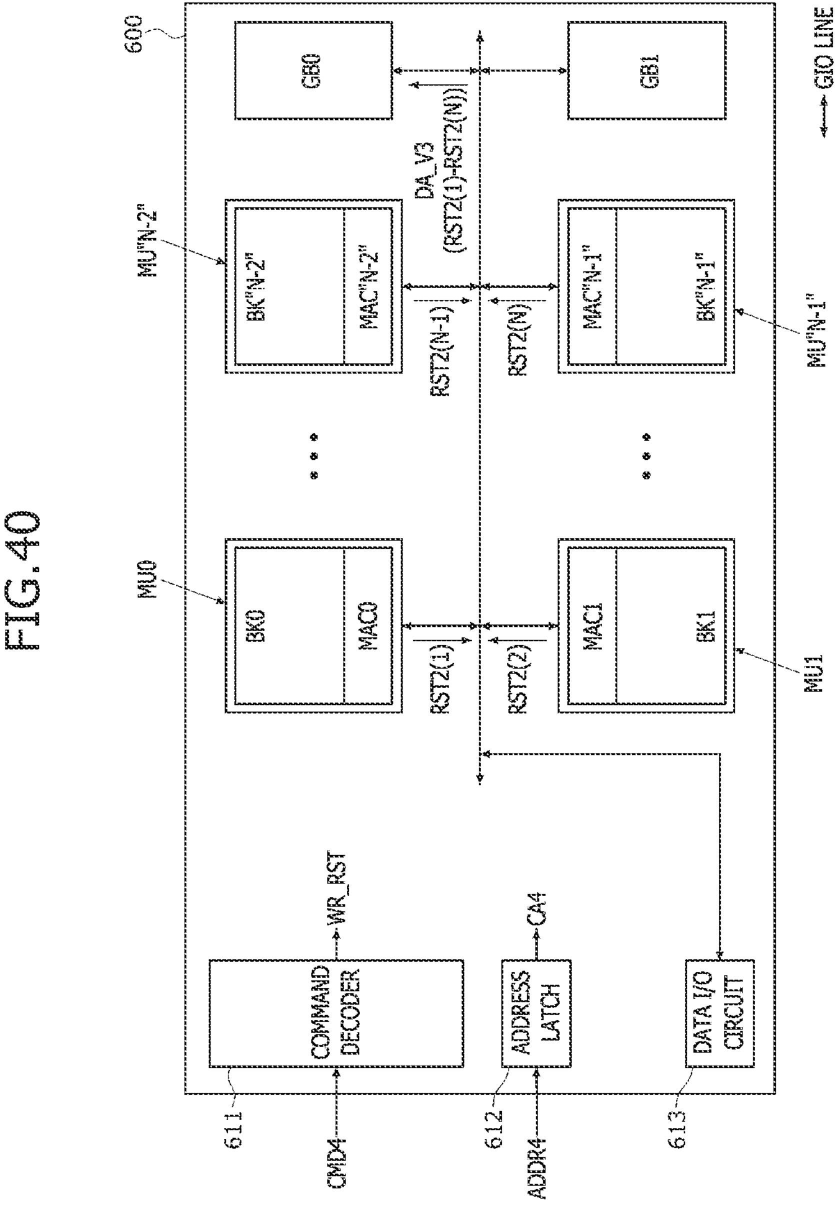
FIG. 40 is a diagram illustrating operations of the PIM device according to steps 723 and 724 in the flowchart of FIG. 38.

FIG. 38 is a flowchart illustrating operations of a host and the PIM device 600 of FIG. 31 for performing a first hidden layer operation of the MLP of FIG. 32. FIGS. 39 and 40 are diagrams illustrating the operations of the PIM device 600 in steps of the flowchart of FIG. 38. First, referring to FIGS. 38 and 39, in step 661, the host may transmit a third command CMD3 and a third address ADDR3 to the PIM device 600. As described above with reference to FIGS. 33 and 36, the third command CMD3 may request the MAC arithmetic operations of the MAC operators MAC0-MAC"N−1". In step 662, the MAC operators MAC0-MAC"N−1" of the PIM device 600 may perform the MAC arithmetic operations in the hidden layer in response to the third command CMD3.

Specifically, the command decoder 611 may decode the third command CMD3 from the host to generate and output a MAC arithmetic control signal MAC. The address latch 612 may latch the third address ADDR3 from the host to output a third column address CA3. The memory banks BK0-BK"N−1" may transmit second weight data DA_W2(1)-DA_W2(N) to the MAC operators MAC0-MAC"N−1". As illustrated in FIG. 39, the first memory bank BK0 may transmit a first set DA_W2(1) of the second weight data to the first MAC operator MAC0. The second memory bank BK1 may transmit a second set DA_W2(2) of the second weight data to the second MAC operator MAC1. The "N−1"$^{th}$ memory bank BK"N−2" may transmit an "N−1"$^{th}$ set DA_W2(N−1) of the second weight data to the "N−1"$^{th}$ MAC operator MAC"N−2". In addition, the "N"$^{th}$ memory bank BK"N−1" may transmit an "N"$^{th}$ set DA_W2(N) of the second weight data to the "N"$^{th}$ MAC operator MAC"N−1". The second global buffer GB1 may transmit the second vector data DA_V2 in common to the MAC operators MAC0-MAC"N−1".

The MAC operators MAC0-MAC"N−1" may perform MAC arithmetic operations using the received weight data and vector data. The first MAC operator MAC0 may perform the MAC arithmetic operation on the first set DA_W2(1) of the second weight data and the second vector data DA_V2. The second MAC operator MAC1 may perform the MAC arithmetic operation on the second set DA_W2(2) of the second weight data and the second vector data DA_V2. The "N−1"$^{th}$ MAC operator MAC"N−2" may perform the MAC arithmetic operation on the "N−1"$^{th}$ set DA_W2(N−1) of the second weight data and the second vector data DA_V2. The "N"$^{th}$ MAC operator MAC"N−1" may perform the MAC arithmetic operation on the "N"$^{th}$ set DA_W2(N) of the second weight data and the second vector data DA_V2.

Next, referring to FIGS. 38 and 40, in step 663, the host may transmit a fourth command CMD4 and a fourth address ADDR4 to the PIM device 600. As described above with reference to FIGS. 33 and 37, the fourth command CMD4 may request a MAC result data write operation of the first global buffer GB0 or the second global buffer GB1. In an embodiment, the host may transmit a signal designating the first global buffer GB0 together with the fourth command CMD4 to the PIM device 600. In step 664, in response to the fourth command CMD4, the MAC operators MAC0-MAC"N−1" of the PIM device 600 may transmit second MAC result data RST2(1)-RST2(N) to the first global buffer GB0 through the GIO line, and the first global buffer GB0 may perform a write operation on the second MAC result data RST2(1)-RST2(N).

Specifically, the command decoder 611 may decode the fourth command CMD4 from the host to generate and output a MAC result data write control signal WR_RST. The address latch 612 may latch the fourth address ADDR4 from the host to output a fourth column address CA4. The MAC operators MAC0-MAC"N−1" may output the second MAC result data RST2(1)-RST2(N) generated by the MAC arithmetic operations in the first hidden layer to the GIO line in response to the MAC result data write control signal WR_RST. The second MAC result data RST2(1)-RST2(N) output from the MAC operators MAC0-MAC"N−1" may constitute third vector data DA_V3 to be input to the second hidden layer of the MLP of FIG. 32.

As illustrated in FIG. 40, the first MAC operator MAC0 may output the second MAC result data RST2(1) constituting a first set of the third vector data DA_V3. The second MAC operator MAC1 may output the second MAC result data RST2(2) constituting a second set of the third vector data DA_V3. The "N−1"$^{th}$ MAC operator MAC"N−2" may output the second MAC result data RST2(N−1) constituting an "N−1"$^{th}$ set of the third vector data DA_V3. The "N"$^{th}$ MAC operator MAC"N−1" may output the second MAC result data RST2(N) constituting an "N"$^{th}$ set of the third vector data DA_V3. The third vector data DA_V3 may have a vector matrix format having the second MAC result data RST2(1)-RST2(N) as elements. The second MAC result data RST2(1)-RST2(N) output from the MAC operators MAC0-MAC"N−1", that is, the third vector data DA_V3 may be transmitted to the first global buffer GB0 through the GIO line. The first global buffer GB0 may store the third vector data DA_V3 transmitted through the GIO line in columns designated by the fourth column address CA4. In this way, by performing the steps 663 and 664, the second MAC result data RST2(1)-RST2(N) may be output from the MAC operators MAC0-MAC"N−1", and may be stored in the first global buffer GB0 as the third vector data DA_V3.

Figure 41:
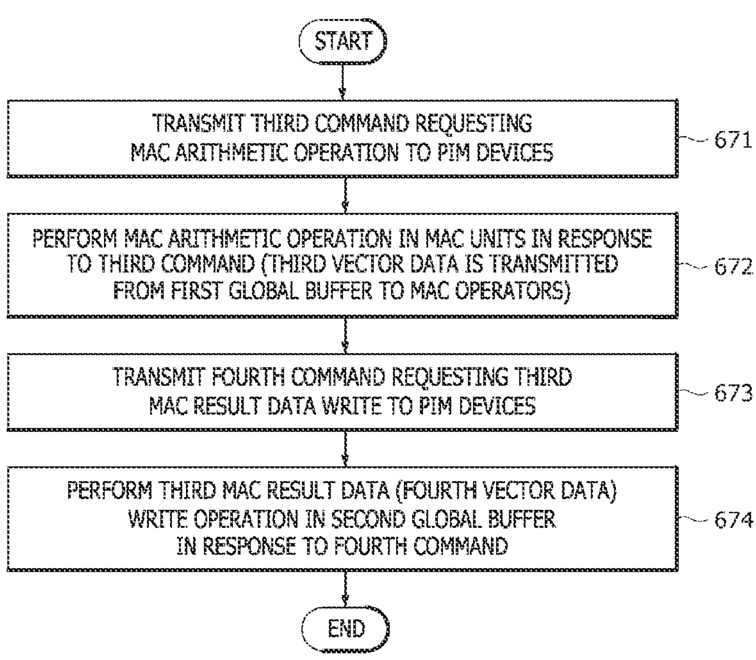
FIG. 41 is a flowchart illustrating operations of a host for performing a second hidden layer operation of the MLP of FIG. 32 and the PIM device of FIG. 31.

FIG. 41 is a flowchart illustrating operations of a host and the PIM device 600 of FIG. 31 for performing a second hidden layer operation of the MLP of FIG. 32. FIGS. 42 and 43 are diagrams illustrating operations of the PIM device 600 in steps of the flowchart of FIG. 41. First, referring to FIGS. 41 and 42, in step 671, the host may transmit a third command CMD3 and a fourth address ADDR4 to the PIM device 600. As described above with reference to FIGS. 33 and 36, the third command CMD3 may request MAC arithmetic operations of the MAC operators MAC0-MAC"N−1". In step 672, the PIM device 600 may perform the MAC arithmetic operations in the second hidden layer in response to the third command CMD3.

Specifically, the command decoder 611 may decode the third command CMD3 from the host to generate and output a MAC arithmetic control signal MAC. The address latch 612 may latch the fourth address ADDR4 from the host to output a fourth column address CA4. The memory banks BK0-BK"N−1" may transmit third weight data DA_W3(1)-DA_W3(N) to the MAC operators MAC0-MAC"N−1". As illustrated in FIG. 42, the first memory bank BK0 may transmit a first set DA_W3(1) of the third weight data to the first MAC operator MAC0. The second memory bank BK1 may transmit a second set DA_W3(2) of the third weight data to the second MAC operator MAC1. The "N−1"*th* memory bank BK"N−2" may transmit an "N−1"*th* set DA_W3(N−1) of the third weight data to the "N−1"*th* MAC operator MAC"N−2". The "N"*th* memory bank BK"N−1" may transmit an "N"*th* set DA_W3(N) of the third weight data to the "N"*th* MAC operator MAC"N−1". The first global buffer GB0 may transmit the third vector data DA_V3 in common to the MAC operators MAC0-MAC"N−1".

The MAC operators MAC0-MAC"N−1" may perform MAC arithmetic operations using the received weight data and vector data. The first MAC operator MAC0 may perform the MAC arithmetic operation on the first set DA_W3 (1) of the third weight data and the third vector data DA_V3. The second MAC operator MAC1 may perform the MAC arithmetic operation on the second set DA_W3(2) of the third weight data and the third vector data DA_V3. The "N−1"*th* MAC operator MAC"N−2" may perform the MAC arithmetic operation on the "N−1"*th* set DA_W3(N−1) of the third weight data and the third vector data DA_V3. The "N"*th* MAC operator MAC"N−1" may perform the MAC arithmetic operation on the "N"*th* set DA_W3(N) of the third weight data and the third vector data DA_V3.

Next, referring to FIGS. 41 and 43, in step 673, the host may transmit a fourth command CMD4 and a fifth address ADDR5 to the PIM device 600. As described above with reference to FIGS. 33 and 37, the fourth command CMD4 may request a MAC result data write operation of the first global buffer GB0 or the second global buffer GB1. In an embodiment, the host may transmit a signal designating the second global buffer GB1 together with the fourth command CMD4 to the PIM device 600. In step 674, in response to the fourth command CMD4, the MAC operators MAC0-MAC"N−1" of the PIM device 600 may transmit third MAC result data RST3(1)-RST3(N) to the second global buffer GB1 through the GIO line, and the second global buffer GB1 may perform a write operation on the third MAC result data RST3(1)-RST3(N).

Specifically, the command decoder 611 may decode the fourth command CMD4 from the host to generate and output a MAC result data write control signal WR_RST. The address latch 612 may latch the fifth address ADDR5 from the host to output a fifth column address CA5. The MAC operators MAC0-MAC"N−1" may output the third MAC result data RST3(1)-RST3(N) generated by the MAC arithmetic operations in the second hidden layer to the GIO line in response to the MAC result data write control signal WR_RST. The third MAC result data RST3(1)-RST3(N) output from the MAC operators MAC0-MAC"N−1" may constitute fourth vector data DA_V4 to be input to the output layer of the MLP of FIG. 32.

As illustrated in FIG. 43, the first MAC operator MAC0 may output the third MAC result data RST3(1) constituting a first set of the fourth vector data DA_V4. The second MAC operator MAC1 may output the third MAC result data RST3(2) constituting a second set of the fourth vector data DA_V4. The "N−1"*th* MAC operator MAC"N−2" may output the third MAC result data RST3(N−1) constituting an "N−1"*th* set of the fourth vector data DA_V4. The "N"*th* MAC operator MAC"N−1" may output the third MAC result data RST3(N) constituting an "N"*th* set of the fourth vector data DA_V4. The fourth vector data DA_V4 may have a vector matrix format having the third MAC result data RST3(1)-RST3(N) as elements. The third MAC result data RST3(1)-RST3(N) output from the MAC operators MAC0-MAC"N−1", that is, the fourth vector data DA_V4 may be transmitted to the second global buffer GB1 through the GIO line. The second global buffer GB1 may store the fourth vector data DA_V4 in columns designated by the fifth column address CA5. In this way, by performing the steps 673 and 674, the third MAC result data RST3(1)-RST3(N) may be output from the MAC operators MAC0-MAC"N−1", and may be stored in the second global buffer GB1 as the fourth vector data DA_V4.

Figure 44:
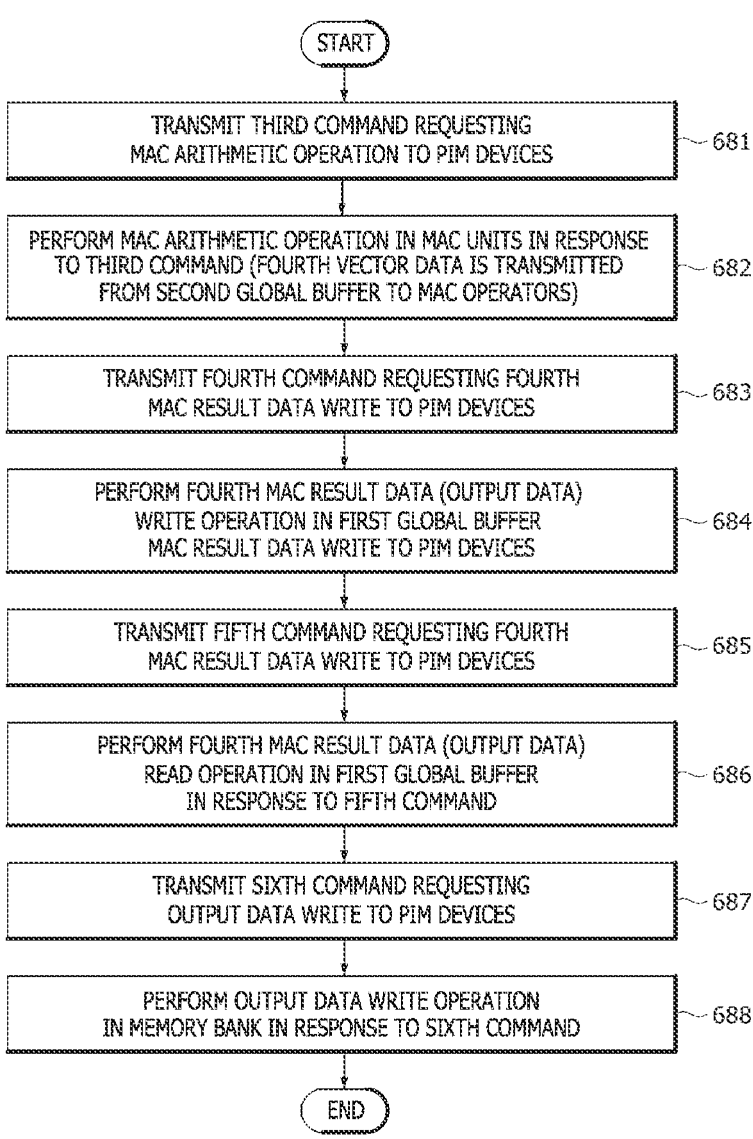
FIG. 44 is a flowchart illustrating operations of a host for performing an output layer operation of the MLP of FIG. 32 and the PIM device of FIG. 31.

FIG. 44 is a flowchart illustrating operations of a host and the PIM device 600 of FIG. 31 for performing an output layer operation of the MLP of FIG. 32. FIGS. 45 to 48 are diagrams illustrating the operations of the PIM device 600 in steps of the flowchart of FIG. 44. First, referring to FIGS. 44 and 45, in step 681, the host may transmit a third command CMD3 and a fifth address ADDR5 to the PIM device 600. As described above with reference to FIGS. 33 and 36, the third command CMD3 may request MAC arithmetic operations of the MAC operators MAC0-MAC"N−1". In step 682, the MAC operators MAC0-MAC"N−1" of the PIM device 600 may perform the MAC arithmetic operations in the output layer in response to the third command CMD3.

Figure 45:
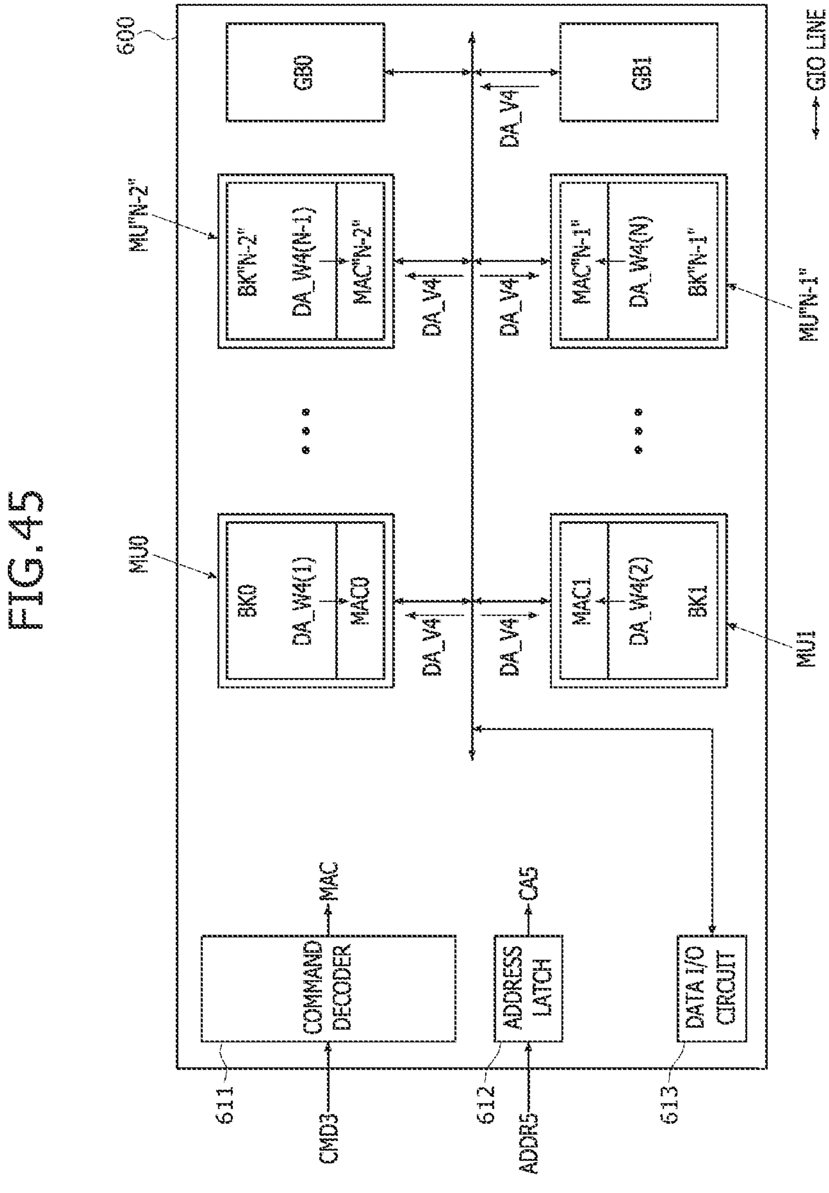
FIG. 45 is a diagram illustrating operations of the PIM device according to steps 741 and 742 in the flowchart of FIG. 44.

Specifically, the command decoder 611 may decode the third command CMD3 from the host to generate and output a MAC arithmetic control signal MAC. The address latch 612 may latch the fifth address ADDR5 from the host to output a fifth column address CA5. The memory banks BK0-BK"N−1" may transmit fourth weight data DA_W4 (1)-DA_W4(N) to the MAC operators MAC0-MAC"N−1". As illustrated in FIG. 45, the first memory bank BK0 may transmit a first set DA_W4(1) of the fourth weight data to the first MAC operator MAC0. The second memory bank BK1 may transmit a second set DA_W4(2) of the fourth weight data to the second MAC operator MAC1. The "N−1"*th* memory bank BK"N−2" may transmit an "N−1"*th* set DA_W4(N−1) of the fourth weight data to the "N−1"*th* MAC operator MAC"N−2". The "N"*th* memory bank BK"N−1" may transmit an "N"*th* set DA_W4(N) of the fourth weight data to the "N"*th* MAC operator MAC"N−1". The second global buffer GB1 may transmit the fourth vector data DA_V4 in common to the MAC operators MAC0-MAC"N−1".

The MAC operators MAC0-MAC"N−1" may perform MAC arithmetic operations using the received weight data and vector data. The first MAC operator MAC0 may perform the MAC arithmetic operation on the first set DA_W4(1) of the fourth weight data and the fourth vector data DA_V4. The second MAC operator MAC1 may perform the MAC arithmetic operation on the second set DA_W4(2) of the fourth weight data and the fourth vector data DA_V4. The "N−1"$^{th}$ MAC operator MAC"N−2" may perform the MAC arithmetic operation on the "N−1"$^{th}$ set DA_W4(N−1) of the fourth weight data and the fourth vector data DA_V4. The "N"$^{th}$ MAC operator MAC"N−1" may perform the MAC arithmetic operation on the "N"$^{th}$ set DA_W4(N) of the fourth weight data and the fourth vector data DA_V4.

Figure 46:
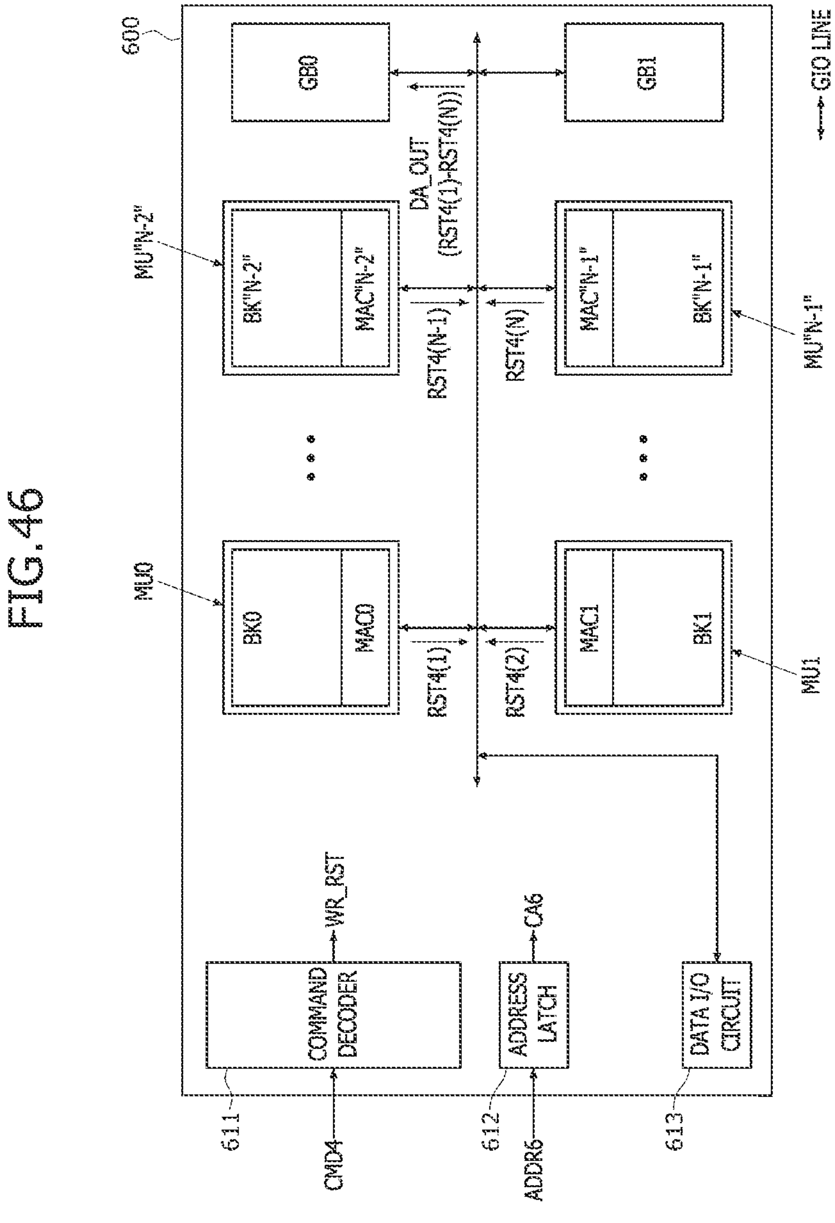
FIG. 46 is a diagram illustrating operations of the PIM device according to steps 743 and 744 in the flowchart of FIG. 44.

Next, referring to FIGS. 44 and 46, in step 683, the host may transmit a fourth command CMD4 and a sixth address ADDR6 to the PIM device 600. As described above with reference to FIGS. 33 and 37, the fourth command CMD4 may request a MAC result data write operation of the first global buffer GB0 or the second global buffer GB1. In an embodiment, the host may transmit a signal designating the first global buffer GB0 together with the fourth command CMD4 to the PIM device 600. In step 684, in response to the fourth command CMD4, the MAC operators MAC0-MAC"N−1" of the PIM device 600 may transmit fourth MAC result data RST4(1)-RST4(N) to the first global buffer GB0 through the GIO line, and the first global buffer GB0 may perform a write operation on the fourth MAC result data RST4(1)-RST4(N).

Specifically, the command decoder 611 may decode the fourth command CMD4 from the host to generate and output a MAC result data write control signal WR_RST. The address latch 612 may latch the sixth address ADDR6 from the host to output a sixth column address CA6. The MAC operators MAC0-MAC"N−1" may output fourth MAC result data RST4(1)-RST4(N) generated by the MAC arithmetic operations in the output layer to the GIO line in response to the MAC result data write control signal WR_RST. The fourth MAC result data RST4(1)-RST4(N) output from the MAC operators MAC0-MAC"N−1" may constitute output data DA_OUT output from the output layer of the MLP of FIG. 32.

As illustrated in FIG. 46, the first MAC operator MAC0 may output the fourth MAC result data RST4(1) constituting a first set of the output data DA_OUT. The second MAC operator MAC1 may output the fourth MAC result data RST4(2) constituting a second set of the output data DA_OUT. The "N−1"th MAC operator MAC"N−2" may output the fourth MAC result data RST4(N−1) constituting an "N−1"th set of the output data DA_OUT. The "N"th MAC operator MAC"N−1" may output the fourth MAC result data RST4(N) constituting an "N"th set of the output data DA_OUT. The output data DA_OUT may have a vector matrix format having the fourth MAC result data RST4(1)-RST4(N) as elements. The fourth MAC result data RST4(1)-RST4(N) output from the MAC operators MAC0-MAC"N−1", that is, the output data DA_OUT may be transmitted to the first global buffer GB0 through the GIO line. The first global buffer GB0 may store the output data DA_OUT transmitted through the GIO line in the columns designated by the sixth column address CA6. In this way, by performing the steps 683 and 684, the fourth MAC result data RST4(1)-RST4(N) may be output from the MAC operators MAC0-MAC"N−1", and may be stored in the first global buffer GB0 as the output data DA_OUT.

Figure 47:
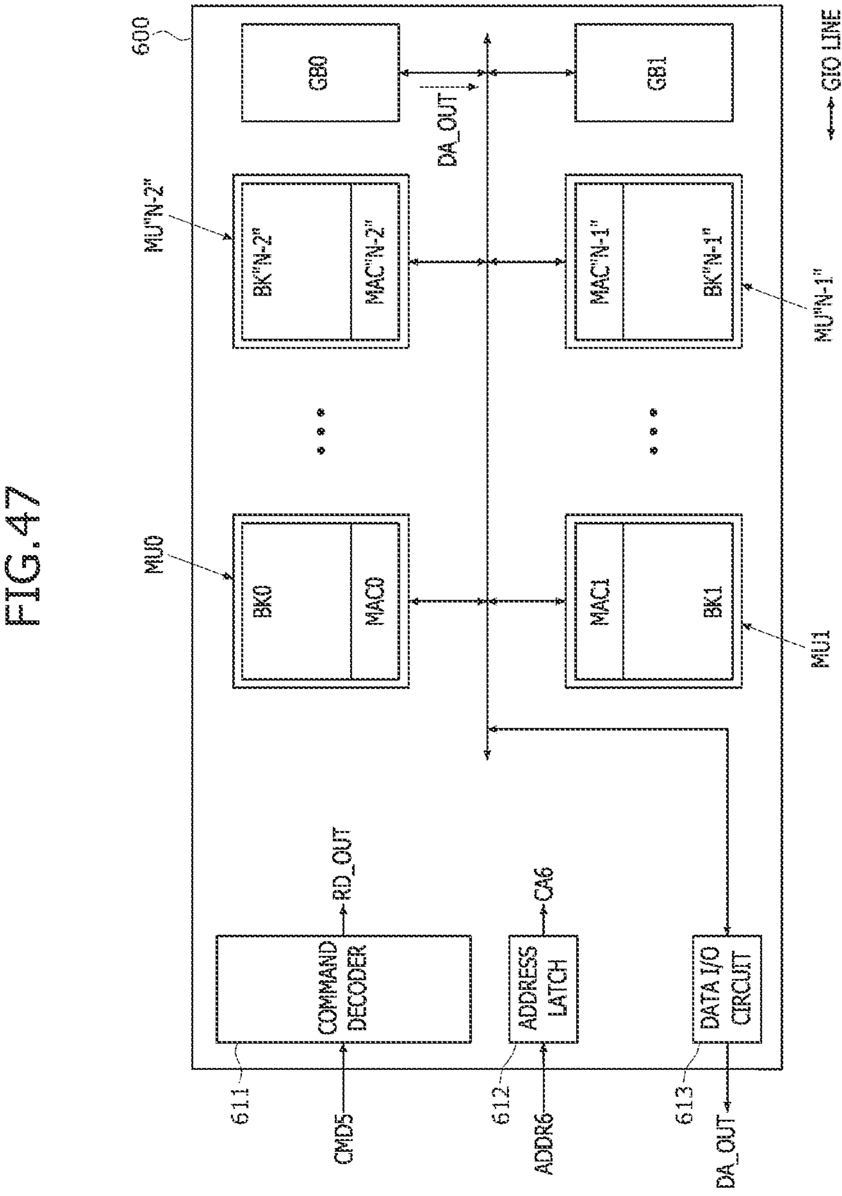
FIG. 47 is a diagram illustrating operations of the PIM device according to steps 745 and 746 in the flowchart of FIG. 44.

Next, referring to FIGS. 44 and 47, in step 685, the host may transmit a fifth command CMD5 and a sixth address ADDR6 to the PIM device 600. Here, the fifth command CMD5 may be defined as a command requesting a read operation on the final MAC result data, that is, the output data DA_OUT of the first global buffer GB0 or the second global buffer GB1. In an embodiment, the host may transmit a signal designating the first global buffer GB0 together with the fifth command CMD5 to the PIM device 600. In step 686, the first global buffer GB0 of the PIM device 600 may perform a read operation on the output data DA_OUT in response to the fifth command CMD5.

Specifically, the command decoder 611 may decode the fifth command CMD5 from the host to generate and output an output data read control signal RD_OUT. The address latch 612 may latch the sixth address ADDR6 from the host to output a sixth column address CA6. The sixth column address CA6 may designate columns in which the output data DA_OUT is stored in the first global buffer GB0. The first global buffer GB0 may transmit the output data DA_OUT to the data input/output circuit 613 through the GIO line. The data input/output circuit 613 may transmit the output data DA_OUT to the host. In this way, by performing the steps 685 and 686, the output data DA_OUT may be transmitted from the first global buffer GB0 of the PIM device 600 to the host through the GIO line and the data input/output circuit 613.

Next, referring to FIGS. 44 and 48, in step 687, the host may transmit a sixth command CMD6, a seventh address ADDR7, and the output data DA_OUT to the PIM device 600. Here, the sixth command CMD6 may be defined as a command requesting a data write operation in at least one memory bank among the memory banks BK0-BK"N−1". In the following embodiments, a case in which the output data DA_OUT is stored in the second memory bank BK1 will be shown as example. In step 688, the second memory bank BK1 of the PIM device 600 may perform a write operation of storing the output data DA_OUT in response to the sixth command CMD6.

Specifically, the command decoder 611 may decode the sixth command CMD6 from the host to generate and output a write control signal WR. The address latch 612 may latch the seventh address ADDR7 from the host to output a second bank address BA2 and a seventh column address CA7. In this embodiment, the second bank address BA2 may designate the second memory bank BK1 among the memory banks BK0-BK"N−1", and the seventh column address CA7 may designate columns in which the output data DA_OUT to be stored in the second memory bank BK1. The input/output circuit 613 may transmit the output data DA_OUT transmitted form the host to the second memory bank BK1 through the GIO line. The second memory bank BK1 may store the output data DA_OUT in the columns designated by the seventh column address CA7 in response to the write control signal WR. In this way, by performing the steps 687 and 688, the output data DA_OUT may be transmitted from the host to the PIM device 600, and may be stored in the second memory bank BK1.

As described with reference to FIGS. 33 to 48, in the MAC arithmetic operation in the input layer, the first global buffer GB0 may perform the operation of providing the first vector data DA_V1 to the MAC operators MAC0-MAC"N−1", and the second global buffer GB1 may perform the operation of storing the first MAC result data RST1(1)-RST1(N) output from the MAC operators MAC0-MAC"N−1" as the second vector data DA_V2. In the MAC arithmetic operation in the first hidden layer after the input layer, the second global buffer GB1 may perform the operation of providing the second vector data DA_V2 to the MAC operators MAC0-MAC"N−1", and the first global buffer GB0 may perform the operation of storing the second MAC result data RST2(1)-RST2(N) output from the MAC operators MAC0-MAC"N−1" as the third vector data DA_V3. In the MAC arithmetic operation in the second hidden layer after the first hidden layer, the first global buffer GB0 may perform the operation of providing the third vector data DA_V3 to the MAC operators MAC0-MAC"N−1", and the second global buffer GB1 may perform the operation of storing the third MAC result data RST3(1)-RST3(N) output from the MAC operators MAC0-MAC"N−1" as the fourth vector data DA_V4. In the MAC arithmetic operation in the output layer after the second hidden layer, the second global buffer GB1 may perform the operation of providing the fourth vector data DA_V4 to the MAC operators MAC0-MAC"N−1", and the first global buffer GB0 may perform the operation of storing the fourth MAC result data RST4(1)-RST4(N) output from the MAC operators MAC0-MAC"N−1" as the output data DA_OUT. The output data DA_OUT may be transmitted from the first global buffer GB0 to the host and then stored in the memory bank of the PIM device 600. The output data DA_OUT stored in the memory bank may be used as input data of an input layer of another MLP. As described above, in a process of processing an MLP having an input layer, a plurality of hidden layers, and an output layer, it is possible to minimize the memory bank access operations by the host in a process of providing output data (vector data) generated from one layer as input data of the next layer.

Figure 49:
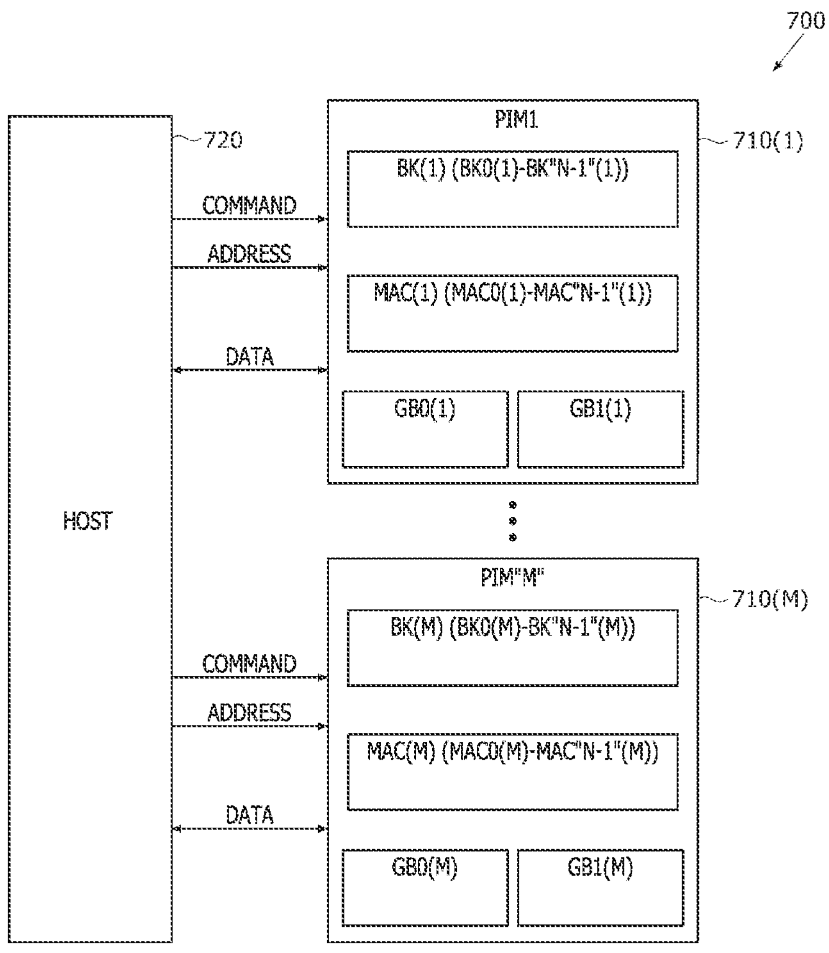
FIG. 49 is a block diagram illustrating a PIM system according to an embodiment of the present disclosure.

FIG. 49 is a block diagram illustrating a PIM system 700 including a plurality of PIM devices 710(1)-710(M) and a host 720 according to an embodiment of the present disclosure. In various embodiments below, a controller may be disposed between the PIM devices 710(1)-710(M) and the host 720, and in this case, the controller may perform some of functions of the host 720. Referring to FIG. 49, the PIM system 700 may include, for example, "M" PIM devices 710(1)-710(M) ("M" is a natural number of 2 or more) and the host 720. The host 720 may transmit a command COMMAND and an address ADDRESS to each of the PIM devices 710(1)-710(M). The host 720 may transmit data DATA to each of the PIM devices 710(1)-710(M) or receive data DATA from each of the PIM devices 710(1)-710(M). Each of the PIM devices 710(1)-710(M) may have the same configuration as the PIM device 600 described above with reference to FIG. 31. Accordingly, the first PIM device 710(1) may include "N" memory banks BK0(1)-BK"N−1"(1) (hereinafter, BK(1)), "N" MAC operators MAC0(1)-MAC"N−1"(1) (hereinafter, MAC(1)), a first global buffer GB0(1), and a second global buffer GB1(1). Similarly, the "M"$^{th}$ PIM device 710(M) may also include "N" memory banks BK0(M)-BK"N−1"(M) (hereinafter, BK(M)), "N" MAC operators MAC0(M)-MAC"N−1"(M) (hereinafter, MAC(M)), a first global buffer GB0(M), and a second global buffer GB1(M).

In the PIM system 700 according to the present embodiment, each of the PIM devices 710(1)-710(M) may perform a MAC arithmetic operation for the MLP process of FIG. 32. In an embodiment, when the size of the weight data in each of the input layer, the first hidden layer, the second hidden layer, and the output layer of the MLP is large, for example, when the number of rows of the weight matrix is large, the MAC arithmetic operation in each layer may be divided and performed in the PIM devices 710(1)-710(M). For example, the MAC arithmetic operation in the input layer may be divided into "M" sub-MAC arithmetic operations by dividing the rows of the weight matrix into "M" groups. In addition, each sub-MAC arithmetic operation may be performed in each of the PIM devices 710(1)-710(M). In this case, one sub-MAC arithmetic operation may be performed by matrix multiplication of weight data belonging to one group of rows of the weight matrix and vector data. Each MAC arithmetic operation in each of the remaining layers other than the input layer, that is, in the first hidden layer, the second hidden layer, and the output layer, may also be divided and performed by the PIM devices 710(1)-710(M) similar to the MAC arithmetic operation in the input layer. In this case, when a MAC arithmetic operation is performed in the input layer using first vector data as input data, second vector data may be divided and generated in the PIM devices 710(1)-710(M). For example, the first PIM device 700(1) may generate a first set of the second vector data, and the "M"$^{th}$ PIM device 710(M) may generate an "M"$^{th}$ set of the second vector data. In order to perform the MAC arithmetic operation in the first hidden layer, the host 720 needs to collect all of the first to "M"$^{th}$ sets of the second vector data to generate second vector data and provide the generated second vector data in common to the PIM devices 710(1)-710(M).

Figure 50:
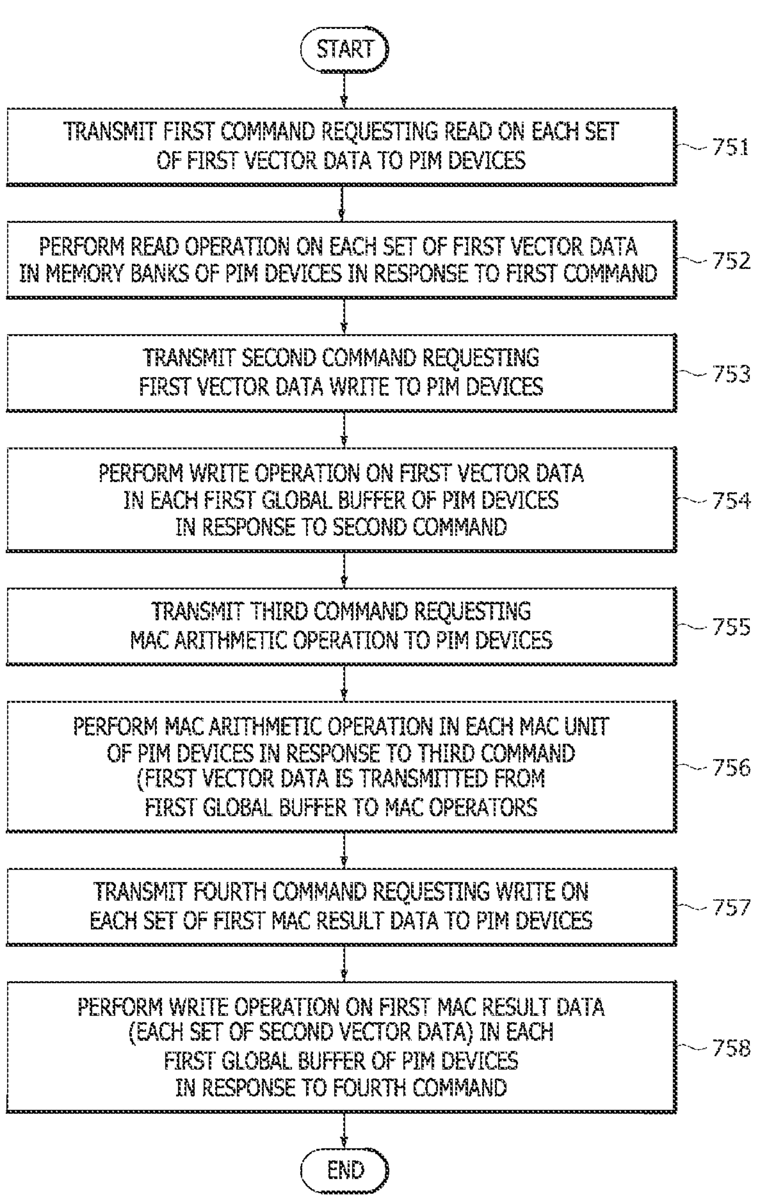
FIG. 50 is a flowchart illustrating an input layer operation of the MLP of FIG. 32 in the PIM system of FIG. 49.
Figure 51:
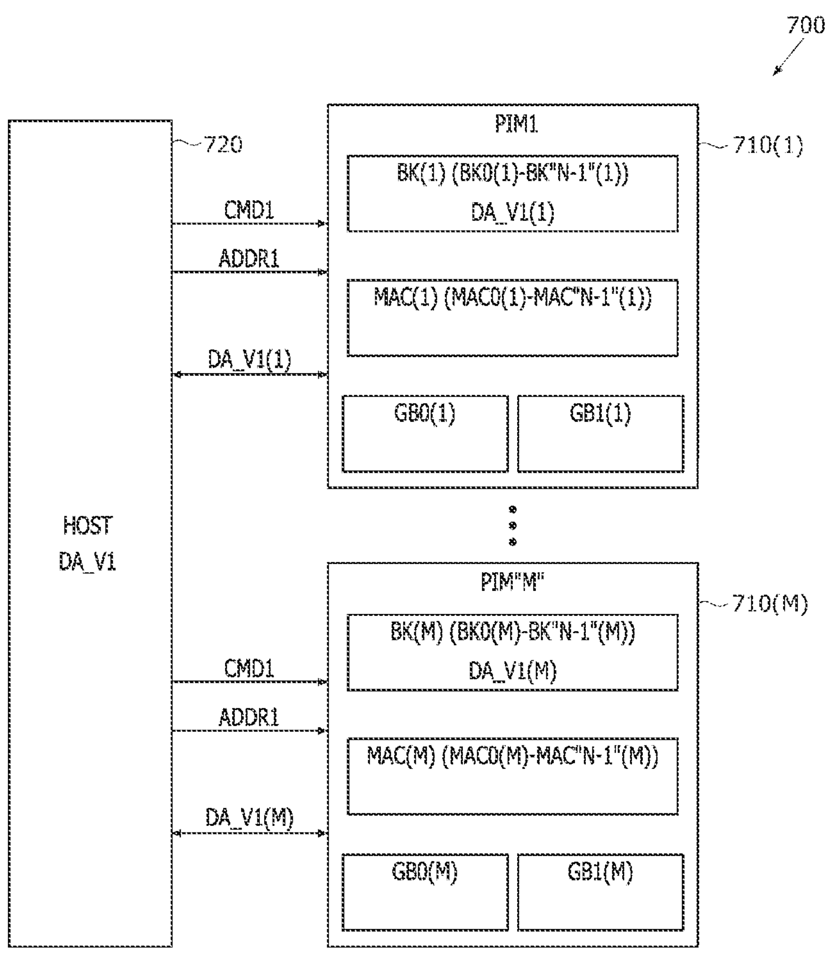
FIG. 51 is a diagram illustrating operations of the PIM system according to steps 751 and 752 in the flowchart of FIG. 50.

FIG. 50 is a flowchart illustrating an input layer operation of the MLP of FIG. 32 in the PIM system 700 of FIG. 49. FIGS. 51 to 54 are diagrams illustrating operations of the PIM system 700 in steps of the flowchart of FIG. 50. First, referring to FIGS. 50 and 51, in step 751, the host 720 may transmit a first command CMD1 and a first address ADDR1 to each of the PIM devices 710(1)-710(M). Here, as described above with reference to FIGS. 33 and 34, the first commands CMD1 may request data read operations from the memory banks BK(1)-BK(M) of the PIM devices 710(1)-710(M). The first address ADDR1 may include a first bank address and a first column address that designate a region in which each of the sets DA_V1(1)-DA_V1(M) of the first vector data is stored in each of the memory banks BK(1)-BK(M) of the PIM devices 710(1)-710(M). In step 752, the memory banks BK(1)-BK(M) of the PIM devices 710(1)-710(M) may perform read operations on the sets DA_V1(1)-DA_V1(M) of the first vector data in response to the first commands CMD1. As illustrated in FIG. 51, the memory bank designated by the first bank address among the memory banks BK0(1)-BK"N−1"(1) of the first PIM device 710(1) may transmit the first set DA_V1(1) of the first vector data stored in the columns designated by the first column address to the host 720. Similarly, the memory bank designated by the first bank address among the memory banks BK0(M)-BK"N−1"(M) of the "M"$^{th}$ PIM device 710(M) may transmit the "M"$^{th}$ set DA_V1(M) of the first vector data stored in the columns by the first column address to the host 720. The process of transmitting the sets DA_V1(1)-DA_V1(M) of the first vector data from the memory banks BK(1)-BK(M) of the PIM devices 710(1)-710(M) to the host 720 may be performed in the same manner as the process described above with reference to FIGS. 33 and 34. When the sets DA_V1(1)-DA_V1(M) of the first vector data are transmitted, the host 720 may generate first vector data DA_V1 including all sets of the first vector data DA_V1(1)-DA_V1(M).

Figure 52:
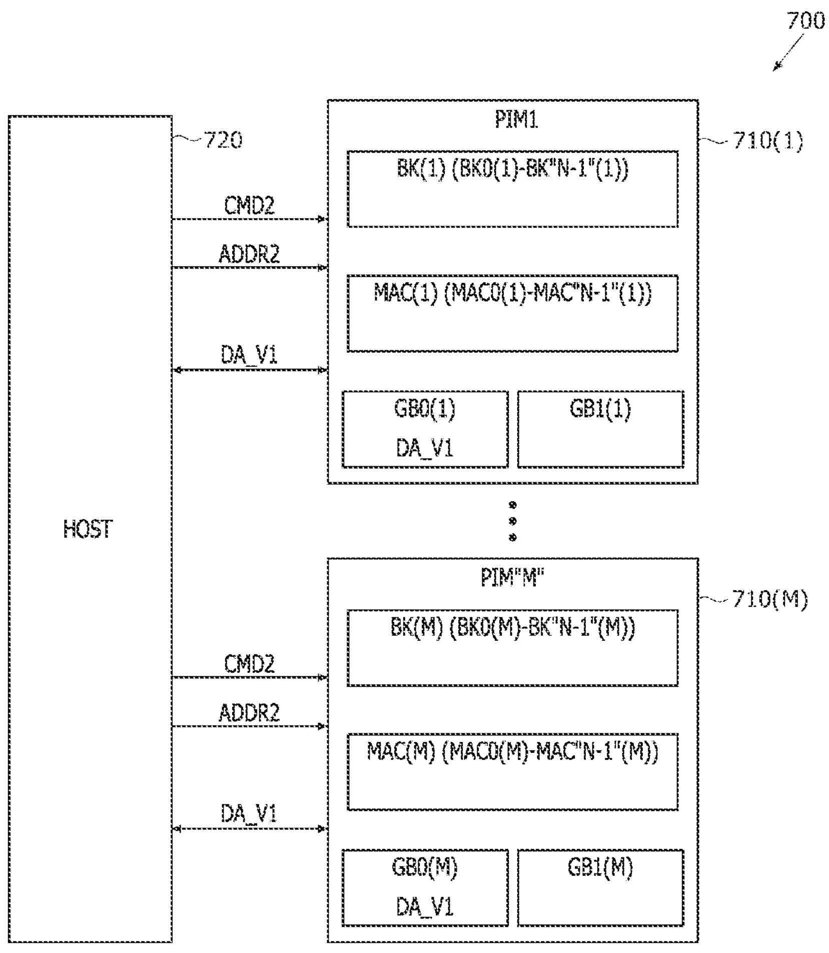
FIG. 52 is a diagram illustrating operations of the PIM system according to steps 753 and 754 in the flowchart of FIG. 50.

Next, referring to FIGS. 50 and 52, in step 753, the host 720 may transmit a second command CMD2, a second address ADDR2, and the first vector data DA_V1 to each of the PIM devices 710(1)-710(M). Here, as described above with reference to FIGS. 33 and 35, the second commands CMD2 may request vector data write operations of the first global buffers GB0(1)-GB0(M) of the PIM devices 710(1)-710(M). The second address ADDR2 may include a second column address designating a region in which the first vector data DA_V1 is to be stored in each of the first global buffers GB0(1)-GB0(M) of the PIM devices 710(1)-710(M). In an embodiment, the second column address may be the same as the column address for the columns in which the first weight data is stored in each of the memory banks BK(1)-BK(M) of the PIM devices 710(1)-710(M). In an embodiment, the host 720 may transmit a signal designating the first global buffer GB0 together with the second command CMD2 to each of the PIM devices 710(1)-710(M). In step 754, the first global buffers GB0(1)-GB0(M) of the PIM devices 710(1)-710(M) may perform write operations on the first vector data DA_V1 in response to the second commands CMD2. Accordingly, the first global buffer GB0(1) of the first PIM device 710(1) may store the first vector data DA_V1 in the region designated by the second address ADDR2. Similarly, the first global buffer GB0(M) of the "M"$^{th}$ PIM device 710(M) may also store the first vector data DA_V1 in the region designated by the second address ADDR2. Each process of storing the first vector data DA_V1 in each of the first global buffers GB0(1)-GB0(M) of the PIM devices 710(1)-710(M) may be performed in the same manner as the process described with reference to FIGS. 33 and 35.

Figure 53:
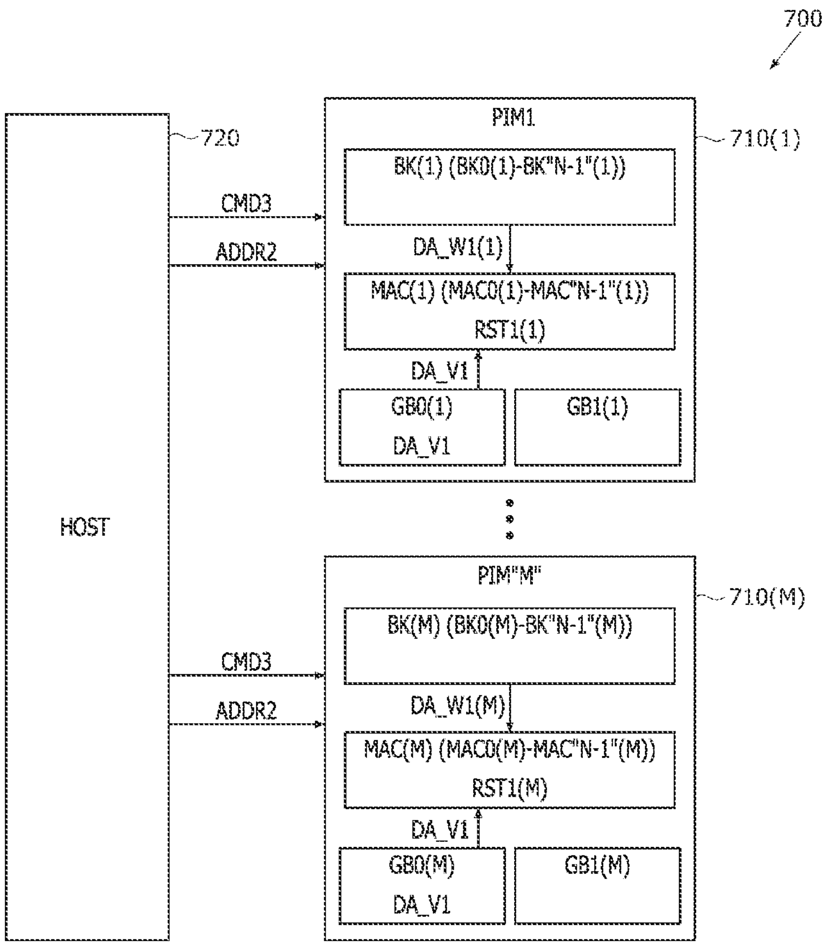
FIG. 53 is a diagram illustrating operations of the PIM system according to steps 755 and 756 in the flowchart of FIG. 50.

Next, referring to FIGS. 50 and 53, in step 755, the host 720 may transmit a third command CMD3 and a second address ADDR2 to the PIM devices 710(1)-710(M). Here, as described above with reference to FIGS. 33 and 36, the third commands CMD3 may request MAC arithmetic operations in the MAC operators MAC(1)-MAC(M) of the PIM devices 710(1)-710(M). In step 756, the MAC operators MAC(1)-MAC(M) of the PIM devices 710(1)-710(M) may perform the MAC arithmetic operations in the input layer in response to the third commands CMD3. As illustrated in FIG. 53, the MAC operators MAC0(1)-MAC"N−1"(1) of the first PIM device 710(1) may receive a first set DA_W1(1) of first weight data from the memory banks BK0(1)-BK"N−1"(1) and receive the first vector data DA_V1 from the first global buffer GB0(1). The MAC operators MAC0(1)-MAC"N−1"(1) of the first PIM device 710(1) may perform a MAC arithmetic operation on the first set DA_W1(1) of the first weight data and the first vector data DA_V1 to generate a first set RST1(1) of first result data. Similarly, the MAC operators MAC0(M)-MAC"N−1"(M) of the "M"$^{th}$ PIM device 710(M) may receive an "M"$^{th}$ set DA_W1(M) of the first weight data from the memory banks BK0(M)-BK"N−1"(M) and receive the first vector data DA_V1 from the first global buffer GB0(M). The MAC operators MAC0(M)-MAC"N−1"(M) of the "M"$^{th}$ PIM device 710(M) may perform a MAC arithmetic operation on the "M"$^{th}$ set DA_W1(M) of the first weight data and the first vector data DA_V1 to generate an "M"$^{th}$ set RST1(M) of the first result data.

Figure 54:
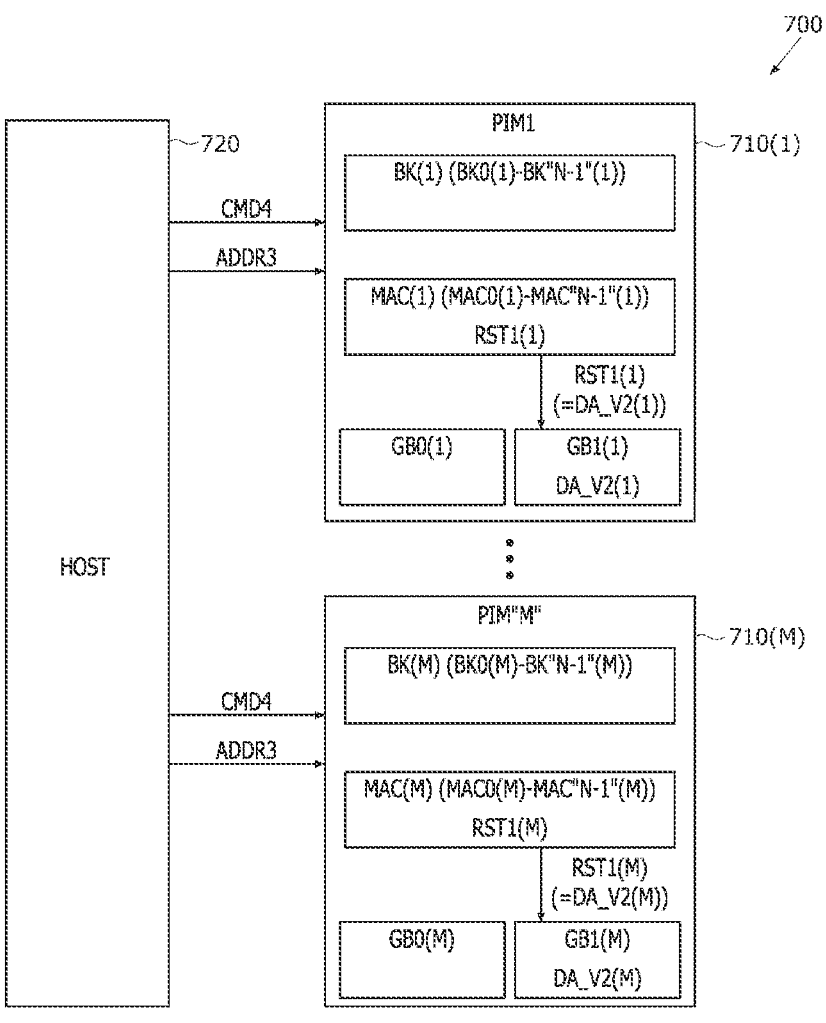
FIG. 54 is a diagram illustrating operations of the PIM system according to steps 757 and 758 in the flowchart of FIG. 50.

Next, referring to FIGS. 50 and 54, in step 757, the host 720 may transmit a fourth command CMD4 and a third address ADDR3 to each of the PIM devices 710(1)-710(M). Here, as described above with reference to FIGS. 33 and 37, the fourth commands CMD4 may request write operations on the sets RST1(1)-RST1(M) of the first MAC result data in the second global buffers GB1(1)-GB1(M) of the PIM devices 710(1)-710(M). In step 758, the MAC operators MAC(1)-MAC(M) of the PIM devices 710(1)-710(M) may transmit the sets RST1(1)-RST1(M) of the first MAC result data to the second global buffers GB1(1)-GB1(M), respectively, through the GIO line in response to the fourth commands CMD4. The sets RST1(1)-RST1(M) of the first MAC result data generated by the MAC arithmetic operations in the input layer may constitute sets DA_V2(1)-DA_V2(M) of second vector data used as input data in a first hidden layer. The second global buffers GB1(1)-GB1(M) may store the sets RST1(1)-RST1(M) of the first MAC result data, that is, the sets DA_V2(1)-DA_V2(M) of the second vector data in the regions designated by the third addresses ADDR3.

Figure 55:
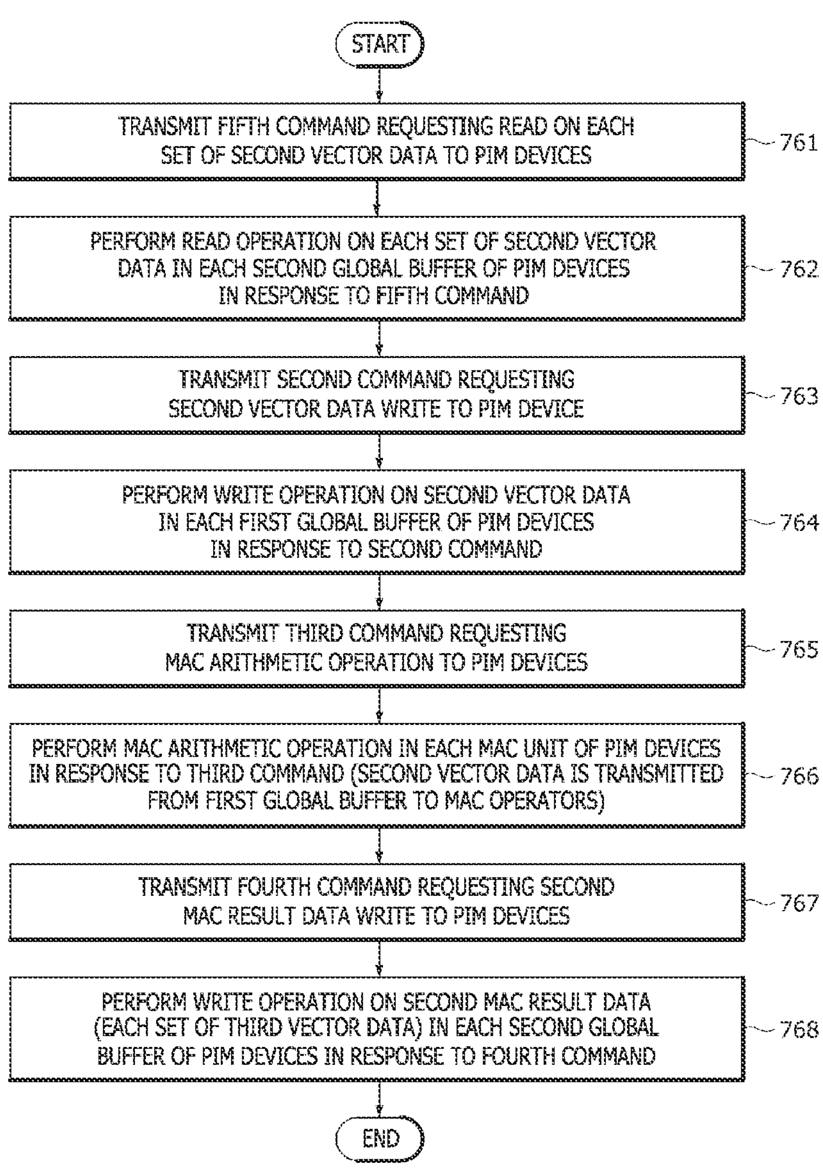
FIG. 55 is a flowchart illustrating a first hidden layer operation of the MLP of FIG. 32 in the PIM system of FIG. 49.
Figure 56:
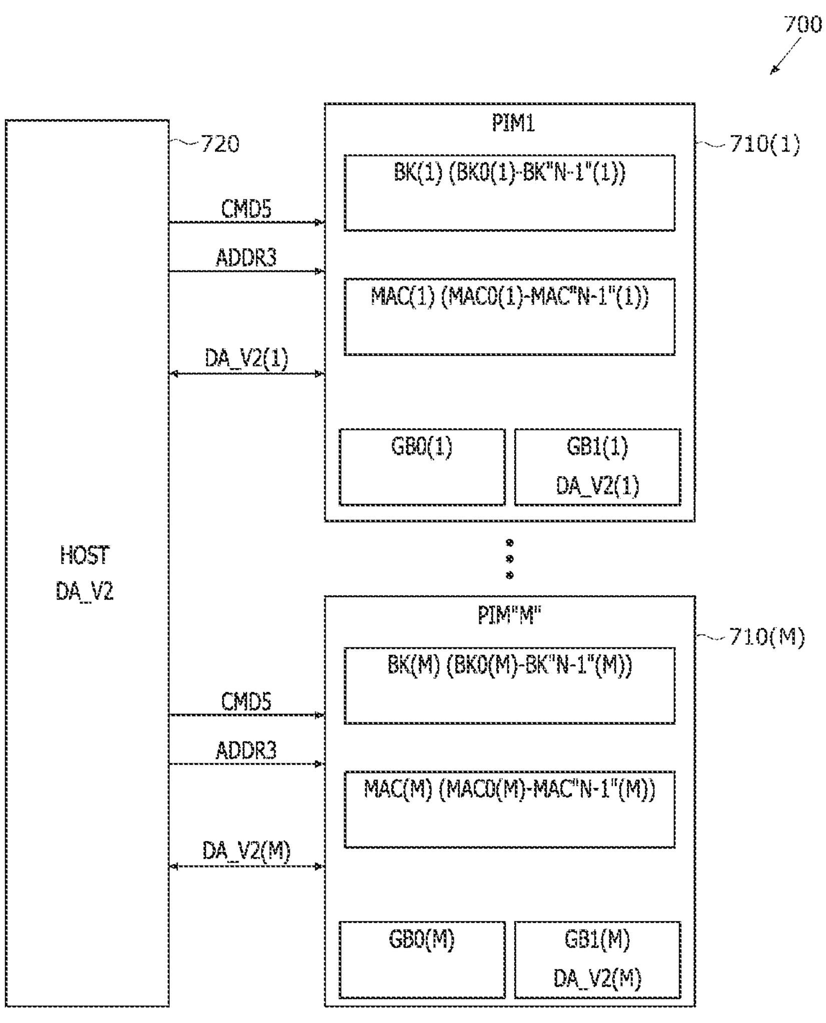
FIG. 56 is a diagram illustrating operations of the PIM system according to steps 761 and 762 in the flowchart of FIG. 55.

FIG. 55 is a flowchart illustrating a first hidden layer operation of the MLP of FIG. 32 in the PIM system 700 of FIG. 49. FIGS. 56 to 59 are diagrams illustrating operations of the PIM system 700 in steps of the flowchart of FIG. 55. First, referring to FIGS. 55 and 56, in step 761, the host 720 may transmit a fifth command CMD5 and a third address ADDR3 to each of the PIM devices 710(1)-710(M). Here, as described above with reference to FIGS. 33 and 37, the fifth commands CMD5 may request data read operations of the second global buffers GB1(1)-GB1(M) of the PIM devices 710(1)-710(M). In an embodiment, the third address ADDR3 may include a column address designating a region in which each of the sets DA_V2(1)-DA_V2(M) of the second vector data is stored in each of the second global buffers GB1(1)-GB1(M) of the PIM devices 710(1)-710(M). In step 762, the second global buffers GB1(1)-GB1(M) of the PIM devices 710(1)-710(M) may perform read operations on the sets DA_V2(1)-DA_V2(M) of the second vector data in response to the fifth commands CMD5. As illustrated in FIG. 56, the first PIM device 710(1) may transmit the first set DA_V2(1) of the second vector data stored in the second global buffer GB1(1) to the host 720. Similarly, the "M"$^{th}$ PIM device 710(M) may transmit the "M"$^{th}$ set DA_V2(M) of the second vector data stored in the second global buffer GB1(M) to the host 720. Each of the processes of transmitting the sets DA_V2(1)-DA_V2(M) of the second vector data in second global buffers GB1(1)-GB1(M) of the PIM devices 710(1)-710(M) may be performed in the same manner as the process described with reference to FIGS. 33 and 47. When the sets DA_V2(1)-DA_V2(M) of the second vector data are transmitted, the host 720 may generate second vector data DA_V2 including all sets DA_V2(1)-DA_V2(M) of the second vector data.

Figure 57:
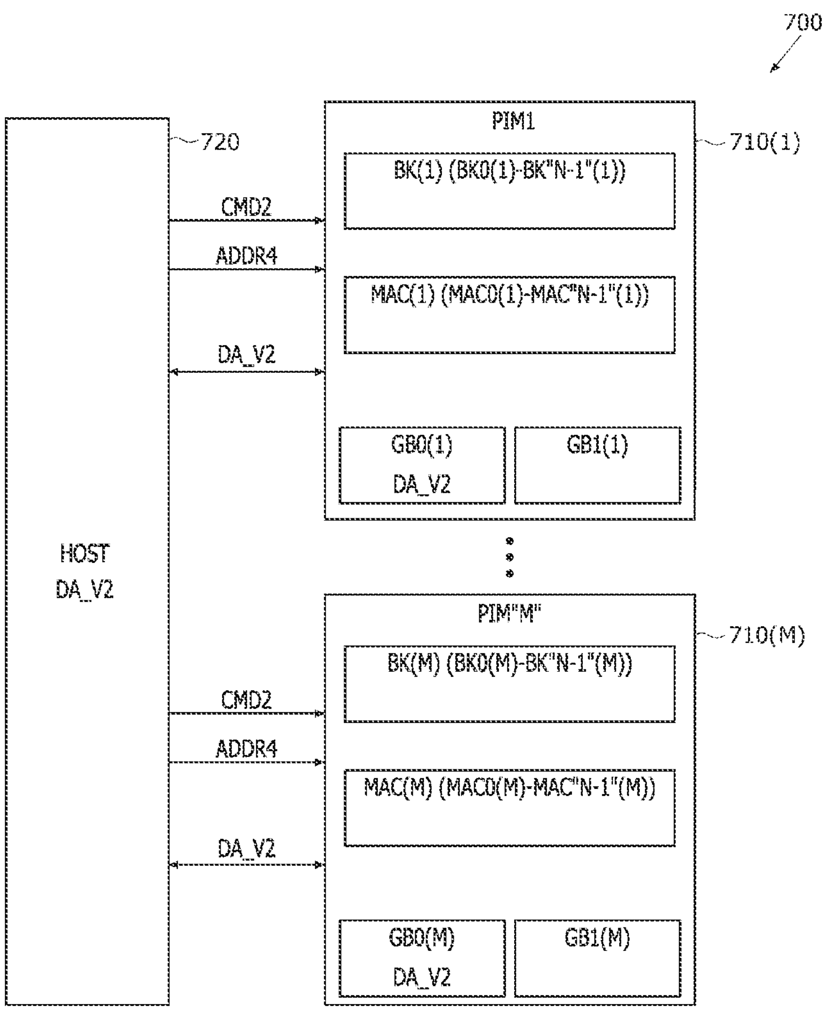
FIG. 57 is a diagram illustrating operations of the PIM system according to steps 763 and 764 in the flowchart of FIG. 55.

Next, referring to FIGS. 55 and 57, in step 763, the host 720 may transmit a second command CMD2, a fourth address ADDR4, and the second vector data DA_V2 to each of the PIM devices 710(1)-710(M). Here, as described above with reference to FIGS. 33 and 35, the second commands CMD2 may request vector data write operations of the first global buffers GB0(1)-GB0(M) of the PIM devices 710(1)-710(M). The fourth address ADDR4 may include a fourth column address designating a region in which the second vector data DA_V2 is to be stored in each of the first global buffers GB0(1)-GB0(M) of the PIM devices 710(1)-710(M). In an embodiment, the fourth column address may be the same as a column address for the column in which the second weight data is stored in each of the memory banks BK(1)-BK(M) of the PIM devices 710(1)-710(M). In an embodiment, the host 720 may transmit a signal designating the first global buffer GB0 together with the second commands CMD2 to the PIM devices 710(1)-710(M). In step 764, the first global buffers GB0(1)-GB0(M) of the PIM devices 710(1)-710(M) may perform write operations on the second vector data DA_V2 in response to the second commands CMD2. Accordingly, the first global buffer GB0(1) of the first PIM device 710(1) may store the second vector data DA_V2 in a region designated by the fourth address ADDR4. Similarly, the first global buffer GB0(M) of the "M"$^{th}$ PIM device 710(M) may also store the second vector data DA_V2 in a region designated by the fourth address ADDR4. Each of the processes of storing the second vector data DA_V2 in the first global buffers GB0(1)-GB0(M) of the PIM devices 710(1)-710(M) may be performed in the same manner as the process described with reference to FIGS. 33 and 35.

Figure 58:
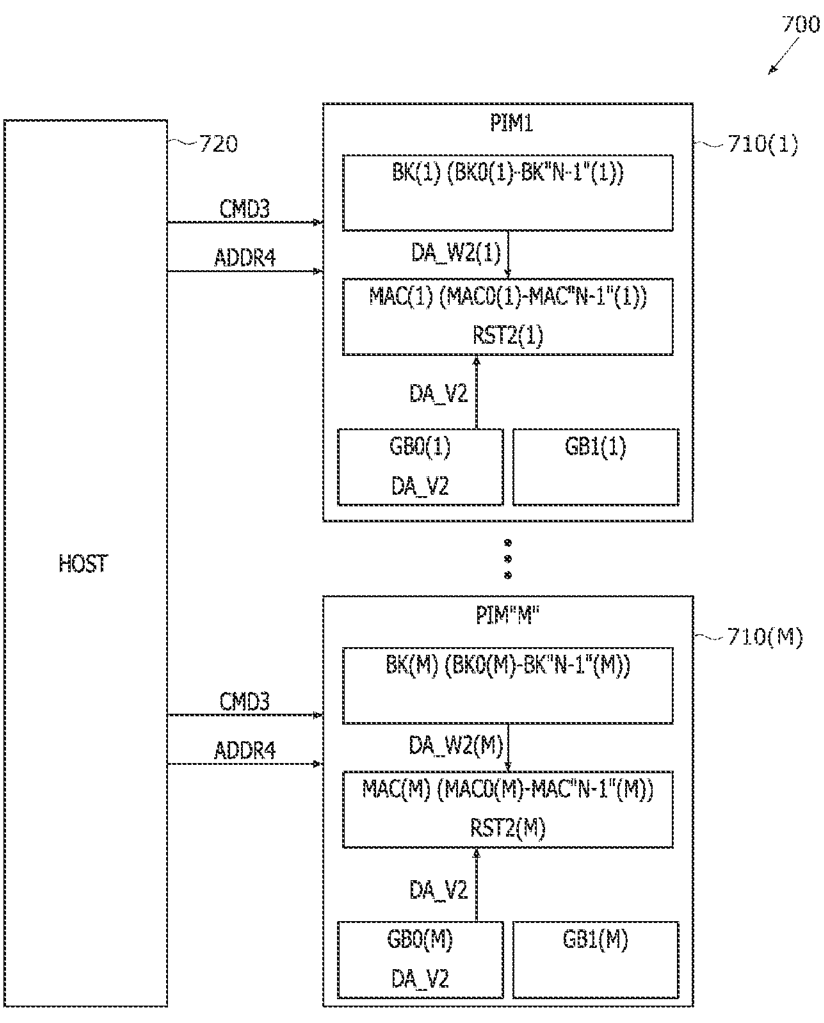
FIG. 58 is a diagram illustrating operations of the PIM system according to steps 765 and 766 in the flowchart of FIG. 55.

Next, referring to FIGS. 55 and 58, in step 765, the host 720 may transmit a third command CMD3 and a fourth address ADDR4 to each of the PIM devices 710(1)-710(M). Here, as described above with reference to FIGS. 33 and 36, the third commands CMD3 may request MAC arithmetic operations in the MAC operators MAC(1)-MAC(M) of the PIM devices 710(1)-710(M). In step 766, the MAC operators MAC(1)-MAC(M) of the PIM devices 710(1)-710(M) may perform the MAC arithmetic operations in the first hidden layer in response to the third commands CMD3. As illustrated in FIG. 58, the MAC operators MAC0(1)-MAC"N−1"(1) of the first PIM device 710(1) may receive a first set DA_W2(1) of the second weight data from the memory banks BK0(1)-BK"N−1"(1), and receive the second vector data DA_V2 from the first global buffer GB0(1). The MAC operators MAC0(1)-MAC"N−1"(1) of the first PIM device 710(1) may perform MAC arithmetic operations on the first set DA_W2(1) of the second weight data and the second vector data DA_V2 to generate a first set RST2(1) of second result data. Similarly, the MAC operators MAC0(M)-MAC"N−1"(M) of the "M"$^{th}$ PIM device 710(M) may receive an "M"$^{th}$ set DA_W2(M) of the second weight data from the memory banks BK0(M)-BK"N−1"(M) and receive the second vector data DA_V2 from the first global buffer GB0(M). The MAC operators MAC0(M)-MAC"N−1"(M) of the "M"$^{th}$ PIM device 710(M) may perform MAC arithmetic operations on the "M"$^{th}$ set DA_W2(M) of the second weight data and the second vector data DA_V2 to generate an "M"$^{th}$ set RST2(M) of the second result data.

Figure 59:
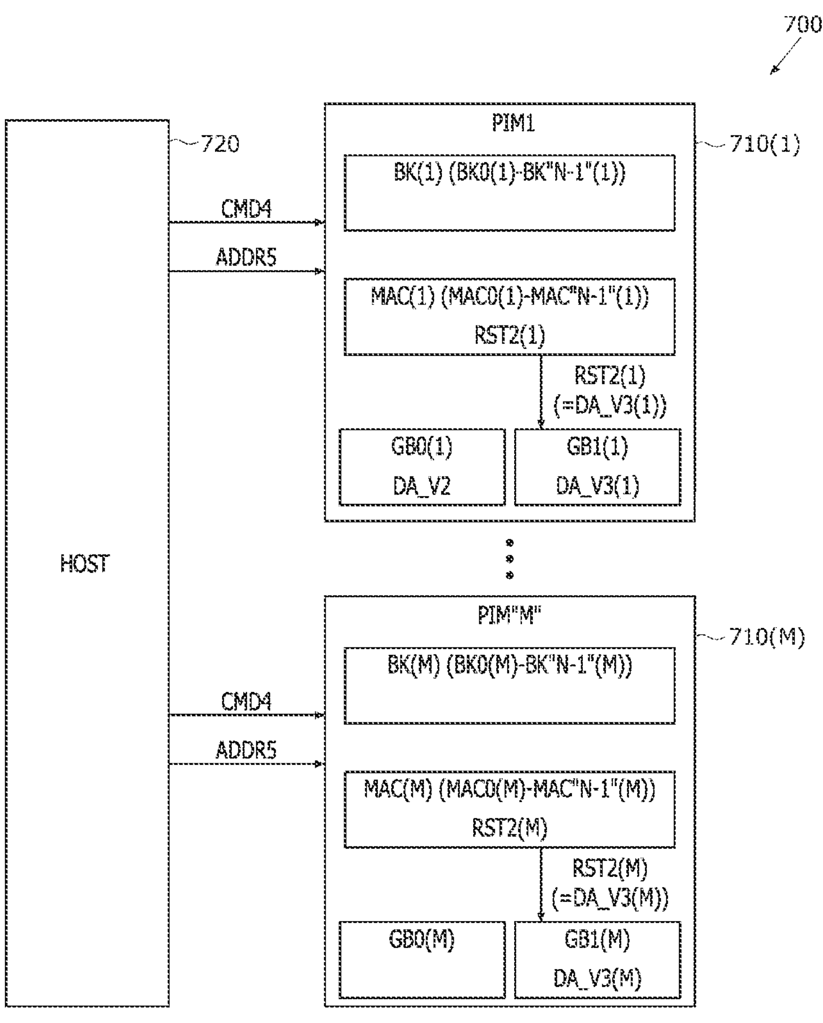
FIG. 59 is a diagram illustrating operations of the PIM system according to steps 767 and 768 in the flowchart of FIG. 55.

Next, referring to FIGS. 55 and 59, in step 767, the host 720 may transmit a fourth command CMD4 and a fifth address ADDR5 to each of the PIM devices 710(1)-710(M). Here, as described above with reference to FIGS. 33 and 37, the fourth commands CMD4 may request write operations on the sets RST2(1)-RST2(M) of the second MAC result data in the second global buffers GB1(1)-GB1(M) of the PIM devices 710(1)-710(M). In step 768, the MAC operators MAC(1)-MAC(M) of the PIM devices 710(1)-710(M) may transmit the sets RST2(1)-RST2(M) of the second MAC result data to the second global buffers GB1(1)-GB1(M), respectively, through the GIO line in response to the fourth commands CMD4. The sets RST2(1)-RST2(M) of the second MAC result data generated by the MAC arithmetic operations in the first hidden layer may constitute sets DA_V3(1)-DA_V3(M) of third vector data used as input data in a second hidden layer. The second global buffers GB1(1)-GB1(M) may store the sets RST2(1)-RST2(M) of the second MAC result data, that is, the sets DA_V3(1)-DA_V3(M) of the third vector data in the regions designated by the fifth addresses ADDR5.

Figure 60:
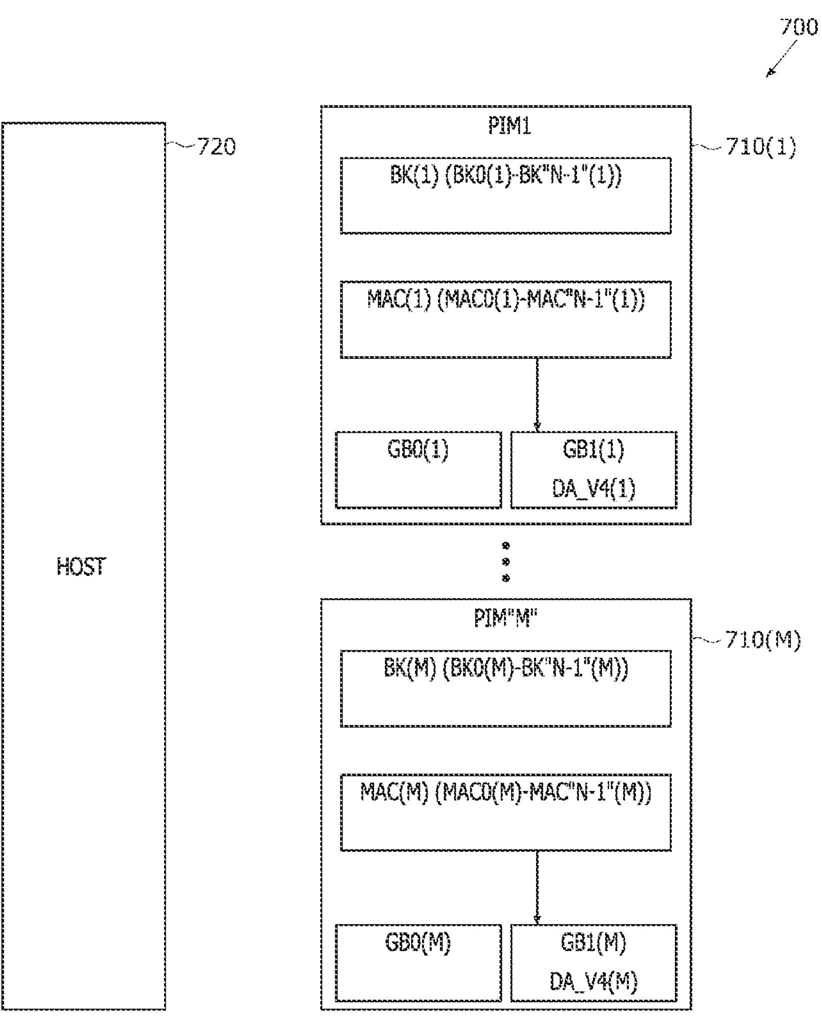
FIG. 60 is a block diagram illustrating a state after the second hidden layer operation of the MLP of FIG. 32 is performed in the PIM system of FIG. 49.

FIG. 60 is a block diagram illustrating a state after a second hidden layer operation of the MLP of FIG. 32 is performed in the PIM system 700 of FIG. 49. The MAC arithmetic operations in the second hidden layer may be performed in the same manner as the MAC arithmetic operations in the first hidden layer described with reference to FIGS. 55 to 59. Accordingly, the sets DA_V3(1)-DA_V3(M) of the third vector data of FIG. 59 may be transmitted to the host 720 through the process described with reference to FIG. 56. Subsequently, through the process described with reference to FIG. 57, the third vector data may be stored in the first global buffers GB0(1)-GB0(M). The third vector data may be stored in regions designated by the sixth address signal. Subsequently, through the process described with reference to FIG. 58, the MAC operators MAC(1)-MAC(M) may perform MAC arithmetic operations on the sets of the third weight data and the third vector data to generate sets of third MAC result data. The sets of the third MAC result data may constitute sets of fourth vector data used as input data in an output layer. Then, through the process described with reference to FIG. 59, the sets of the third MAC result data may be transmitted from the MAC operators MAC(1)-MAC(M) to the second global buffers GB1(1)-GB1(M). As a result, as illustrated in FIG. 60, the second global buffers GB1(1)-GB1(M) of the PIM devices 710(1)-710(M) may store the sets of the third MAC result data, that is, the sets DA_V4(1)-DA_V4(M) of the fourth vector data in regions designated by seventh address. As illustrated in FIG. 60, the second global buffer GB1(1) of the first PIM device 710(1) may store a first set DA_V4(1) of the fourth vector data. Similarly, the second global buffer GB1(M) of the "M"$^{th}$ PIM device 710(M) may store an "M"$^{th}$ set DA_V4(M) of the fourth vector data.

Figure 61:
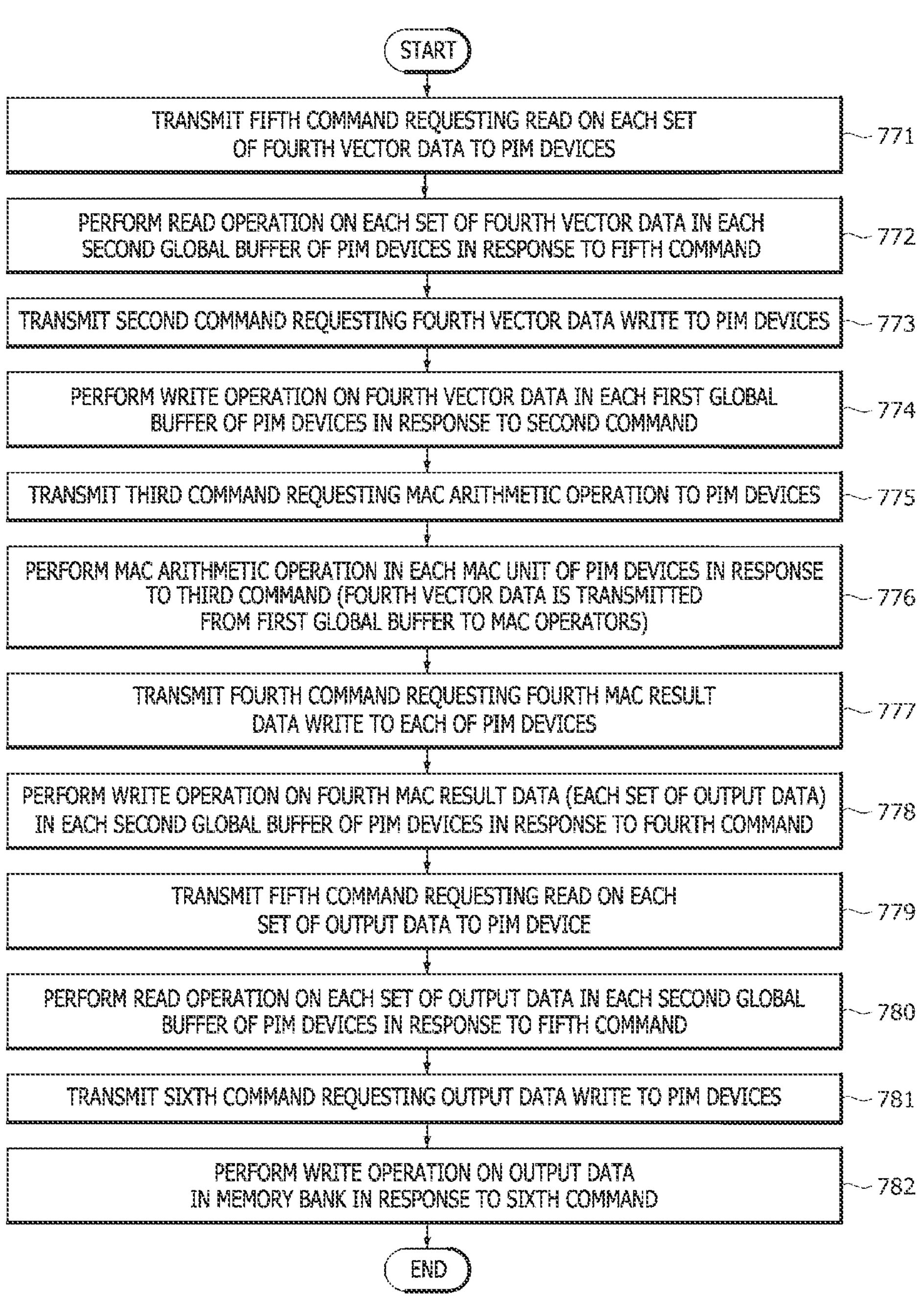
FIG. 61 is a flowchart illustrating an output layer operation of the MLP of FIG. 32 in the PIM system of FIG. 49.
Figure 62:
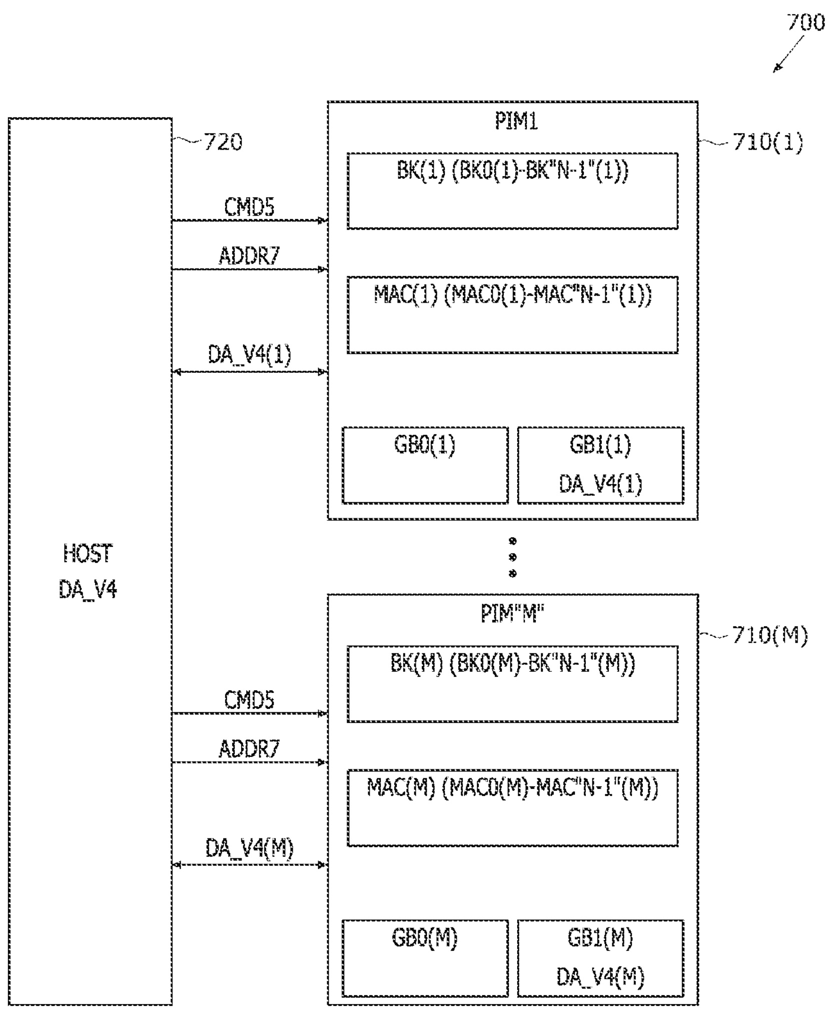
FIG. 62 is a diagram illustrating operations of the PIM system according to steps 771 and 772 in the flowchart of FIG. 61.

FIG. 61 is a flowchart illustrating an output layer operation of the MLP of FIG. 32 in the PIM system 700 of FIG. 49. FIGS. 62 to 67 are diagrams illustrating operations of the PIM system 700 in steps of the flowchart of FIG. 61. First, referring to FIGS. 61 and 62, in step 771, the host 720 may transmit a fifth command CMD5 and a seventh address ADDR7 to each of the PIM devices 710(1)-710(M). Here, as described above with reference to FIGS. 33 and 47, the fifth commands CMD5 may request data read operations of the second global buffers GB1(1)-GB1(M) of the PIM devices 710(1)-710(M). In an embodiment, the seventh address ADDR7 may include a column address designating a region in which each of the sets DA_V4(1)-DA_V4(M) of the fourth vector data is stored in each of the second global buffers GB1(1)-GB1(M) of the PIM devices 710(1)-710(M). In step 772, the second global buffers GB1(1)-GB1(M) of the PIM devices 710(1)-710(M) may perform read operations on the sets DA_V4(1)-DA_V4(M) of the fourth vector data in response to the fifth commands CMD5. As illustrated in FIG. 62, the first PIM device 710(1) may transmit a first set DA_V4(1) of the fourth vector data stored in the second global buffer GB1(1) to the host 720. Similarly, the "M"$^{th}$ PIM device 710(M) may transmit an "M"$^{th}$ set DA_V4(M) of the fourth vector data stored in the second global buffer GB1(M) to the host 720. Each of the processes of transmitting the sets DA_V4(1)-DA_V4(M) of the fourth vector data in the second global buffers GB1(1)-GB1(M) of the PIM devices 710(1)-710(M) to the host 720 may be performed in the same manner as the process described above with reference to FIGS. 33 and 47. When the sets DA_V4(1)-DA_V4(M) of the fourth vector data are transmitted, the host 720 may generate the fourth vector data DA_V4 including all sets DA_V4(1)-DA_V4(M) of the fourth vector data.

Figure 63:
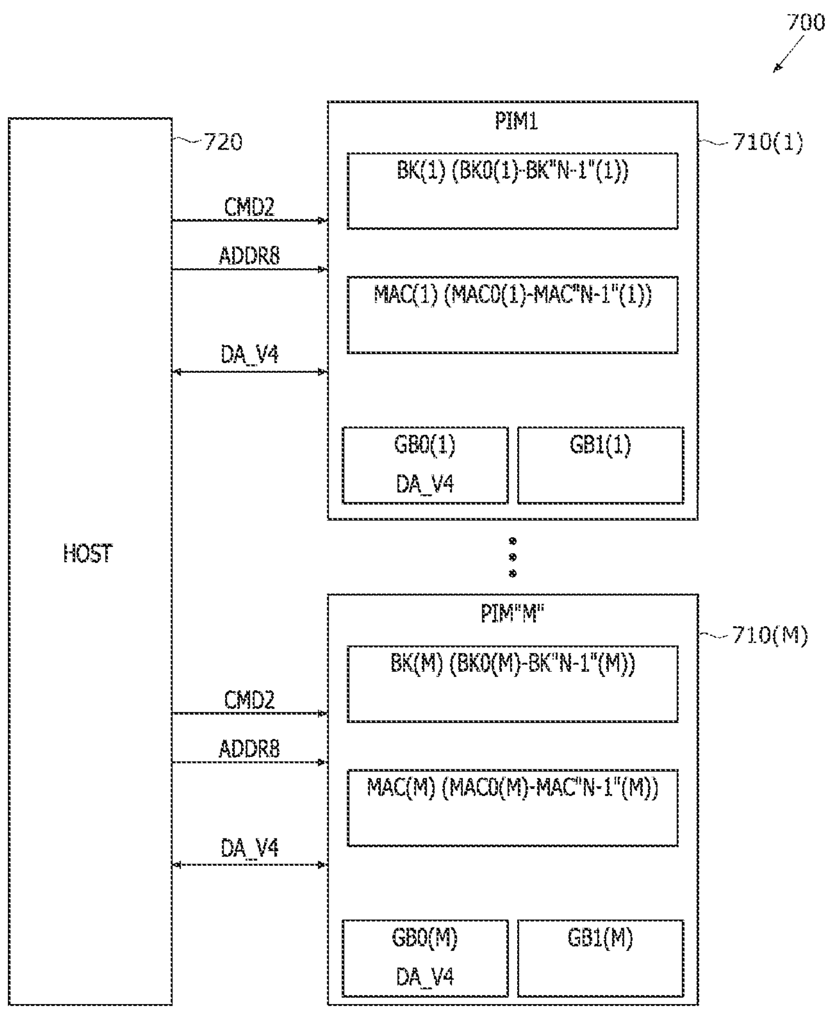
FIG. 63 is a diagram illustrating operations of the PIM system according to steps 773 and 774 in the flowchart of FIG. 61.

Next, referring to FIGS. 61 and 63, in step 773, the host 720 may transmit a second command CMD2, an eighth address ADDR8, and the fourth vector data DA_V4 to each of the PIM devices 710(1)-710(M). Here, as described above with reference to FIGS. 33 and 35, the second commands CMD2 may request vector data write operations in the first global buffers GB0(1)-GB0(M) of the PIM devices 710(1)-710(M). The eighth address ADDR8 may include an eighth column address designating a region in which the fourth vector data DA_V4 is to be stored in each of the first global buffers GB0(1)-GB0(M) of the PIM devices 710(1)-710(M). In an embodiment, the eighth column address may be the same as the column address for the columns in which the fourth weight data is stored in each of the memory banks BK(1)-BK(M) of the PIM devices 710(1)-710(M). In an embodiment, the host 720 may transmit a signal designating the first global buffer GB0 together with the second commands CMD2 to the PIM devices 710(1)-710(M). In step 774, the first global buffers GB0(1)-GB0(M) of the PIM devices 710(1)-710(M) may perform write operations on the fourth vector data DA_V4 in response to the second commands CMD2. Accordingly, the first global buffer GB0(1) of the first PIM deice 710(1) may store the fourth vector data DA_V4 in a region designated by the eighth address ADDR8. Similarly, the first global buffer GB0(M) of the "M"$^{th}$ PIM device 710(M) may also store the fourth vector data DA_V4 in a region designated by the eighth address ADDR8. Each of the processes of storing the fourth vector data DA_V4 in the first global buffers GB0(1)-GB0(M) of the PIM devices 710(1)-710(M) may be performed in the same manner as the process described above with reference to FIGS. 33 and 35.

Figure 64:
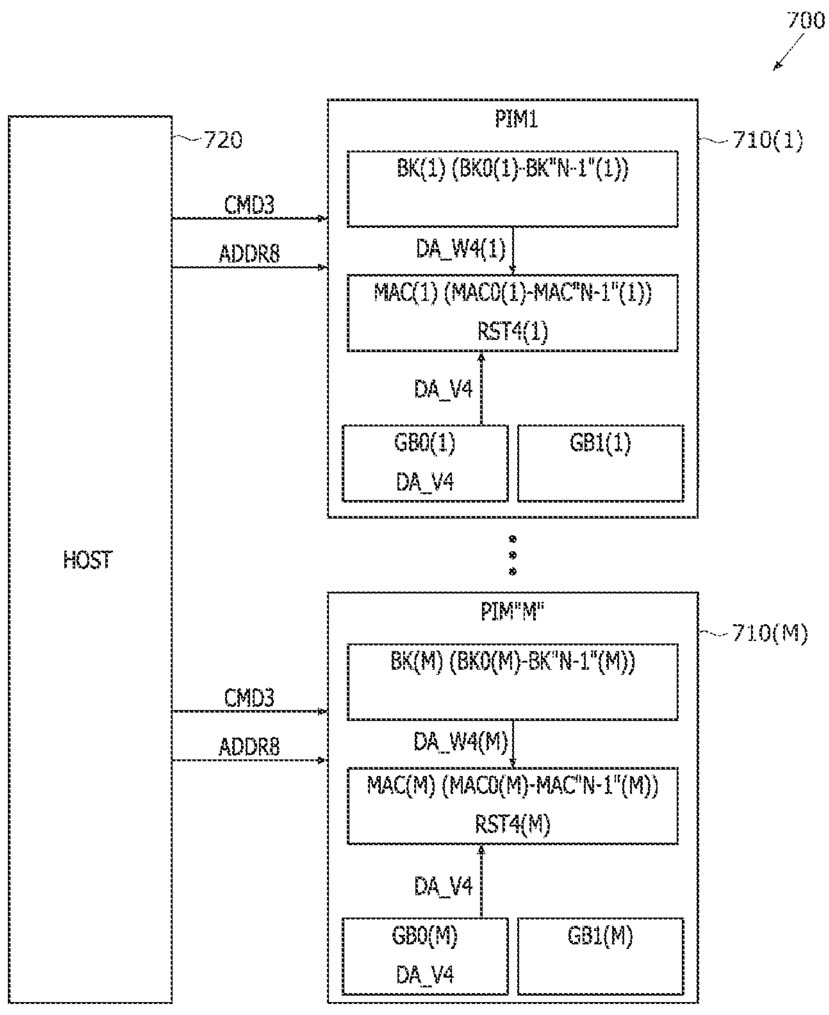
FIG. 64 is a diagram illustrating operations of the PIM system according to steps 775 and 776 in the flowchart of FIG. 61.

Next, referring to FIGS. 61 and 64, in step 775, the host 720 may transmit a third command CMD3 and an eighth address ADDR8 to each of the PIM devices 710(1)-710(M). Here, as described above with reference to FIGS. 33 and 36, the third commands CMD3 may request MAC arithmetic operations in the MAC operators MAC(1)-MAC(M) of the PIM devices 710(1)-710(M). In step 776, the MAC operators MAC(1)-MAC(M) of the PIM devices 710(1)-710(M) may perform the MAC arithmetic operations in the output layer in response to the third commands CMD3. As illustrated in FIG. 64, the MAC operators MAC0(1)-MAC"N−1"(1) of the first PIM device 710(1) may receive a first set DA_W4(1) of the fourth weight data from the memory banks BK0(1)-BK"N−1"(1) and receive the fourth vector data DA_V4 from the first global buffer GB0(1). The MAC operators MAC0(1)-MAC"M−1"(1) of the first PIM device 710(1) may perform a MAC arithmetic operation on the first set DA_W4(1) of the fourth weight data and the fourth vector data DA_V4 to generate a first set RST4(1) of fourth result data. Similarly, the MAC operators MAC0(M)-MAC"M−1"(M) of the "M"$^{th}$ PIM device 710(M) may receive an "M"$^{th}$ set DA_W4(M) of the fourth weight data from the memory banks BK0(M)-BK"N−1"(M) and receive the fourth vector data DA_V4 from the first global buffer GB0(M). The MAC operators MAC0(M)-MAC"M−1"(M) of the "M"$^{th}$ PIM device 710(M) may perform a MAC arithmetic operation on the "M"$^{th}$ set DA_W4(M) of the fourth weight data and the fourth vector data DA_V4 to generate an "M"$^{th}$ set RST4(M) of the fourth result data.

Figure 65:
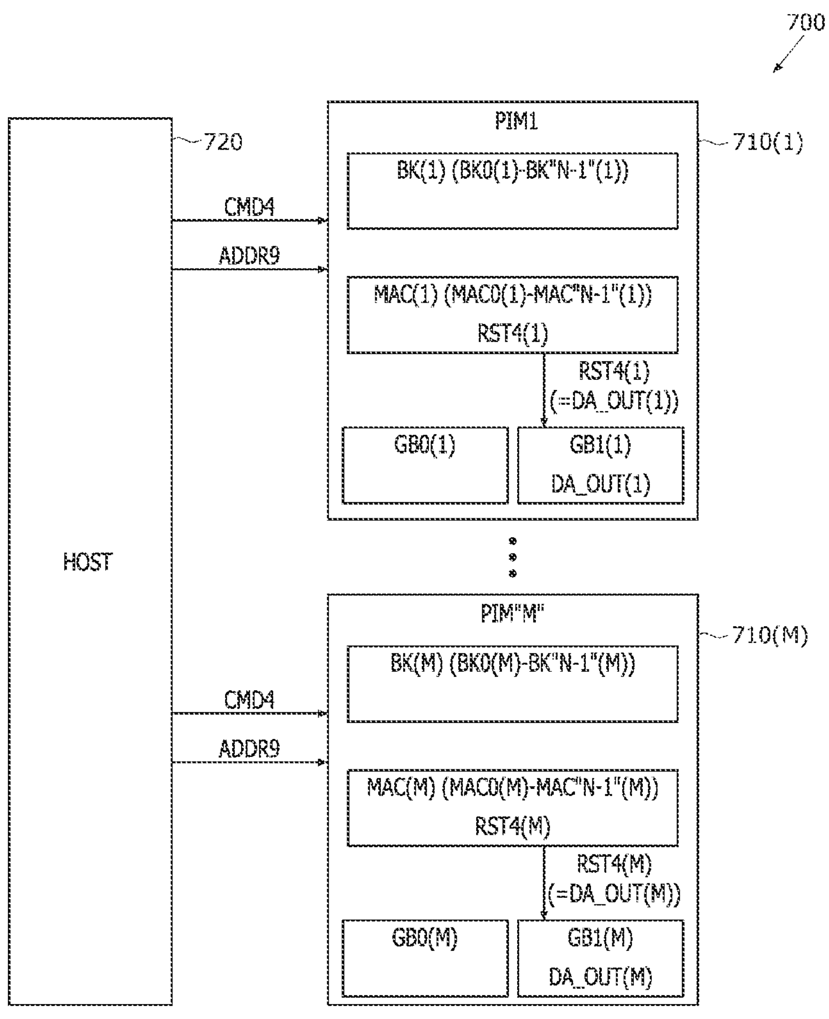
FIG. 65 is a diagram illustrating operations of the PIM system according to steps 777 and 778 in the flowchart of FIG. 61.

Next, referring to FIGS. 61 and 65, in step 777, the host 720 may transmit a fourth command CMD4 and a ninth address ADDR9 to the PIM devices 710(1)-710(M). Here, as described above with reference to FIGS. 33 and 37, the fourth commands CMD4 may request write operations on the sets RST4(1)-RST4(M) of the fourth MAC result data in the second global buffers GB1(1)-GB1(M) of the PIM device 710(1)-710(M). In step 778, the MAC operators MAC(1)-MAC(M) of the PIM devices 710(1)-710(M) may transmit the sets RST4(1)-RST4(M) of the fourth MAC result data to the second global buffers GB1(1)-GB1(M) through the GIO line in response to the fourth commands CMD4. The sets RST4(1)-RST4(M) of the fourth MAC result data generated by the MAC arithmetic operations in the output layer may constitute sets DA_OUT(1)-DA_OUT(M) of output data output from the output layer. The second global buffers GB1(1)-GB1(M) may store the sets RST4(1)-RST4(M) of the fourth MAC result data, that is, the sets DA_OUT(1)-DA_OUT(M) of the output data in regions designated by the ninth addresses ADDR9.

Figure 66:
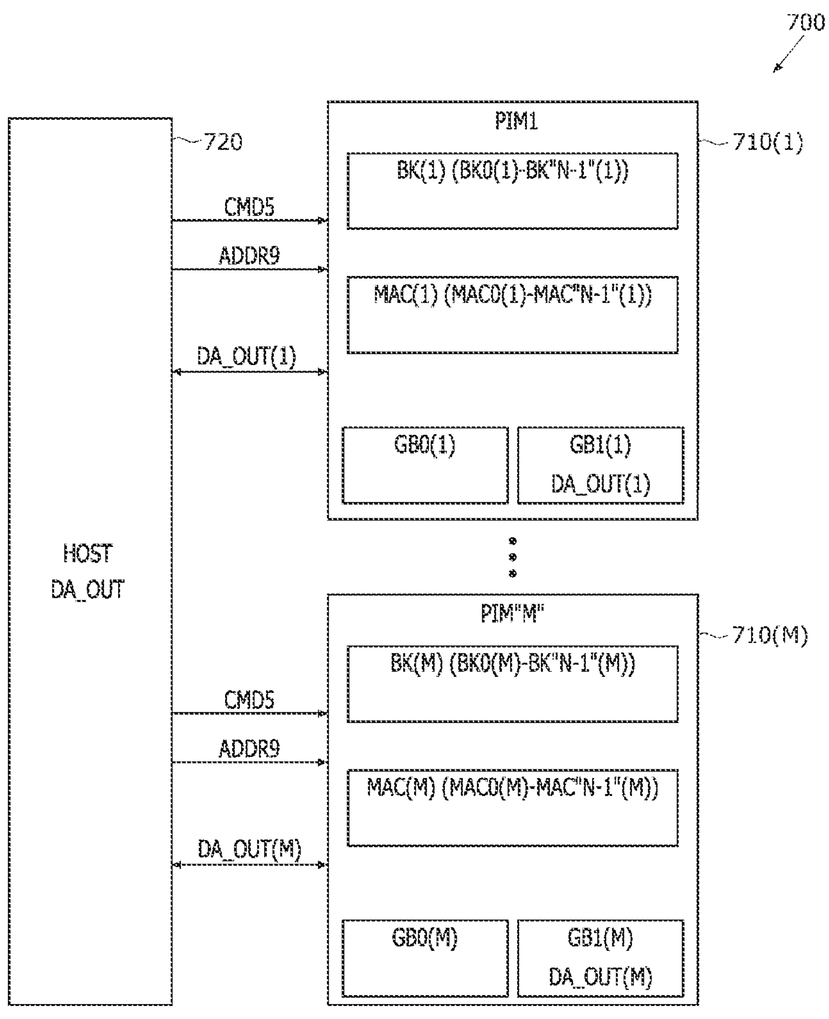
FIG. 66 is a diagram illustrating operations of the PIM system according to steps 779 and 780 in the flowchart of FIG. 61.

Next, referring to FIGS. 61 and 66, in step 779, the host 720 may transmit a fifth command CMD5 and a ninth address ADDR9 to each of the PIM devices 710(1)-710(M). Here, as described above with reference to FIGS. 33 and 47, the fifth commands CMD5 may request data read operations of the second global buffers GB1(1)-GB1(M) of the PIM devices 710(1)-710(M). The ninth address ADDR9 may include a column address designating a region in which each of the sets DA_OUT(1)-DA_OUT(M) of the output data is stored in each of the second global buffers GB1(1)-GB1(M) of the PIM devices 710(1)-710(M). In step 780, the second global buffers GB1(1)-GB1(M) of the PIM devices 710(1)-710(M) may perform read operations on the sets DA_OUT(1)-DA_OUT(M) of the output data in response to the fifth commands CMD5. As illustrated in FIG. 66, the first PIM device 710(1) may transmit the first set DA_OUT(1) of the output data stored in the second global buffer GB1(1) to the host 720. Similarly, the "M"$^{th}$ PIM device 710(M) may transmit the "M"$^{th}$ set DA_OUT(M) of the output data stored in the second global buffer GB1(M) to the host 720. Each of the processes of transmitting the sets DA_OUT(1)-DA_OUT(M) of the output data in the second global buffers GB1(1)-GB1(M) of the PIM devices 710(1)-710(M) to the host 720 may be performed in the same manner as the process described above with reference to FIGS. 33 and 47. When the sets DA_OUT(1)-DA_OUT(M) of the output data are transmitted, the host 720 may generate the output data DA_OUT including all sets DA_OUT(1)-DA_OUT(M) of the output data.

Figure 67:
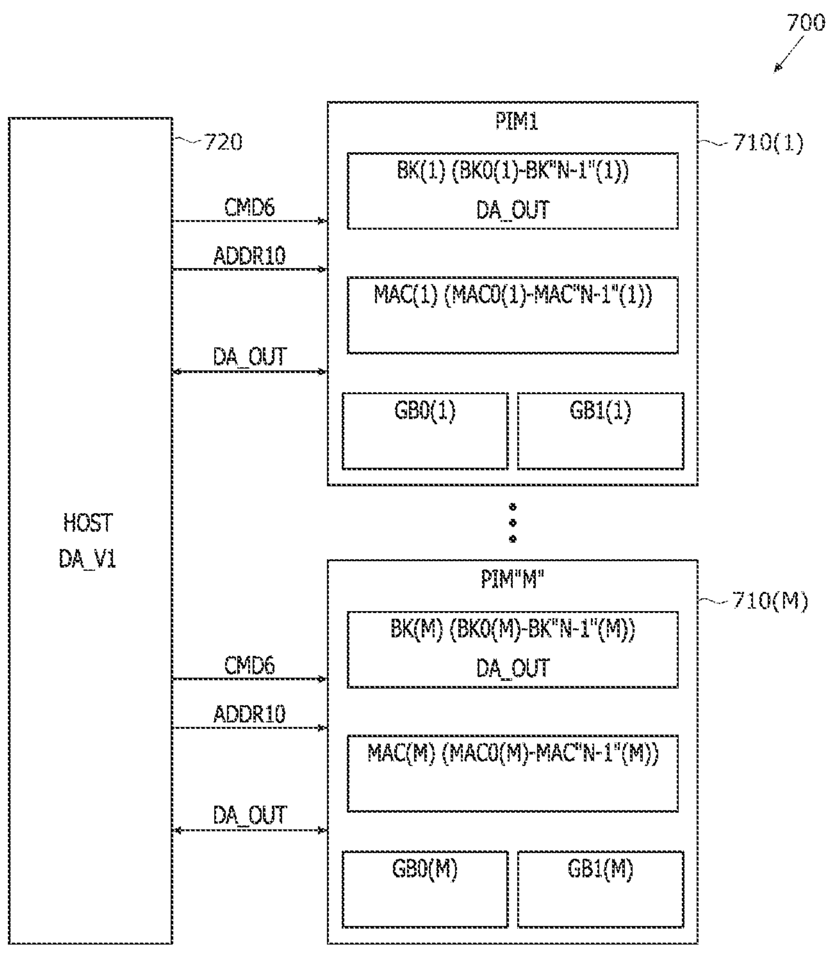
FIG. 67 is a diagram illustrating operations of the PIM system according to steps 781 and 782 in the flowchart of FIG. 61.

Next, referring to FIGS. 61 and 67, in step 781, the host 720 may transmit a sixth command CMD6 and a tenth address ADDR10 to each of the PIM devices 710(1)-710(M). Here, the sixth commands CMD6 may request data write operations in the memory banks BK(1)-BK(M) of the PIM devices 710(1)-710(M). The tenth address ADDR10 may include a second bank address and a tenth column address designating a region in which the output data DA_OUT is to be stored in each of the memory banks BK(1)-BK(M) of the PIM devices 710(1)-710(M). In step 782, the memory banks BK(1)-BK(M) of the PIM devices 710(1)-710(M) may perform write operations on the output data DA_OUT in response to the sixth commands CMD6. As illustrated in FIG. 67, the memory bank designated by the second bank address among the memory banks BK0(1)-BK"N−1"(1) of the first PIM device 710(1) may store the output data DA_OUT in the columns designated by the tenth column address. Similarly, the memory bank designated by the second bank address among the memory banks BK0(M)-BK"N−1"(M) of the "M"$^{th}$ PIM device 710(M) may store the output data DA_OUT in the columns designated by the tenth column address. In this embodiment, the output data DA_OUT may be stored in each of the memory banks BK(1)-BK(M) of the PIM devices 710(1)-710(M), but this is only an example and the output data DA_OUT may be stored in only one memory bank of the PIM devices 710(1)-710(M). Each of the processes of storing the output data DA_OUT in the memory banks BK(1)-BK(M) of the PIM devices 710(1)-710(M) may be performed in the same manner as the process described above with reference to FIGS. 44 and 48.

As described with reference to FIGS. 50 to 67, when the MLP operation of FIG. 32 is divided and performed in the "M" PIM devices 710(1)-710(M), the first global buffers GB0(1)-GB0(M) and the second global buffers GB1(1)-GB1(M) of the PIM devices 710(1)-710(M) may perform a vector data provision function and a MAC result data storage function, respectively. That is, in each of the MAC arithmetic operation processes in the input layer, the first hidden layer, the second hidden layer, and the output layer, the first global buffers GB0(1)-GB0(M) may provide vector data to the MAC operators MAC(1)-MAC(M), and the second global buffers GB1(1)-GB1(M) may store the sets of the MAC result data generated from the MAC operators MAC(1)-MAC(M). Accordingly, the host 720 may access the memory banks BK(1)-BK(M) only in the process of reading the sets DA_V1(1)-DA_V1(M) of the first vector data used as input data in the input layer and in the process of writing the output data DA_OUT output from the output layer. In addition, in the remaining processes, the host 720 may access only the first global buffers GB0(1)-GB0(M) and the second global buffers GB1(1)-GB1(M) without accessing the memory banks BK(1)-BK(M). Accordingly, it is possible to minimize access to the memory banks BK(1)-BK(M) in the entire process of performing the MLP operation.

Figure 68:
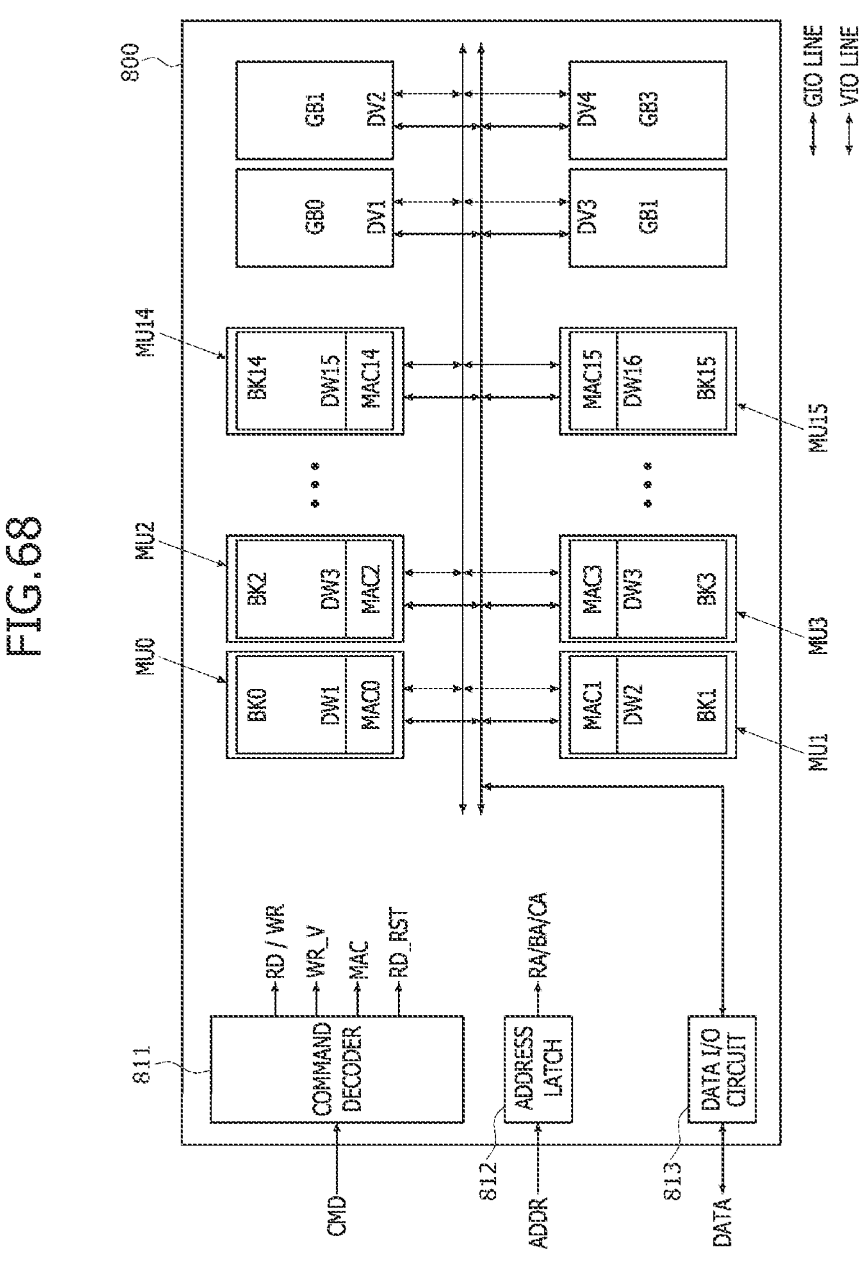
FIG. 68 is a block diagram illustrating a PIM device according to an embodiment of the present disclosure.

FIG. 68 is a block diagram illustrating a PIM device 800 according to an embodiment of the present disclosure. Referring to FIG. 68, the PIM device 800 may include a plurality of memory banks BK0-BK15, a plurality of MAC operators MAC0-MAC15, a plurality of global buffers GB0-GB3, a command decoder 811, an address latch 812, and a data input/output circuit 813. As illustrated, the numbers of memory banks BK0-BK15, MAC operators MAC0-MAC15, and global buffers GB0-GB3 are 16, 16, and 4, respectively, but this is only an example, and the numbers may be different in different embodiments.

As described above with reference to FIG. 31, a "K"$^{th}$ memory bank BK"K−1" ("K" is 1, 2, . . . , 16) among the memory banks BK0-BK15 and a "K"$^{th}$ MAC operator MAC"K−1" among the MAC operators MAC0-MAC15 may constitute a "K"$^{th}$ MAC unit MU"K−1". The "K"$^{th}$ memory bank BK"K−1" constituting the "K"$^{th}$ MAC unit MU"K−1" may provide "K"$^{th}$ weight data DW"K" for a MAC arithmetic operation to the "K"$^{th}$ MAC operator MAC"K−1". As illustrated in FIG. 68, the first memory bank BK0 may transmit first weight data DW1 to the first MAC operator MAC0. The second memory bank BK1 may transmit second weight data DW2 to the second MAC operator MAC1. The third memory bank BK2 may transmit third weight data DW3 to the third MAC operator MAC2. The fourth memory bank BK3 may transmit fourth weight data DW4 to the fourth MAC operator MAC3. The fifteenth memory bank BK14 may transmit fifteenth weight data DW15 to the fifteenth MAC operator MAC14. In addition, the sixteenth memory bank BK15 may transmit sixteenth weight data DW16 to the sixteenth MAC operator MAC15. In an embodiment, each weight data transmission from each of the memory banks BK0-BK15 to each of the MAC operators MAC0-MAC15 may be performed through a GIO line.

The first to fourth global buffers GB0-GB3 may provide first to fourth vector data DV1-DV4 for the MAC arithmetic operations to the MAC operators MAC0-MAC15. In this embodiment, the first to fourth vector data DV1-DV4 may be composed of elements of different vector matrices. The first global buffer GB0 may transmit the first vector data DV1 to the MAC operators MAC0-MAC15. The second global buffer GB1 may transmit the second vector data DV2 to the MAC operators MAC0-MAC15. The third global buffer GB2 may transmit the third vector data DV3 to the MAC operators MAC0-MAC15. The fourth global buffer GB3 may transmit the fourth vector data DV4 to the MAC operators MAC0-MAC15. The transmission of the first to fourth vector data DV1-DV4 from the first to fourth global buffers GB0-GB3 to the MAC operators MAC0-MAC15 may be performed through a vector data input/output line (hereinafter, referred to as "VIO line"). The VIO line may provide a data transmission path that is physically separated from the GIO line.

The MAC operators MAC0-MAC15 may perform MAC arithmetic operations of matrix multiplication using the weight data and the vector data transmitted from the memory banks BK0-BK15 and the first to fourth global buffers GB0-GB3, respectively. Although not illustrated in FIG. 68, each of the MAC operators MAC0-MAC15 may include a plurality of sub-MAC operators. In an embodiment, the number of sub-MAC operators included in each of the MAC operators MAC0-MAC15 may be the same as the number of global buffers GB0-GB3. The MAC operators MAC0-MAC15 may generate MAC result data as a result of performing the MAC arithmetic operations. Each of the MAC operators MAC0-MAC15 may generate the same number of pieces of MAC result data as the number of sub-MAC operators.

The command decoder 811 may receive a command CMD from a host or a controller and generate and output control signals for controlling various operations of the MAC units MU0-MU15 and the first to fourth global buffers GB0-GB3. In an embodiment, the control signals output from the command decoder 811 may include a read control signal RD, a write control signal WR, a vector data write control signal WR_V, a MAC arithmetic control signal MAC, and a MAC result data read control signal RD_RST.

When the read control signal RD is output from the command decoder 811, the memory banks BK0-BK15 may transmit read data to the host or the controller through the GIO line and the data input/output circuit 813. When the write control signal WR is output from the command decoder 811, the memory banks BK0-BK15 may store write data that is input from the host or the controller and transmitted through the data input/output circuit 813 and the GIO line. When the vector data write control signal WR_V is output from the command decoder 811, the first to fourth global buffers GB0-GB3 may store the first to fourth vector data DV1-DV4, respectively, which is transmitted from the host or the controller and transmitted through the data input/output circuit 813 and the GIO line. When the MAC arithmetic control signal MAC is output from the command decoder 811, the memory banks BK0-BK15 may transmit the first to sixteenth weight data DW1-DW15 and MAC clock signals to the MAC operators MAC0-MAC15, respectively, and the first to fourth global buffers GB0-GB3 may transmit the first to fourth vector data DV1-DV4 to the MAC operators MAC0-MAC15, respectively. Each of the MAC operators MAC0-MAC15 may perform a MAC arithmetic operation using each of the first to sixteenth weight data DW1-DW15 and the first to fourth vector data DV1-DV4 in synchronization with the MAC clock signal. When the MAC result data read control signal RD_RST is output from the command decoder 811, each of the MAC operators MAC0-MAC15 may transmit the MAC result data generated as a result of the MAC arithmetic operation to the host or the controller through the GIO line and the data input/output circuit 813.

The address latch 812 may receive an address signal ADDR from the host or the controller. The address latch 812 may latch the address signal ADDR to generate and output a row address RA and a bank address BA. The row address RA and the bank address BA output from the address latch 812 may be transmitted to the memory banks BK0-BK15. In addition, the address latch 812 may latch the address signal ADDR to generate and output a column address CA. The column address output from the address latch 812 may be transmitted to the first to fourth global buffers GB0-GB3.

The data input/output circuit 813 may receive data from the host or the controller or transmit data to the host or the controller. In an embodiment, the data input/output circuit 813 may include a plurality of data input/output terminals. In an embodiment, the data input/output circuit 813 may include a data input/output buffer. The data input/output circuit 813 may exchange data with the memory banks BK0-BK15, the MAC operators MAC0-MAC15, and the first to fourth global buffers GB0-GB3 through the GIO line in the PIM device 800. The data input/output circuit 813 may transmit the vector data to the first to fourth global buffers GB0-GB3 through the GIO line in the PIM device 800. The data input/output circuit 813 may receive MAC result data from the MAC operators MAC0-MAC15 to transmit the received MAC result data to the host or the controller through the GIO line in the PIM device 800.

Figure 69:
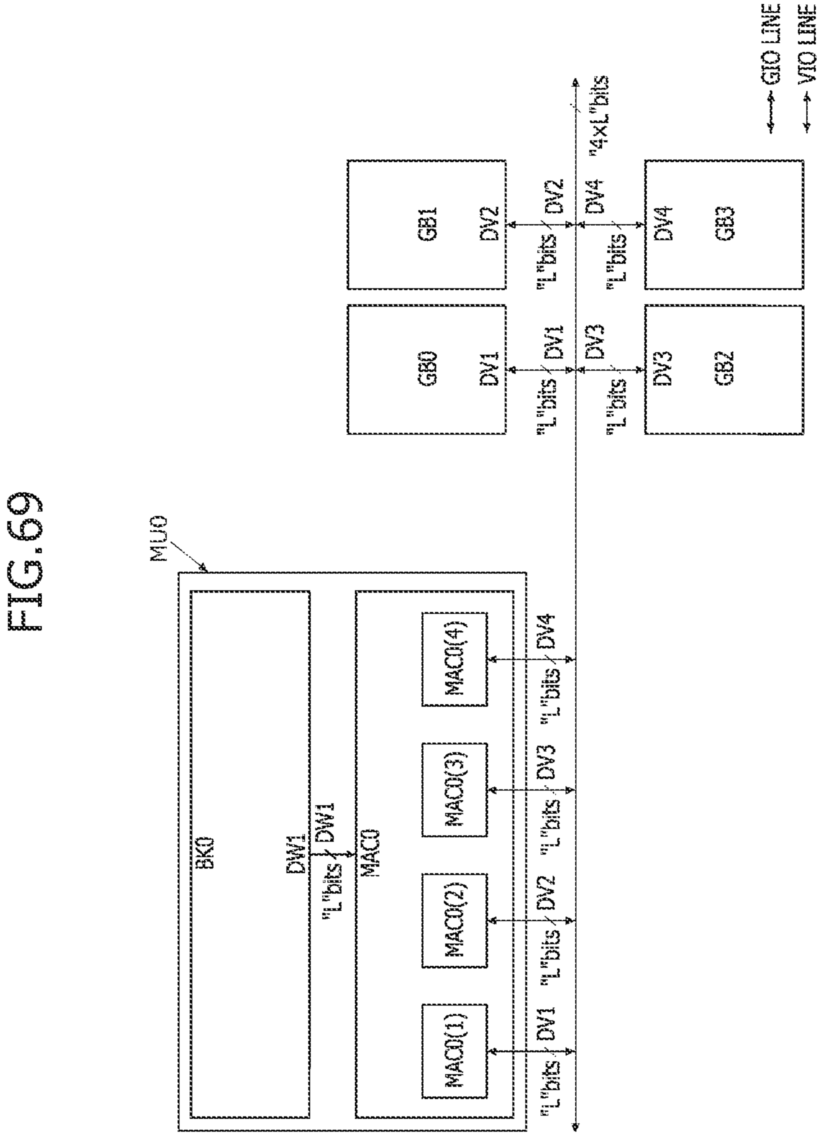
FIG. 69 is a diagram illustrating a configuration and a batch execution operation of a first MAC unit of the PIM device of FIG. 68.

FIG. 69 is a diagram illustrating a configuration and a batch execution operation of the first MAC unit MU0 of the PIM device 800 of FIG. 68. The description of the first MAC unit MU0 described below may be equally applied to the second to sixteenth MAC units MU1-MU15 of the PIM device 800. Referring to FIG. 69, the first MAC operator MAC0 constituting the first MAC unit MU0 may include first to fourth sub-MAC operators MAC0(1)-MAC0(4). The first to fourth sub-MAC operators MAC0(1)-MAC0(4) may be arranged in parallel to operate independently. The first to fourth sub-MAC operators MAC0(1)-MAC0(4) may receive the first weight data DW1 from the first memory bank BK0 in common through the GIO line. In this embodiment, it is assumed that the GIO line has a transmission capacity greater than at least "L" bits ("L" is a natural number) and each of the first weight data DW1, the first vector data DV1, the second vector data DV2, the third vector data DV3, and the fourth vector data DV4 has a data size of "L" bits. In this case, the VIO line may have a transmission capacity of "4×L" bits.

The first to fourth sub-MAC operators MAC0(1)-MAC0(4) may receive the first to fourth vector data DV1-DV4 transmitted through the VIO line, respectively, through sub-VIO lines. In an embodiment, the sub-VIO lines may provide data transmission paths between the VIO line and the first to fourth sub-MAC operators MAC0(1)-MAC0(4). The sub-VIO line may have a transmission capacity greater than at least "L" bits. Accordingly, the first sub-MAC operator MAC0(1) may receive the first vector data DV1 transmitted through the VIO line and the first sub-VIO line. The second sub-MAC operator MAC0(2) may receive the second vector data DV2 transmitted through the VIO line and the second sub-VIO line. The third sub-MAC operator MAC0(3) may receive the third vector data DV3 transmitted through the VIO line and the third sub-VIO line. The fourth sub-MAC operator MAC0(4) may receive the fourth vector data DV4 transmitted through the VIO line and the fourth sub-VIO line.

When a MAC arithmetic control signal MAC is output from the command decoder (811 of FIG. 68), the first memory bank BK0 may transmit the first weight data DW1 to the first to fourth sub-MAC operators MAC0(1)-MAC0(4) of the first MAC operator MAC0. The first to fourth global buffers GB0-GB3 may transmit the first to fourth vector data DV1-DV4 to the first to fourth sub-MAC operators MAC0(1)-MAC0(4) of the first MAC operator MAC0, respectively, through the VIO lines. The first sub-MAC operator MAC0(1) may perform a MAC arithmetic operation on the first weight data DW1 and the first vector data DV1 to generate first MAC result data. The second sub-MAC operator MAC0(2) may perform a MAC arithmetic operation on the second weight data DW2 and the second vector data DV2 to generate second MAC result data. The third sub-MAC operator MAC0(3) may perform a MAC arithmetic operation on the third weight data DW3 and the third vector data DV3 to generate third MAC result data. In addition, the fourth sub-MAC operator MAC0(4) may perform a MAC arithmetic operation on the fourth weight data DW4 and the fourth vector data DV4 to generate fourth MAC result data. In this way, the first MAC operator MAC0 may parallelly perform the MAC arithmetic operations under conditions with the same weight data but different vector data. That is, according to the PIM device 800 according to the present embodiment, the operations in the cases where four different input data, that is, first to fourth vector data DV1-DV4 are input to the input layer of the MLP of FIG. 32 may be collectively performed.

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

What is claimed is:

1. A processing-in-memory (PIM) device comprising:

a plurality of multiplication and accumulation (MAC) operators configured to perform MAC arithmetic operations using weight data and vector data and generate MAC result data; and a first global buffer and a second global buffer each connected in common to the plurality of MAC operators of the PIM device, the first global buffer and the second global buffer configured to alternately perform, during the performance of the same MAC arithmetic operation by the plurality of MAC operators, a vector data provision operation of providing the vector data to the plurality of MAC operators and a MAC result data storage operation of storing the MAC result data such that the first global buffer performs the vector data provision operation while the second global buffer performs the MAC result data storage operation and the second global buffer performs the vector data provision operation while the first global buffer performs the MAC result data storage operation.

2. The PIM device of claim 1, wherein the MAC arithmetic operations are performed in an input layer, a first hidden layer, a second hidden layer, and an output layer which constitute a multi-layer perceptron (MLP), and wherein the first global buffer and the second global buffer are configured to:

perform the vector data provision operation and the MAC result data storage operation, respectively, in a first MAC arithmetic operation in a first layer that is one of the input layer, the first hidden layer, the second hidden layer, and the output layer, and perform the MAC result data storage operation and the vector data provision operation, respectively, in a second MAC arithmetic operation in a second layer following the first layer.

3. The PIM device of claim 2, wherein the MAC result data generated as a result of the first MAC arithmetic operation in the first layer constitutes vector data input to the second MAC arithmetic operation in the second layer.

4. The PIM device of claim 2, further comprising a plurality of memory banks configured to provide the weight data to the plurality of MAC operators.

5. The PIM device of claim 4, further comprising:

a command decoder configured to generate control signals for controlling the plurality of memory banks, the plurality of MAC operators, the first global buffer, and the second global buffer; and an address latch configured to transmit addresses to the plurality of memory banks, the first global buffer, and the second global buffer.

6. The PIM device of claim 5, wherein the control signals output from the command decoder include:

a read control signal for controlling an operation of reading data from the plurality of memory banks;

a vector data write control signal for controlling an operation of storing the vector data in the first global buffer or the second global buffer;

a MAC arithmetic control signal for controlling the MAC arithmetic operations of the plurality of MAC operators;

a MAC result data write control signal for controlling an operation of storing the MAC result data in the first global buffer or the second global buffer; and an output data read control signal for controlling an operation of reading output data from the first global buffer or the second global buffer.

7. The PIM device of claim 6, wherein the first layer is the input layer, and the second layer is the first hidden layer, and wherein the command decoder sequentially generates a first vector data write control signal, a first MAC arithmetic control signal, and a first MAC result data write control signal, for an operation in the input layer.

8. The PIM device of claim 7, wherein the first global buffer stores first vector data that is input data of the input layer in response to the first vector data write control signal, and transmits the first vector data to the plurality of MAC operators in response to the first MAC arithmetic control signal, and wherein the second global buffer stores first MAC result data generated from the plurality of MAC operators in response to the first MAC result data write control signal as second vector data.

9. The PIM device of claim 8, wherein the command decoder generates a read control signal for the first vector data stored in the plurality of memory banks before generating the first vector data write control signal, and wherein the plurality of memory banks perform a read operation on the first vector data in response to the read control signal.

10. The PIM device of claim 8, wherein the command decoder sequentially generates a second MAC arithmetic control signal and a second MAC result data write control signal, for an operation in the first hidden layer.

11. The PIM device of claim 10, wherein the second global buffer transmits the second vector data to the plurality of MAC operators in response to the second MAC arithmetic control signal, and wherein the first global buffer stores second MAC result data generated from the plurality of MAC operators as third vector data in response to the second MAC result data write control signal.

12. The PIM device of claim 11, wherein the command decoder sequentially generates a third MAC arithmetic control signal and a third MAC result data write control signal, for an operation in the second hidden layer.

13. The PIM device of claim 12, wherein the first global buffer transmits the third vector data to the plurality of MAC operators in response to the third MAC arithmetic control signal, and wherein the second global buffer stores third MAC result data generated from the plurality of MAC operators as fourth vector data in response to the third MAC result data write control signal.

14. The PIM device of claim 13, wherein the command decoder sequentially generates a fourth MAC arithmetic control signal, a fourth MAC result data write control signal, and an output data read control signal, for an operation in the output layer.

15. The PIM device of claim 14, wherein the second global buffer transmits the fourth vector data to the plurality of MAC operators in response to the fourth MAC arithmetic control signal, and wherein the first global buffer stores fourth MAC result data generated from the plurality of MAC operators as output data in response to the fourth MAC result data write control signal, and performs a read operation on the output data in response to the output data read control signal.

16. The PIM device of claim 15, wherein the command decoder generates a write control signal after outputting the output data read control signal, and wherein the plurality of memory banks store the output data in response to the write control signal.

17. The PIM device of claim 1, wherein the MAC arithmetic operations are performed in an input layer, a first hidden layer, a second hidden layer, and an output layer that constitute a multi-layer perceptron (MLP), wherein the first global buffer provides first vector data used as input data in the input layer to the plurality of MAC operators during a first MAC arithmetic operation in the input layer, and wherein the second global buffer stores first MAC result data generated by the first MAC arithmetic operation in the input layer as second vector data to be input to the first hidden layer.

18. The PIM device of claim 17, wherein the second global buffer provides the second vector data to the plurality of MAC operators during a second MAC arithmetic operation in the first hidden layer, and wherein the first global buffer stores second MAC result data generated by the second MAC arithmetic operation in the first hidden layer as third vector data to be input to the second hidden layer.

19. The PIM device of claim 16, wherein the first global buffer provides the third vector data to the plurality of MAC operators during a third MAC arithmetic operation in the second hidden layer, and wherein the second global buffer stores third MAC result data generated by the third MAC arithmetic operation in the second hidden layer as fourth vector data to be input to the output layer.

20. The PIM device of claim 19, wherein the second global buffer provides the fourth vector data to the plurality of MAC operators during a fourth MAC arithmetic operation in the output layer, and wherein the first global buffer stores fourth MAC result data generated by the fourth MAC arithmetic operation in the output layer as output data.

* * * * *